United States Patent [19]
Utsumi et al.

[11] Patent Number: 5,872,751
[45] Date of Patent: Feb. 16, 1999

[54] LIBRARY APPARATUS AND A METHOD FOR ASSEMBLY THEREOF

[75] Inventors: Kenichi Utsumi; Mamoru Haneda; Nobuhiko Motoyama; Hiroaki Nishijo, all of Kawasaki; Takahisa Miyamoto, Inayi; Yutaka Sugai, Inayi; Hitosi Saito, Inayi; Satoshi Kanbayashi, Inayi; Ichiro Tatsuda; Osamu Omori, both of Kawasaki; Yuji Kato, Inayi, all of Japan

[73] Assignees: Fujitsu Limited, Kawasaki; Fujitsu Kiden, Ltd., Tokyo, both of Japan

[21] Appl. No.: 960,103

[22] Filed: Oct. 27, 1997

Related U.S. Application Data

[63] Continuation of Ser. No. 607,898, Feb. 27, 1996, abandoned.

[30] Foreign Application Priority Data

Feb. 28, 1995 [JP] Japan .................................. 7-067112
Feb. 28, 1995 [JP] Japan .................................. 7-067113
Feb. 28, 1995 [JP] Japan .................................. 7-067114

[51] Int. Cl.$^6$ .................................................. G11B 17/22
[52] U.S. Cl. .................................................................. 369/34
[58] Field of Search .............................. 369/34, 30, 37, 369/36, 38, 39; 711/100

[56] References Cited

U.S. PATENT DOCUMENTS

| | | | |
|---|---|---|---|
| 3,831,197 | 8/1974 | Beach et al. ............................... | 300/71 |
| 3,938,190 | 2/1976 | Semmlow et al. ......................... | 360/72 |
| 3,964,577 | 6/1976 | Bengtsson ................................. | 186/112 |
| 4,654,727 | 3/1987 | Blum et al. ................................ | 300/71 |
| 5,402,283 | 3/1995 | Yamakawa et al. ....................... | 360/92 |
| 5,432,419 | 7/1995 | Watanabe et al. ........................ | 318/560 |
| 5,432,656 | 7/1995 | Motoyama et al. ................. | 360/98.04 |
| 5,450,385 | 9/1995 | Ellis et al. ................................. | 369/34 |
| 5,500,803 | 3/1996 | Munro et al. .............................. | 360/92 |
| 5,546,315 | 8/1996 | Kleinschnitz ............................. | 369/34 |
| 5,581,522 | 12/1996 | Sibuya et al. ............................. | 369/36 |

FOREIGN PATENT DOCUMENTS

| | | |
|---|---|---|
| 620553 | 10/1994 | European Pat. Off. . |
| 63-98864 | 4/1988 | Japan . |
| 2257462 | 10/1990 | Japan . |
| 3130963 | 6/1991 | Japan . |

OTHER PUBLICATIONS

Library device for storage medium (JP, 3–209,664), 12 Sep. 1991.

*Primary Examiner*—Tan Dinh
*Attorney, Agent, or Firm*—Greer, Burns & Crain, Ltd.

[57] ABSTRACT

A library apparatus having components permitting accurate and straightforward assembly. The library apparatus includes respective cell, drive, accessor and passage units, each having box shaped housings including a connection mechanism. A coupling couples the housings of the passage units with the other units. Other features of the library apparatus include a reference mark on the accessor unit which permits a transport mechanism in the passage unit to correct positional errors of the transport mechanism to other components.

40 Claims, 79 Drawing Sheets

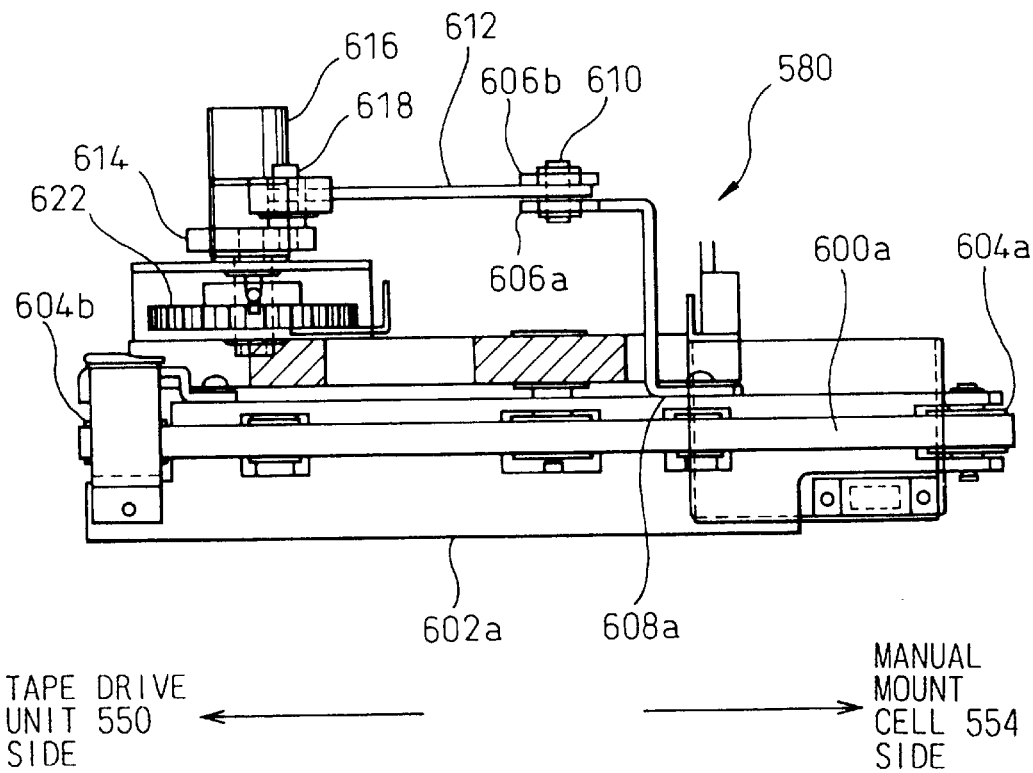

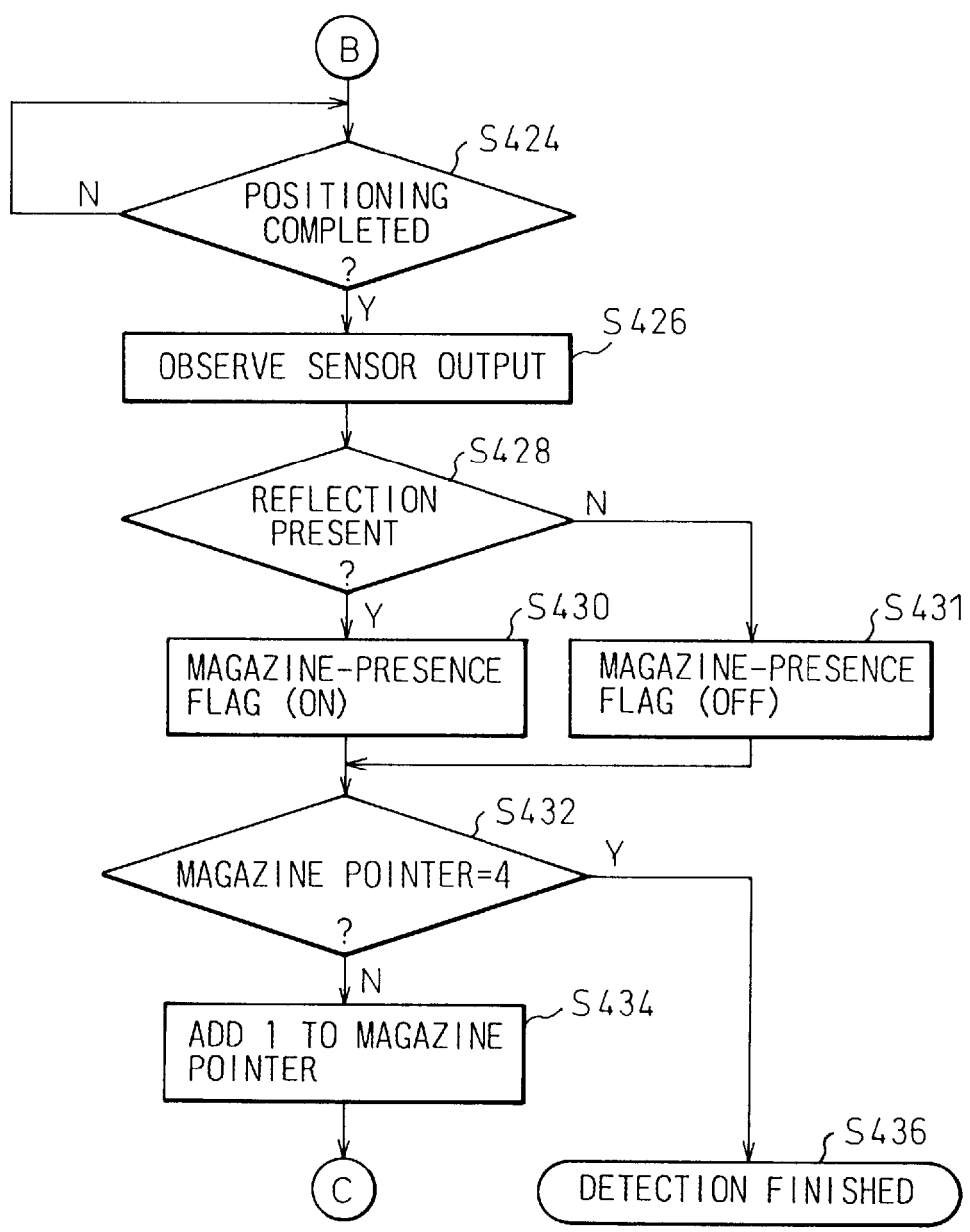

LIBRARY APPARATUS AND A METHOD FOR ASSEMBLY THEREOF

This application is a continuation of application Ser. No. 08/607,898 filed on Feb. 27, 1996, abandoned.

BACKGROUND OF THE INVENTION

1. Field of the Invention

The present invention relates to a library apparatus with cells for storing cartridges accommodating memory media therein and a method for assembling the same.

The library apparatus has a plurality of cells for storing cartridges, such as magnetic tape cartridges or optical disk cartridges, accommodating information memory media therein. The cartridge stored in one cell selected from the plurality of cells is loaded to a drive unit in the library apparatus. Information is recorded on and regenerated from the medium accommodated in the cartridge by the drive unit.

Further, it is desirable that the entry of a cartridge into the library apparatus is easy for the operator.

Recently, the demand for a large capacity library apparatus has increased. It is desirable that the library apparatus has a smaller installation area and a larger capacity capable of accommodating a larger number of cartridges.

Also, the library apparatus is preferably of an unattended system wherein high reliability is indispensable; for example, restoration is easy if the power source is shut-down.

2. Description of the Invention

A library apparatus such as a magnetic tape library includes a cartridge access station (CAS) for carrying out the entry and exit of a cartridge accommodating a memory medium, a cell drum having a plurality of cells, each accommodating cartridges, a drive unit for carrying out the recording on and regeneration from the memory medium in the cartridge, and an accessor for transporting the cartridge between the access station, the cell drum and the drive unit.

The accessor carries a gripper mechanism for gripping a cartridge and a reciprocation mechanism for reciprocating the gripper mechanism. Also, a number of printed boards for controlling the gripper mechanism and the reciprocation mechanism are mounted thereon.

The entry operation of a new cartridge into the library apparatus is carried out in such a manner that the operator inserts the cartridge into an entry opening provided in a cartridge access station. When the cartridge is inserted into the entry opening, an accessor grips the cartridge and conveys the same to a selected cell in the cell drum. An address of the cell to which the cartridge is to be stored is known by reading a bar code label, attached to the cartridge by a bar code reader.

The library apparatus is used for storing data for calculations executed by a host computer and the library apparatus is generally installed in a room in a building in the same way as the host computer. Accordingly, the library apparatus must be easily carried into the building and assembled in a building.

However, since the size of the library apparatus is limited by the size of an elevator provided in the building, the number of cartridges to be accommodated in the library apparatus is also limited.

Of course, it is possible to convey the library by the elevator while disassembling the library apparatus into individual parts. In such a case, however, a longer time is necessary to accurately assemble the individual parts. Also, since accurate assembly cannot be expected in the building site, it is impossible to provide a smaller cell pitch and the cartridge-integration density cannot be very high.

On the other hand, since a cell used for the library apparatus has an exclusive structure for a cell drum or a magazine, there are problems in that the number of rows and stages of cell are unchangeable and the production cost of a cell becomes higher.

In addition, in the conventional library apparatus, it is necessary to insert cartridges one by one into the entry opening of the cartridge access station, whereby a longer time is required for the entry of a large number of cartridges into the library apparatus.

Also, there are problems in that a longer time is necessary until the accessor conveys a cartridge to a selected cell, because an address of the cell wherein the cartridge is to be stored is unknown unless the bar code label has been read by the bar code reader mounted on the accessor.

Also, in the conventional library apparatus, it is necessary to convey a cartridge inserted therein to a cell in a shelf for accommodating cartridges within the library apparatus.

SUMMARY OF THE INVENTION

A primary object of the present invention is to provide a library apparatus capable of accommodating a large number of cartridges therein and being easily assembled in a shorter time period, and a method for assembling such a library apparatus.

A second object of the present invention is to provide a library apparatus capable of reducing the production cost of a cell, and a cell for storing cartridges.

A third object of the present invention is to provide a library apparatus including a cell unit which also can be used for the production of cells of a cartridge magazine.

A fourth object of the present invention is to provide a cartridge-accommodation cell capable of variously changing the number of rows and/or stages.

A fifth object of the present invention is to provide a library apparatus capable of reducing the time necessary for the entry of a large number of cartridges to accommodation shelves of the library apparatus.

A sixth object of the present invention is to provide a library apparatus in which it is unnecessary to convey a large number of cartridges inserted at one time into the library apparatus to accommodation shelves with cells for accommodating cartridges.

A seventh object of the present invention is to provide a library apparatus capable of reading bar code labels in a shorter time period, attached to a number of cartridges inserted into the library apparatus.

According to the present invention, since the library apparatus is constituted of drum units, accessor units, passage units and drive units, the transportation thereof becomes easy. The more drum units, the more cartridges to be accommodated in the library apparatus. Also, since the library apparatus is structured by the coupling of units, the assembly thereof becomes easy.

As a cell in the library apparatus is formed of the combination of a leftside cell unit, a central cell unit and a rightside cell unit, it is possible to reduce the production cost of the cell. The library apparatus includes a cell unit which also can be used for the production of cells of a cartridge magazine.

Further, according to the present invention, it is possible to save the operation time necessary for the entry of a number of cartridges to accommodation shelves of the library apparatus. Also, according to the present invention, since the magazine shelf can be regarded as part of another accommodation shelf, it is unnecessary for the accessor to immediately transfer a cartridge after the entry of cartridge. Further, since a bar code reader is provided for reading bar code labels on a large number of entry cartridges, a time necessary for the transfer of the cartridges can be saved. Also, according to the present invention, the simultaneous entry of a large number of cartridges is possible by the use of a magazine, and the immediate transfer of the cartridges is unnecessary after the entry.

BRIEF DESCRIPTION OF THE DRAWINGS

The present invention will be more clearly understood from the description as set forth below with reference to the accompanying drawings, wherein;

FIG. 13 is a side view of a cartridge feeder;

FIG. 86 is part of a flow chart for detecting the presence of a magazine;

DESCRIPTION OF THE PREFERRED EMBODIMENTS

Figure 1:
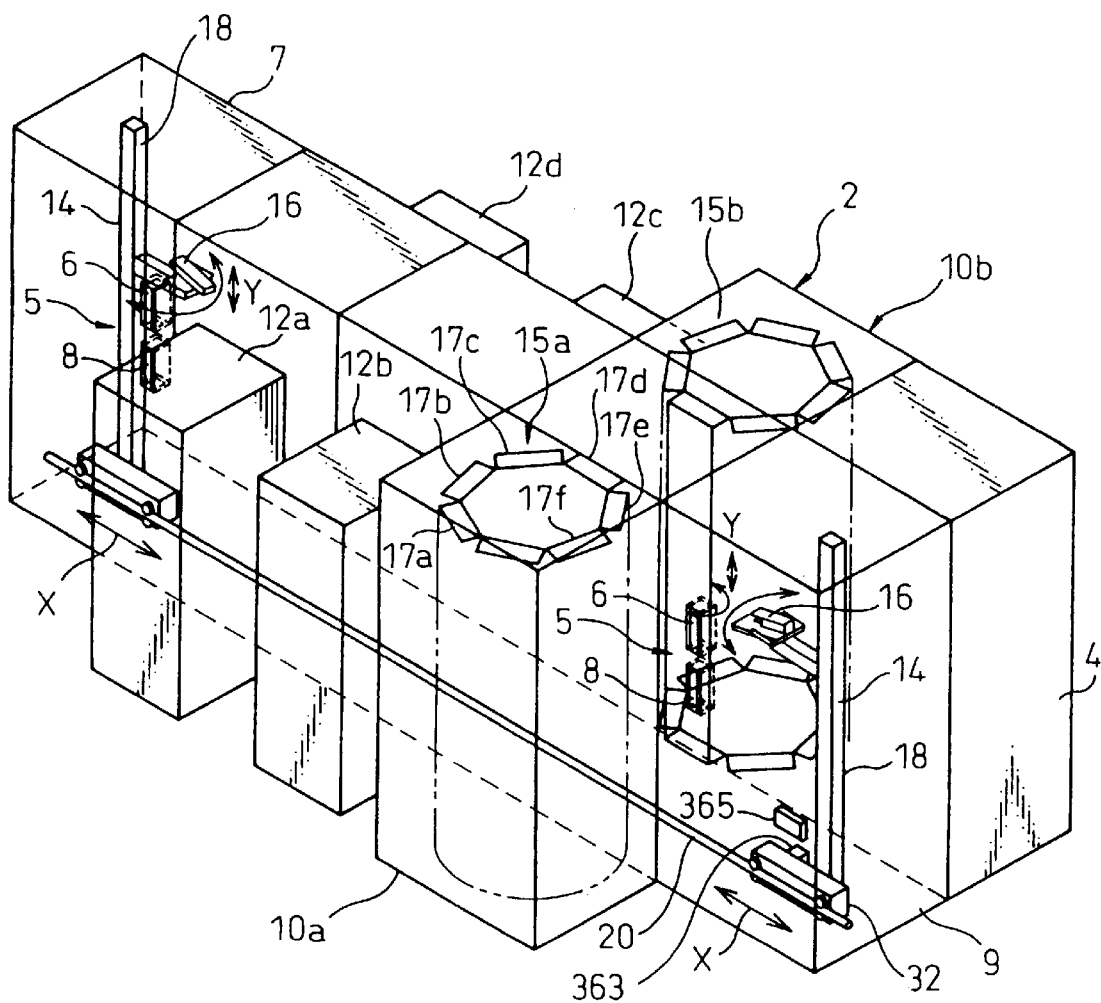
FIG. 1 is a diagrammatic see-through perspective view of a library apparatus according to the present invention.

FIG. 1 is a see-through perspective view of a library apparatus.

In FIG. 1, two cartridge access stations (CAS) 5 are provided on the front side of a leftside accessor unit 7 and a rightside accessor unit 9 of the library apparatus 2, respectively.

Each of the cartridge access stations 5 has a cartridge entrance 6 and a cartridge exit 8. The cartridge entrance 6 and the cartridge exit 8 are rotatable by 180° on the vertical axes thereof.

Drum units 10a and 10b have cell drums 15a and 15b, respectively, each having a plurality of cells. Each of the cell drums 15a and 15b consists of seven cell segments 17a through 17f. Each of the cell segments 17a through 17f in the respective cell drum 15a and 15b has cells arranged in three rows and n stages. Each of the cells stores a cartridge for accommodating a magnetic tape therein. Each cartridge is a Type 13480 magnetic tape cartridge. Four drive units 12a, 12b, 12c and 12d carry out the recording/regeneration of information to the magnetic tape accommodated in the cartridge as a memory medium. Each of the drive units 12a, 12b, 12c and 12d has a plurality of tape drive units. For example, four tape drive units are provided in the respective drive unit 12a, 12b, 12c or 12d. Each of the tape drive units has a cartridge entry/exit opening. The cartridge entry/exit opening is sloped to a plane including X-axis and vertical to Y-axis by an angle of 5.5°.

A control printed circuit board is provided in a housing 4, for controlling the cartridge access stations 5, the drum units 10a and 10b, the drive units 12a, 12b, 12c and 12d and two accessors 14.

The accessor 14 is provided with a handle assembly 16 movable upward/downward (in the arrowed direction Y in the drawing) along a vertical column 18. The accessor 14 is movable in the lateral direction (in the arrowed direction in the drawing) along a guide rail (X rail) 20. In such a way, the accessor 14 is an X-Y motion mechanism.

Figure 2:
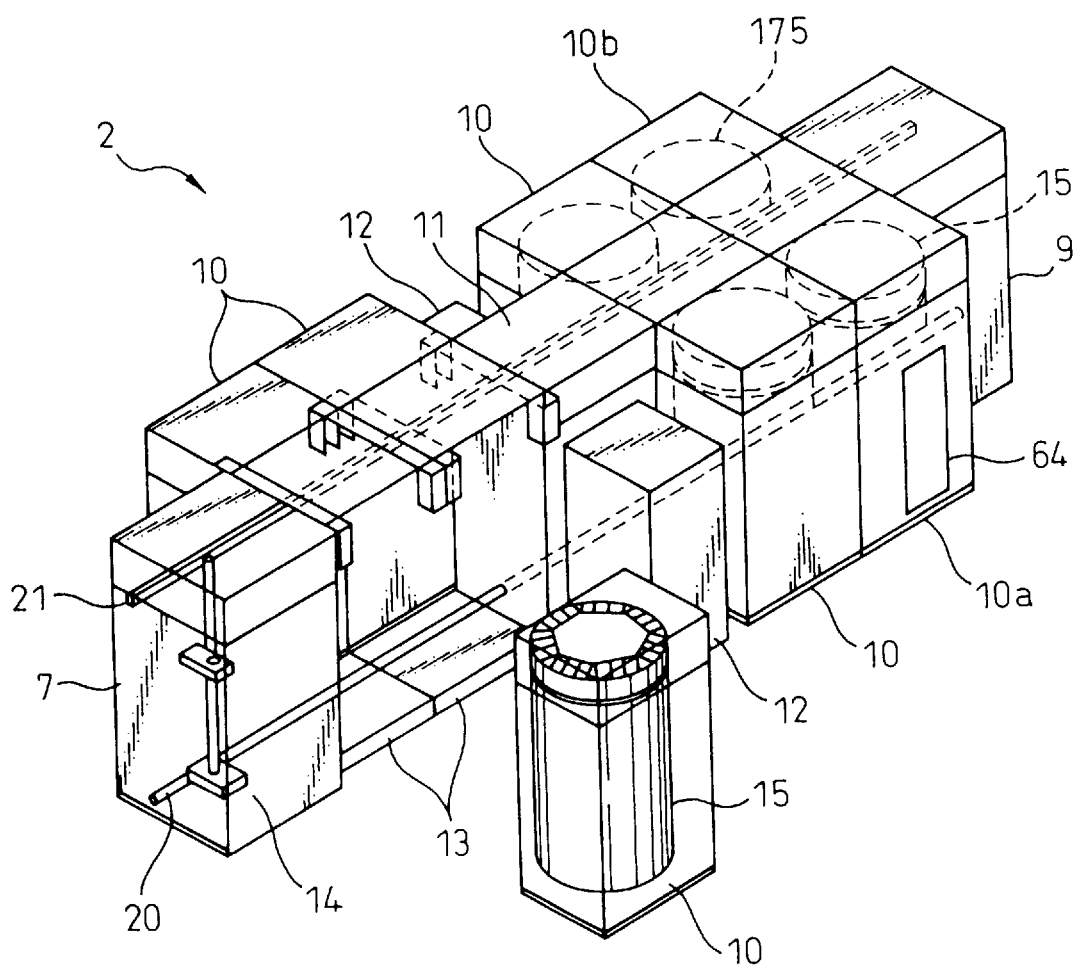
FIG. 2 is a perspective view illustrating a system of the library apparatus according to the present invention.

FIG. 2 is a see-through perspective view of a system of the library apparatus.

In FIG. 2, the respective units are arranged in the library apparatus while using the reference unit 11 as a reference. The reference unit 11 is positioned at the center of the library apparatus 2. The accessor unit 9 is positioned at the righthand end thereof. The accessor unit 7 is positioned at the lefthand end thereof. Passage units 13 are arranged between the reference unit 11 and the accessor unit 7. The number of the passage units 13 varies in accordance with that of the drum units 10 arranged between the reference unit 11 and the accessor unit 7. Since four drum units 10 are arranged in the library apparatus 2 shown in FIG. 2, the number of the passage units 13 is two. Also, the number of the passage units 13 arranged between the reference unit 11 and the accessor unit 9 is two, because the number of the drum units 10 arranged between the reference unit 11 and the accessor unit 9 is four. The drum unit 10a is provided with a DEE door 64 for allowing the operator to carry out the direct entry/exit of the cartridge to a cell of the cell drum 15. The drum unit 10b is provided with a DEE door (not shown) for allowing the entry/exit of a magazine to a magazine shelf of a magazine drum 175. The passage unit 13 can be used as a reference box for coupling the respective units. The passage unit 13 holds the X rail 20. A top rail 21 is provided for guiding the accessor 14. The top rail 21 is fixed to the drum unit 10.

Figure 3:
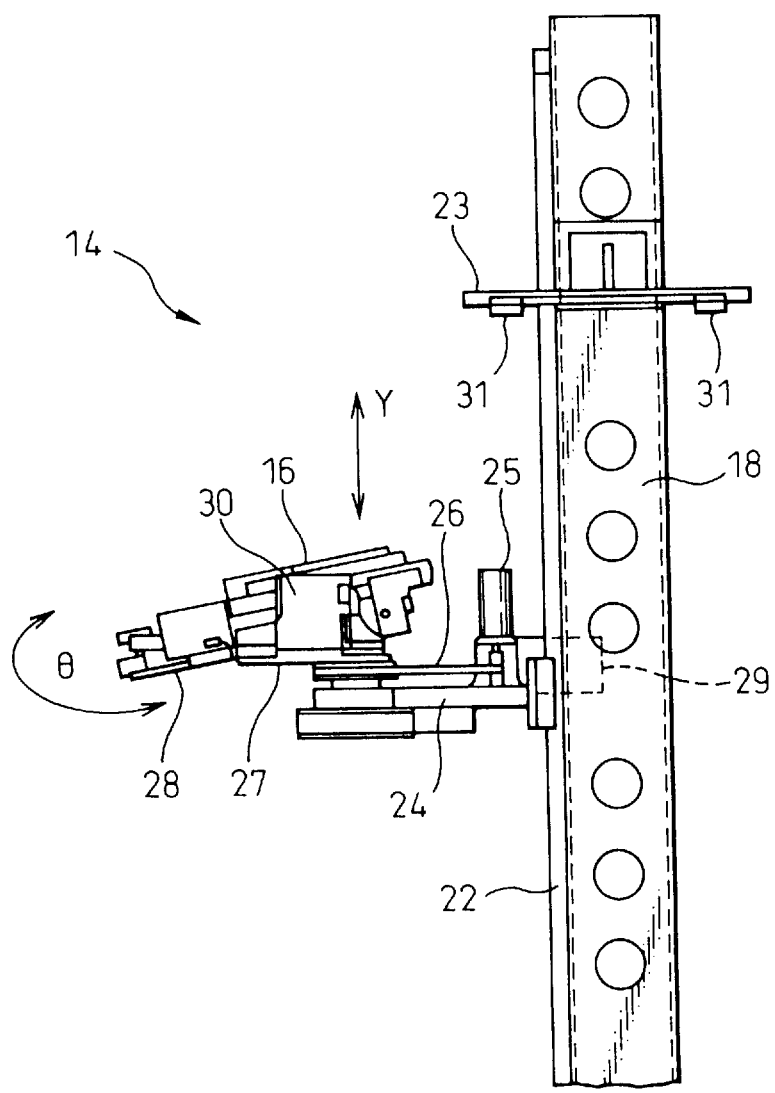
FIG. 3 is a side view of an accessor.

FIG. 3 is a side view of the accessor.

In the drawing, the hand assembly 16 is carried on a supporting base 24 movable upward/downward along a guide rail 22 fixed to the vertical column 18 of the accessor 14. The supporting base 24 carries a motor 25 thereon. Further, the supporting base 24 carries a printed circuit board 29 having a control circuit for controlling the motor 25. The supporting base 24 moves in the Y-axis direction together with the motor 25 and the printed circuit board 29 along the guide rail 22.

When the motor 25 is driven, a mount base 27 of the hand assembly 16 turns on the vertical axis (an axis parallel to the Y-axis) via a timing belt 26 wrapped around an output shaft of the motor 25. That is, the motor 25, the hand assembly 16 and the mount base 27 constitute a mechanism for moving the cartridge to θ-direction.

The mount base 27 moves together with the printed circuit board 29 carrying a control circuit for controlling the hand assembly 16, a motor and a sensor incorporated therein. The printed circuit board 29 carries the control circuit for controlling the motor for rotating the hand assembly 16 on an axis of the base 27.

The vertical column 18 holds a supporting plate 23 for supporting a roller 31 guided by the top rail.

FIGS. 4A and 4B are the illustration for explaining an X-directional motion mechanism.

With reference to FIG. 4A, the vertical column 18 holds a Y-axis motor 46 for reciprocating the supporting base 24 along the guide rail 22. The vertical column 18 is held by a rail base 32. The rail base 32 rotatably carries rollers 34a and 34b and rollers 36a and 36b. The rollers 34a and 34b nip the X rail 20 at one end of the rail base 32. The rollers 36a and 36b nip the X rail 20 at the other end thereof. A roller 38 is held by the rail base 32 to be in contact with the X rail 20. The roller 38 constitutes a frictional force adjusting mechanism.

An X-axis motor 42 is provided for moving the rail base 32 along the X rail 20. The X axis motor 42 is fixed to the rail base 32. A pinion 41 is fixed to an output shaft of the X-axis motor 42. The pinion 41 is meshed with a rack (not shown) attached to a housing to which the X rail is fixed.

A printed circuit board 40 is fixed to the rail base 32. The printed circuit board 40 is connected to a controller (not shown) provided within the housing 4 via an X cable 44. The printed circuit board 40 carries a control circuit for controlling the Y-axis motor 46 and the X-axis motor 42.

A position of an end portion 32b of the base 32 at which the rollers 34a and 34b are held is separated by a distance L from a center portion 32a of the base. In other words, as shown in FIG. 4B, the end portion 32b is located outside a circle of radius R having a center at a rotation center O of the hand assembly 16. The end portion 32b and the roller 34a are located at positions not interfering with a motion range of the hand assembly. The rail base 32 has a long wheel base. The Y-directional motion range of the hand assembly 16 is larger than that wherein the end portion 32b is positioned inside the motion range of the hand assembly 16. Accordingly, it is possible to increase the number of stages of the cells in the cell segment of the cell drum 10a and 10b, resulting in the increase in the number of cartridges to be accommodated therein.

Figure 5:
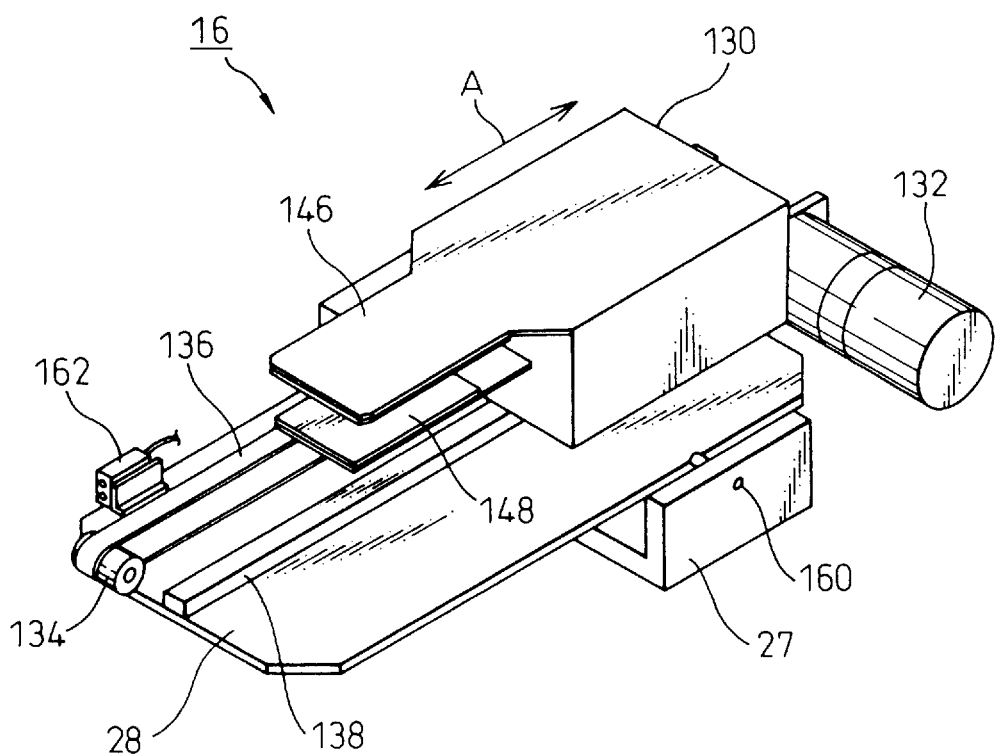
FIG. 5 is a diagrammatic perspective view of a hand assembly.

FIG. 5 is a diagrammatic perspective view of the hand assembly 16.

With reference to FIG. 5, the hand assembly 16 is provided with a base 28. The base 28 carries thereon a hand unit 130 having an upper hand 146 and a lower hand 148 to be movable between a forward position and a backward position.

The base 28 is rotatably mounted to a rotary shaft 160 held by the base 27. The base 27 carries a motor (not shown) for rotating the base 28 carrying the hand unit 130 on the rotary shaft 160. In other words, the base 28 carrying the hand unit 130 is rotatable on the rotary shaft 160 between a first inclined position and a second inclined position inclined at 5.5° and 12° relative to the base 27, respectively.

A motor 132 is mounted to a rear end of the base 28, for moving the hand unit 130. A pulley, not shown, is fixed to an output shaft of the motor 132. A pulley 134 is rotatably mounted to a front end of the base 28. A timing belt 136 is wrapped around the pulley fixed to the output shaft of the motor 132 and the pulley 134. The timing belt 136 is coupled to the hand unit 130.

When the motor 132 is driven, the torque of the motor is transmitted to the hand unit 130 via the timing belt 136 to operate the hand unit 130. The hand unit 130 is engaged in a sliding motion between the forward position and the backward position along a guide rail 138 provided on the base 28.

Since the timing belt is coupled to the hand unit 130, the hand unit 130 moves between the forward position and the backward position when the motor 132 is driven, as shown by an arrow A, while being guided by the guide rail 138.

A sensor 162 is provided at an end of the base 28 of the hand assembly 16. The sensor 162 is used for detecting the presence of the cartridge within the cell. As shown in FIG. 1, a sensor 163 is provided on the rail base 32 of the accessor 14. The sensor 163 is used for detecting a position flag 165 provided on the accessor unit 9.

Figure 6:
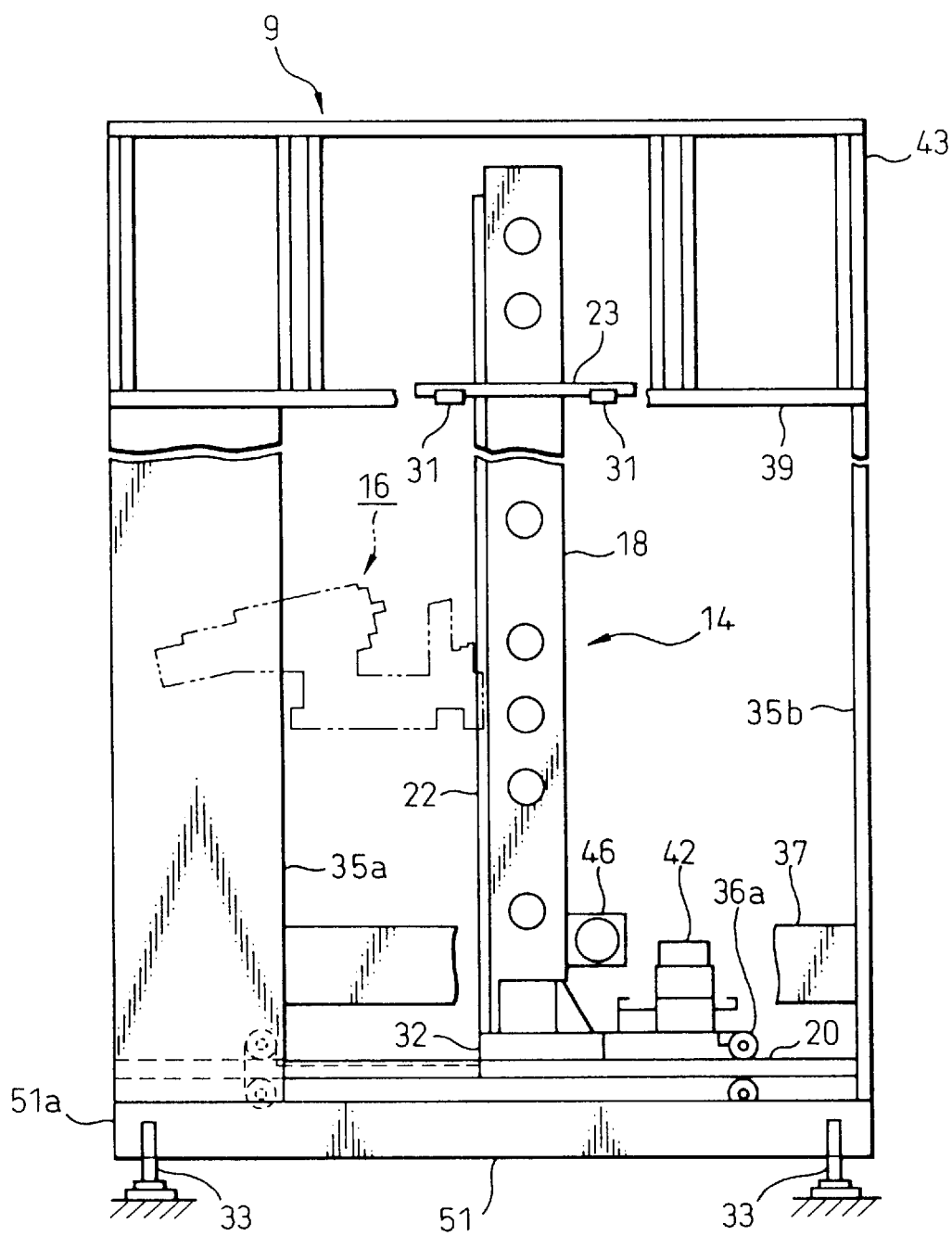
FIG. 6 is a side view of an accessor unit.

FIG. 6 is a side view of the accessor unit 9. The accessor unit 7 has the same structure as the accessor unit 9, except that the accessor 14 is attached to the accessor unit 7 in reverse to in the accessor unit 9.

Accordingly, the structure of the accessor unit 9 will be solely explained with reference to FIG. 6. In FIG. 6, the X rail 20 is fixed to a base 51. The base 51 is supported on the floor surface by footings 33. The base 51 holds pillars 35a and 35b. The pillars 35a and 35b are coupled with each other by a reinforcing bar 37 and the upper ends of the pillars are fastened together by a top panel 39. A cover 43 is attached above the top panel 39. An end surface 51a of the base 51 is used as a reference plane for the coupling with the passage unit 13 shown in FIG. 2.

Figure 7:
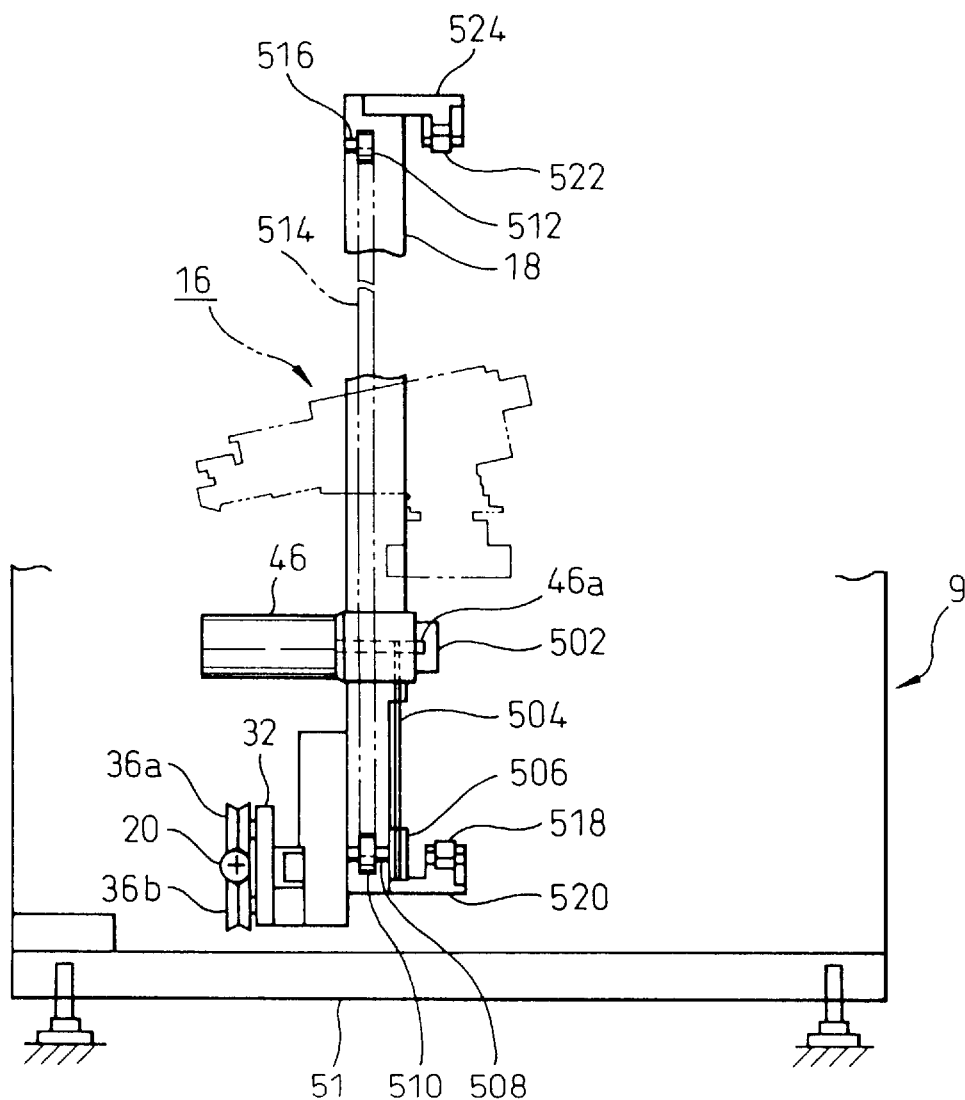
FIG. 7 is a back view of the accessor unit.

FIG. 7 is a back view of the accessor unit.

With reference to FIG. 7, the X rail 20 held by the base 51 of the accessor unit 9 is nipped by the rollers 36a and 36b supported by the rail base 32. The vertical column 18 is attached to the rail base 32. A unit including a motor 46 is fixed the vertical column 18, for moving the hand assembly 16 upward and downward along the guide rail 22 (see FIG. 6) of the vertical column 18. An electromagnetic brake (of a dry type TB/TBK manufactured by Miniature Bearing K.K.) 502 is fixed to one end of an output shaft 46a of the motor 46. The electromagnetic brake 502 allows the output shaft 46a of the motor to freely rotate when an electric source for supplying a power to the motor 46 is switched on, while inhibits the rotation thereof when the electric source is switched off. The output shaft 46a of the motor 46 is coupled to a pulley 506 via a belt 504. The torque of the pulley 506 is transmitted to a pulley 510 fixed to a shaft 508 common to the pulley 506. A torque of the pulley 510 is transmitted to the hand assembly 16 via a belt 514 wrapped around the pulley 510 and a pulley 512 rotatably held on a shaft 516 supported by the vertical column 18. The belt 514 is fixed to the base 24 (see FIG. 4A) of the hand assembly 16.

An arm 520 is attached to a lower end of the vertical column 18, for supporting an elastic stop 518 made, for example, of Neoprene rubber. Also, another arm 524 is attached to the lower end of the vertical column 18, for supporting an elastic stop 522 made, for example, of Neoprene rubber. These elastic stops 518 and 522 act as a stop for the hand assembly 16 when the motor 46 is out of control.

The hand assembly 16 can be secured on the vertical column 18 due to the braking action of the electromagnetic brake 502 even if the supply of the electric power for the library apparatus 2 is interrupted. If the electromagnetic brake 502 were not provided, the hand assembly 16 would fall down due to gravity to collide with the elastic stop 518. Such a collision between the hand assembly 16 and the elastic stop 518 can be avoided by providing the electromagnetic brake 502 even when the interruption of the power supply occurs, whereby the falling of the cartridges, from the hand assembly, can be prevented.

Figure 8:
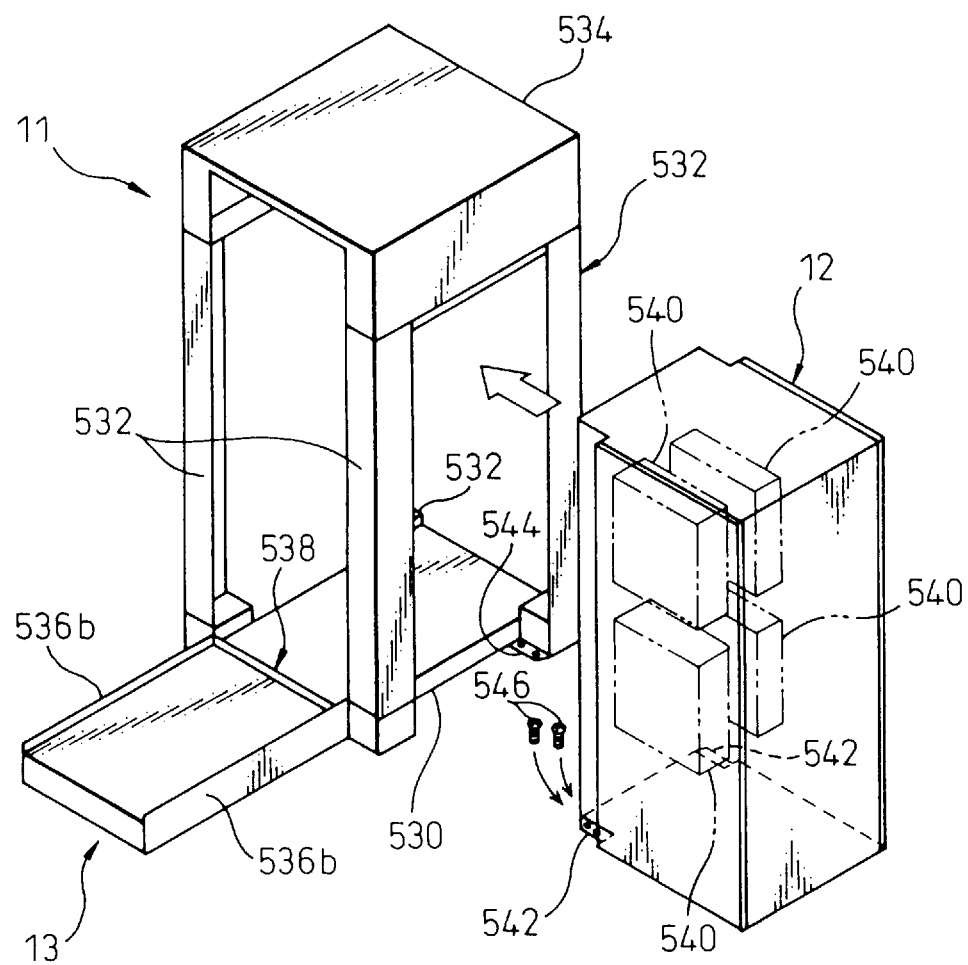
FIG. 8 is a perspective view for explaining the coupling between a reference unit and a drive unit.

FIG. 8 is an illustration for explaining a method for coupling the reference unit 11 and the drive units. In FIG. 8, the reference unit 11 includes a base 530 and four pillars 532. The pillars 532 are coupled to a top panel 534 at the upper ends thereof. The reference unit 11 of such a structure is used as a reference box. The passage unit 13 is attached to the base 530 of the reference unit 11. The passage unit 13 is provided with side panels 536a and 536b constituting a reference plane to be contiguous to the reference plane of the drum unit as described with reference to FIG. 2. An end surface 538 of the passage unit 13 defines a reference plane to be contiguous to those of the other passage units or the reference unit 11.

The drive unit 12 is coupled to the reference unit 11. Four tape drive units 540 are provided in the drive unit 12. The drive unit 12 has mounting members 542, while the reference unit 11 has a pair of mounting members 544 on the opposite sides thereof. The mounting members 542 of the drive unit 12 are fastened to the mounting members 544 of the reference unit 11 with screws 546. On the other side of the reference unit 11 opposite to the drive unit 12, another drive unit 12 is coupled. The coupling between the reference unit 11 and the latter drive unit 12 is carried out by fastening the mounting members 544 of the reference unit 11 to the mounting members 546 of the latter drive unit 12 by screws.

Figure 9:
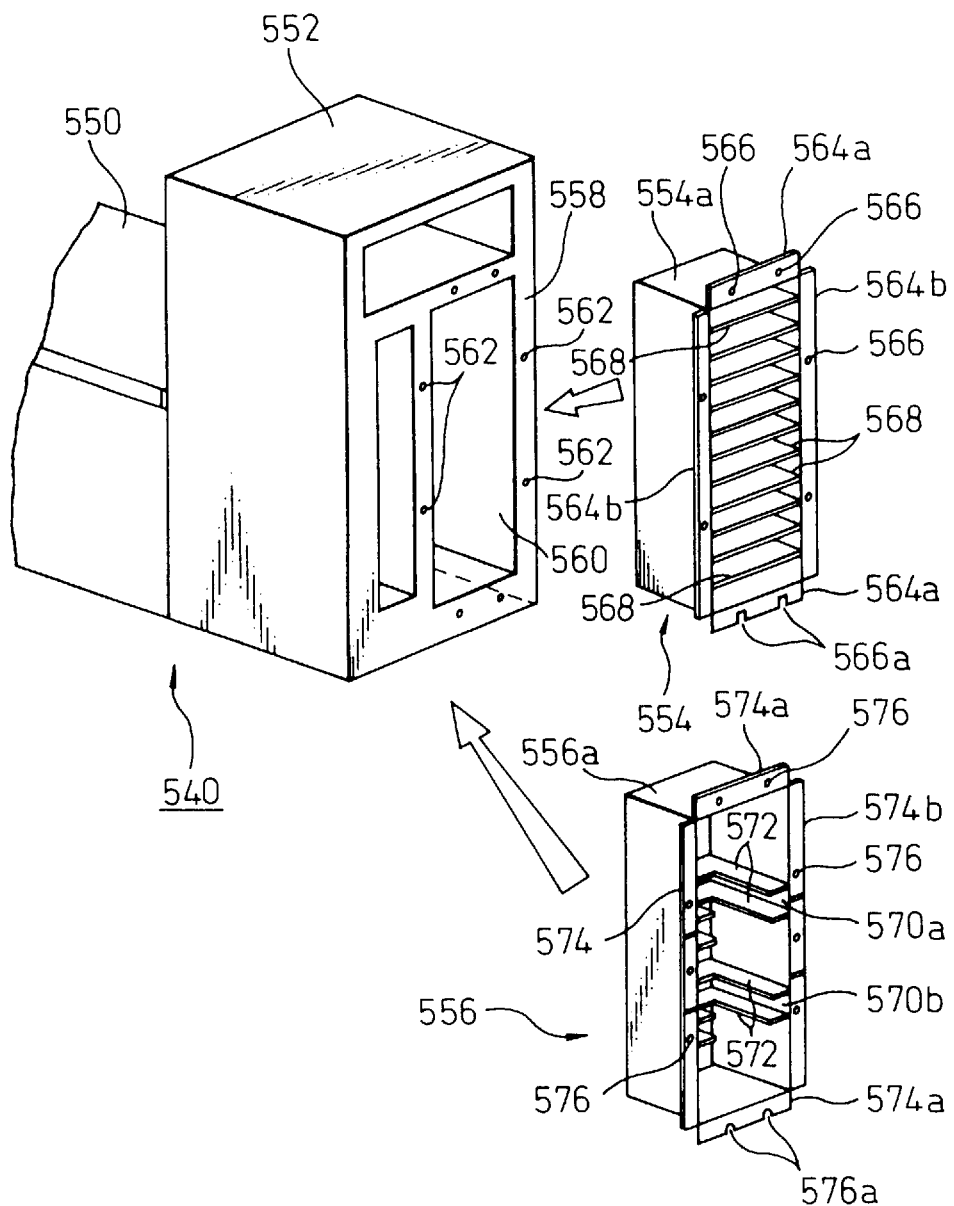
FIG. 9 is a perspective view for explaining a cartridge mount cell of a tape drive unit within the drive unit.

FIG. 9 is the illustration for explaining a cartridge mount cell of the tape drive unit within the drive unit.

A structure of a single tape drive unit 540 within the drive unit 12 shown in FIG. 8 is illustrated in FIG. 9. Any of the other tape drive units 540 has a similar structure.

With reference to FIG. 9, the tape drive unit 540 includes a tape drive 550 for carrying out the recording/regeneration of information to the magnetic tape accommodated in the cartridge and a cartridge feeder unit 552 for carrying out the entry/exit of the cartridge to the tape drive unit 550. In the cartridge feeder unit 552, one of a manual mount cell 554 and an accessor mount cell 556 is selectively mounted to a housing 558. The manual mount cell 554 or the accessor mount cell 556 is inserted through an opening 560 of the housing 558. Apertures 562 are formed on the housing 558 in the vicinity of the opening 560, for fastening the mount cell 554 or 556 with screws.

The manual mount cell 554 is provided with mounting members 564a and 564b. The mounting members 564a and 564b have apertures for fastening the manual mount cell 554 to the housing 558 of the cartridge feeder unit 552 by screws. The aperture 566a is open to the outside at one end thereof. The manual mount cell 554 is fastened to the housing 558 by screws after being inserted into the opening 560 of the housing 558.

The manual mount cell 554 has cells 568 within a housing 554a, arranged in twelve stages for accommodating cartridges. Since the insertion of the cartridge to the cell 568 is manually carried out by the operator, an arrangement pitch of the cell 568 in the manual mount cells 554 can be reduced.

On the other hand, the accessor mount cell 556 has cells 570a and 570b arranged in two stages, for accommodating the cartridge therein. Each of the cells 570a and 570b are formed by rack plates 572 in a housing 556a of the accessor mount cell 556. The cell 570a is an entry cell for inserting a cartridge by the accessor 14 described with reference to FIG. 1. The cell 570b is an exit cell for retaining a cartridge to be discharged from the cartridge feeder unit 552. The cartridge retained in the exit cell 570b is taken out by the accessor 14.

The accessor mount cell 556 is provided with mounting members 574a and 574b. The mounting members 574a and 574b have apertures 576 and 576a formed at positions coinciding with those of the apertures 562 in the housing 558 of the cartridge feeder unit 552. The aperture 576a is open to outside at one end thereof. The accessor mount cell 556 is fastened to the cartridge feeder unit 552 by screws via the mounting members 574a and 574b.

As described above, the drive unit 12 explained with reference to FIG. 8 is provided with the tape drive unit 540 carrying either one of the manual mount cell 554 and the accessor mount cell 556 described with reference to FIG. 9. The manual mount cell 554 and the accessor mount cell 556 can be replaced with each other. Accordingly, it is possible to realize an upgrade of the library apparatus 2 wherein the drive unit 12 has been solely installed by replacing the manual mount cell 554 in the tape drive unit 540 with the accessor mount cell 556. Also, as the drive unit 12 can be of a common structure, except for the manual mount cell 554 and the accessor mount cell 556, it is possible to reduce the manufacturing cost of the drive unit 12.

Figure 10:
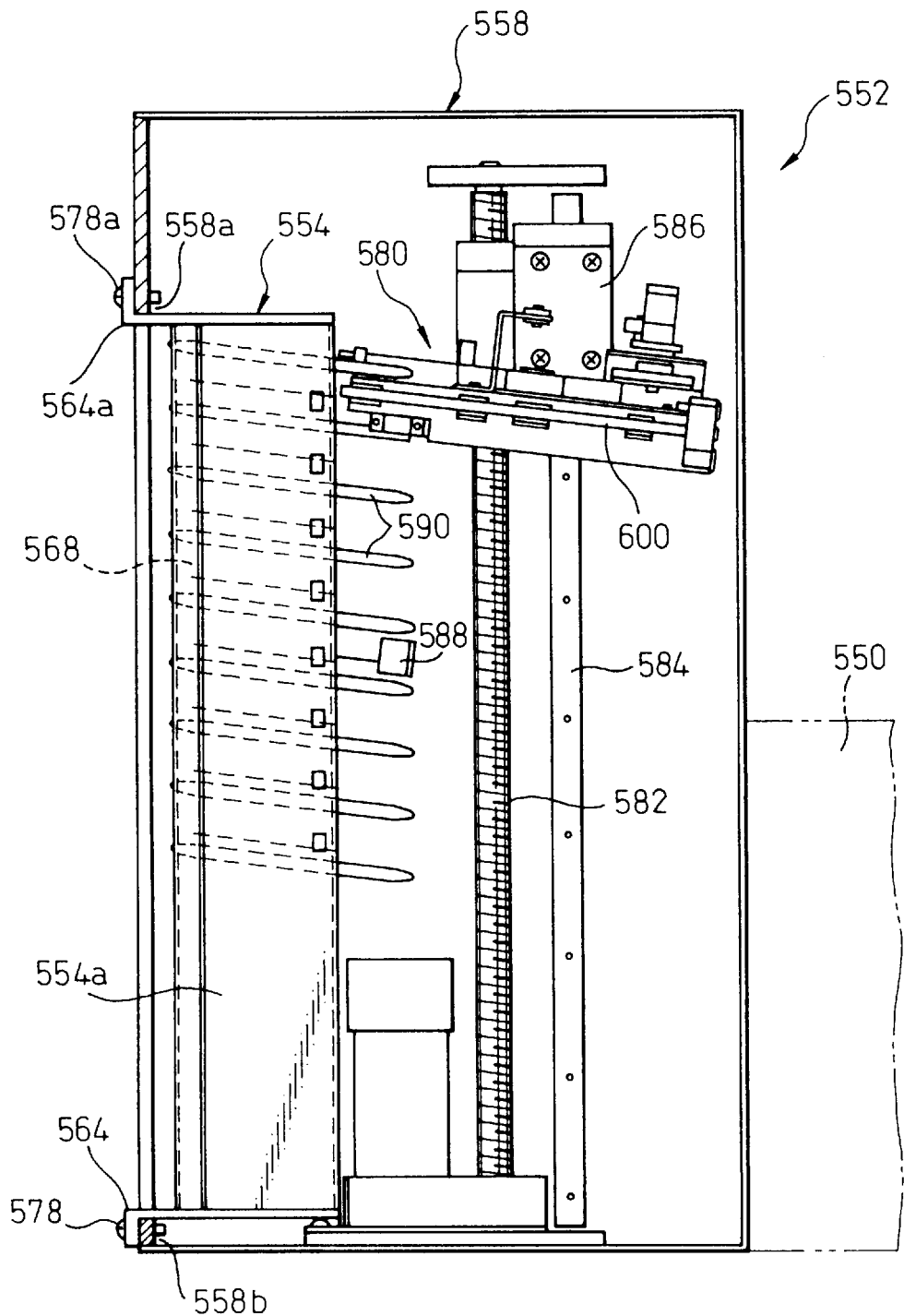
FIG. 10 is a side view for explaining an automatic cartridge-replacement mechanism within the tape drive unit.

FIG. 10 is the illustration for the explanation of an automatic cartridge-replacement mechanism.

In FIG. 10, the automatic cartridge-replacement mechanism is arranged within the cartridge feeder unit 552. The manual mount cell 554 is mounted to the cartridge feeder unit 552. The mounting members 564 of the manual mount cell 554 are fastened to mounting flanges 558*a* and 558*b* of the housing 558 of the cartridge feeder unit 552 by screws 578. The housing 558 supports a screw rod 582 for generating a conveying force for moving a cartridge feeder 580 and a guide rail 584 for guiding the cartridge feeder 580. The screw rod 582 allows the vertical reciprocation of the cartridge feeder 580 along the guide rail 584 by being driven to rotate by a motor 586.

The cartridge feeder 580 transports a cartridge 588 from the cell 568 to the cartridge entry/exit opening of the tape drive unit 550, and from the tape drive unit 550 to the cell 568.

Each of the cells 568 in the manual mount cell 554 is defined within the housing 554*a* thereof by rack plates 590 sloped at an angle of 5.5° relative to a horizontal plane. Similarly, the cartridge feeder 580 is sloped at an angle of 5.5° relative to a horizontal plane.

Figure 11:
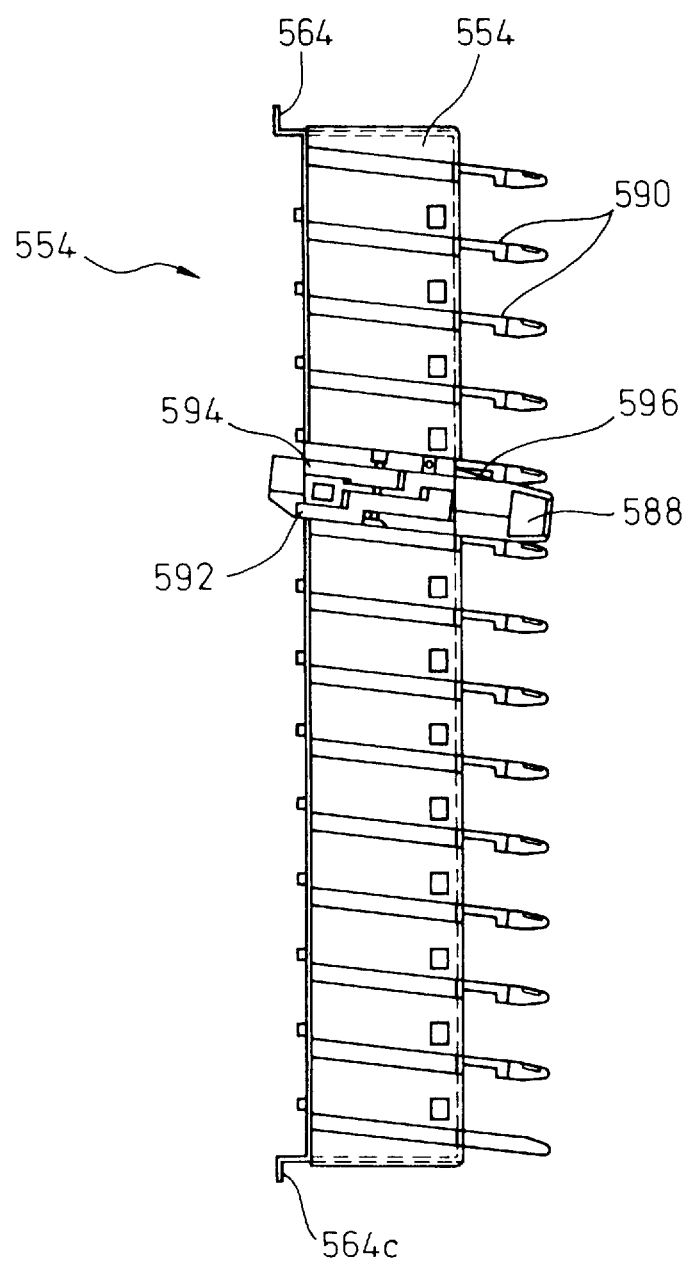
FIG. 11 is a side view of a manual mount cell used as means for storing cartridges.

FIG. 11 is a side view of the manual mount cell 554 for accommodating the cartridge.

The manual mount cell 554 is provided with a latch mechanism 592 for positioning the cartridge 588, a mechanism 594 for preventing the mis-insertion of the cartridge 588 and a door 596 rotating upon the entry/exit of the cartridge 588. The latch mechanism 592, the mis-insertion preventing mechanism 594 and the door 596 are biased inward of the cell by means of coil springs not shown.

Figure 12:
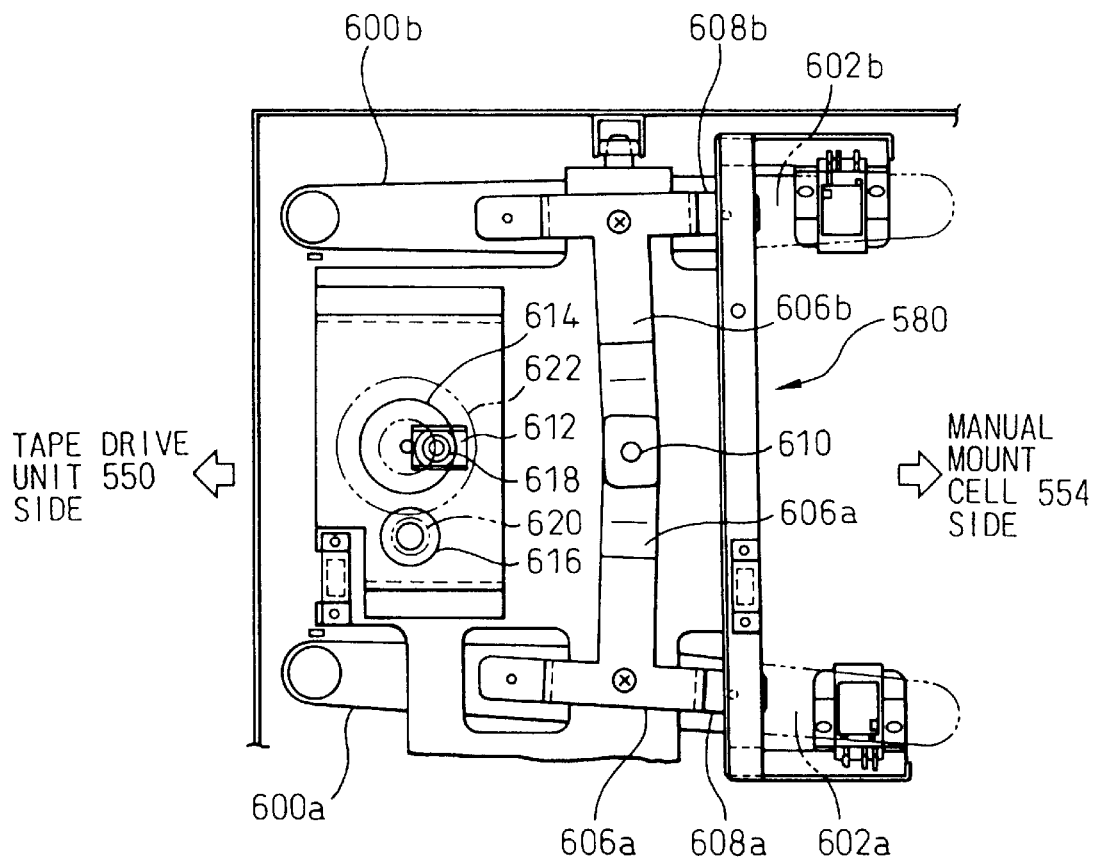
FIG. 12 is a plan view of a cartridge feeder.

FIG. 12 is a plan view of the cartridge feeder 580 to be built into the cartridge feeder unit 552, and FIG. 13 is a side view of the cartridge feeder 580.

The cartridge feeder 580 is provided with endless belts 600*a* and 600*b* driven by a motor. The endless belts 600*a* and 600*b* are wrapped around pulleys 604*a* and 604*b* rotatably held by arms 602*a* and 602*b*, respectively. The arm 602*a* is fixed to a mounting part 608*a* of a plate 606*a* by screws. The arm 602*b* is fixed to a mounting part 608*a* of a plate 606*b* by screws. The plates 606*a* and 606*b* are rotatably coupled to each other by a pin 610.

The pin 610 is provided to penetrate a hole formed at one end of a plate 612. Another pin 618 provided on a disk 614 penetrates a hole formed at the other end of the plate 612. A torque of a motor 616 is transmitted to the disk 614 via gears 620 and 622 fixed to an output shaft of the motor 616. Since a gap between the endless belts 600*a* and 600*b* on the side of the manual mount cell 554 is reduced when the disk 614 is located at a position shown in FIG. 12, the cartridge 588 carried on the manual mount cell 554 is transported to the tape drive unit 550. On the other hand, when the disk 614 rotates by 180° from the position shown in FIG. 12, the plate 612 is pulled leftward to rotate the plates 606*a* and 606*b* on the pin. Accordingly, since a gap between the endless belts 600*a* and 600*b* on the side of the tape drive unit 550 is reduced, the cartridge 558 is transported from the tape drive unit 550 to the manual mount cell 554.

Figure 14A:
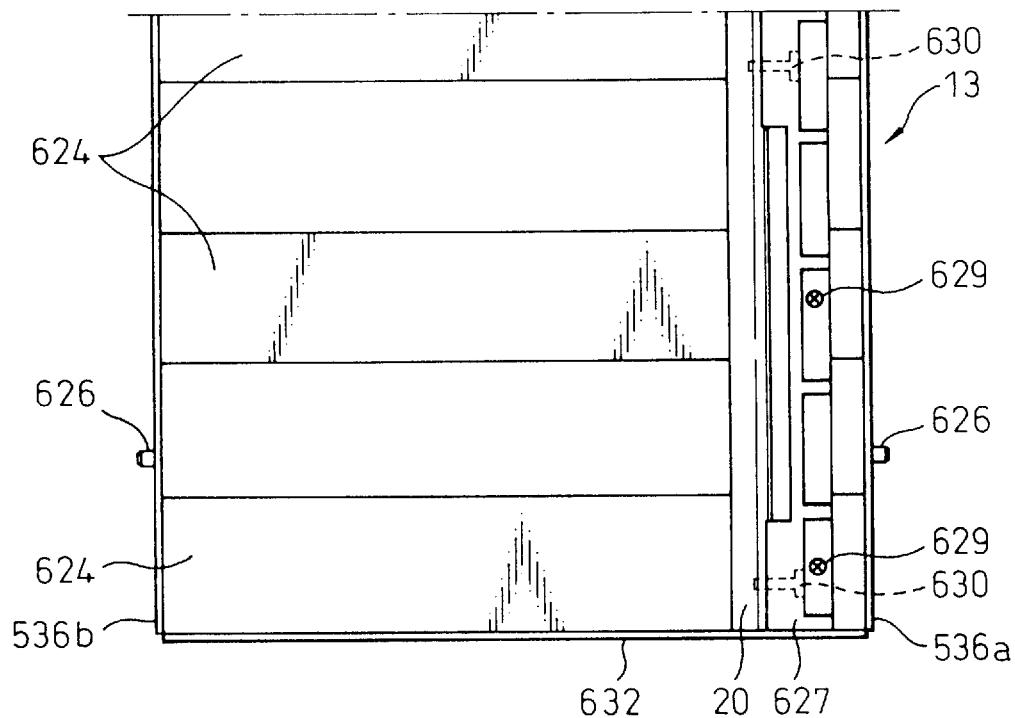
FIG. 14A is a plan view for explaining a passage unit.
Figure 14B:
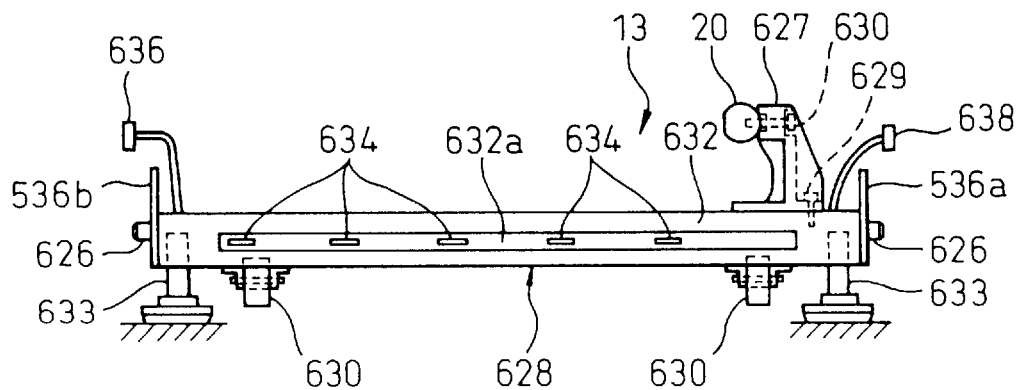
FIG. 14B is a side view for explaining a passage unit.
Figure 15:
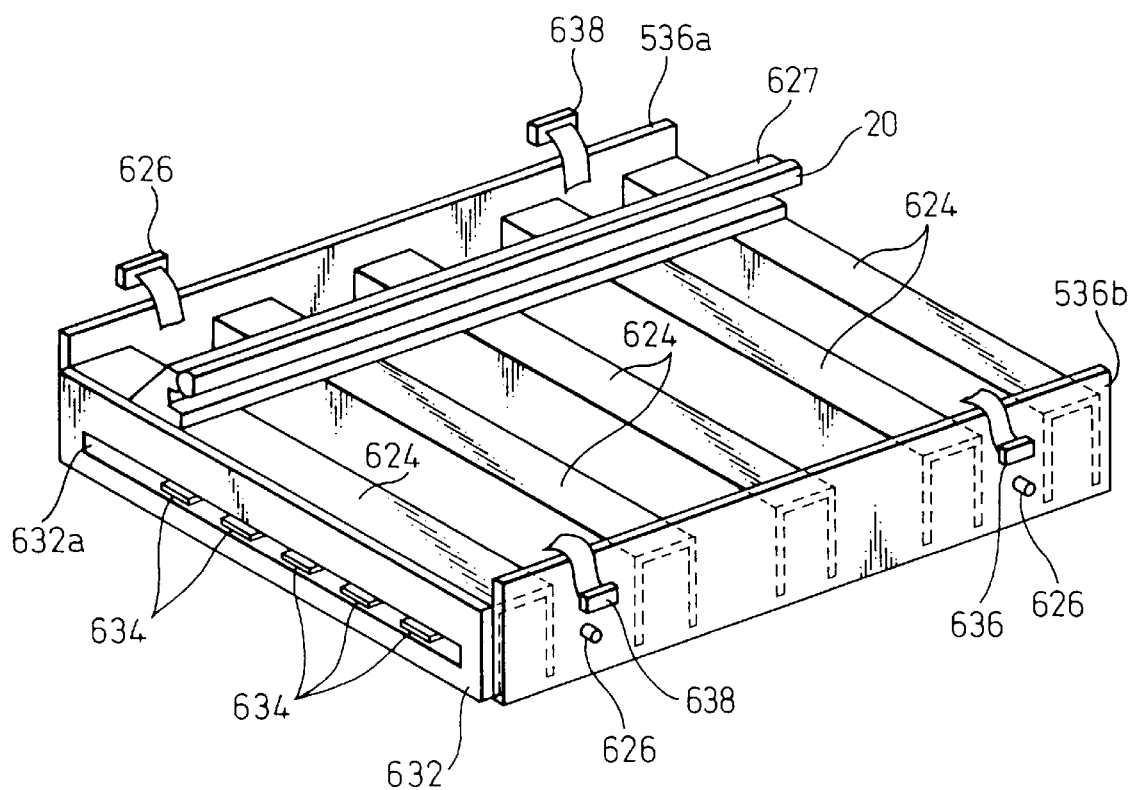
FIG. 15 is a perspective view of the passage unit.

FIGS. 14A and 14B are the illustration for explaining the passage unit 13, wherein FIG. 14A is a plan view and FIG. 14B is a side view. FIG. 15 is a perspective view of the passage unit 13.

The passage unit 13 is provided with side panels 536*a* and 536*b* defining a reference plane for the coupling with the drum unit 10. The side panels 536*a* and 536*b* are coupled with each other by connecting panels 624. Each of the side panels 536*a* and 536*b* has positioning pins 626 for positioning the same when being coupled to the drum unit 10. Four casters 630 and four footings 633 are fixed to a bottom panel 628 of the passage unit 13. On the upper surface of the connecting panels 624, a rail carrier 627 for supporting the X rail 20 is fastened by screws 629. The X rail 20 is fixed to the rail carrier 627 by screws 630.

A surface plate 632 to be used as a surface for the coupling with other passage units 13 is attached to a front surface and a back surface of the passage unit 13, respectively. The surface plate 632 defines a reference plane 538. Connectors 634 are arranged in an opening 632*a* of each the front and back surface plates 632, for the connection with signal cables wired to penetrate the surface plate 632 and the connecting panel 632.

A power source connector 636 for supplying the electric power to the drum unit 10 and a connector 638 for transmitting control signals to the drive unit 10 are withdrawn outside the passage unit 13 through a gap between the connecting panels 624.

Figure 16:
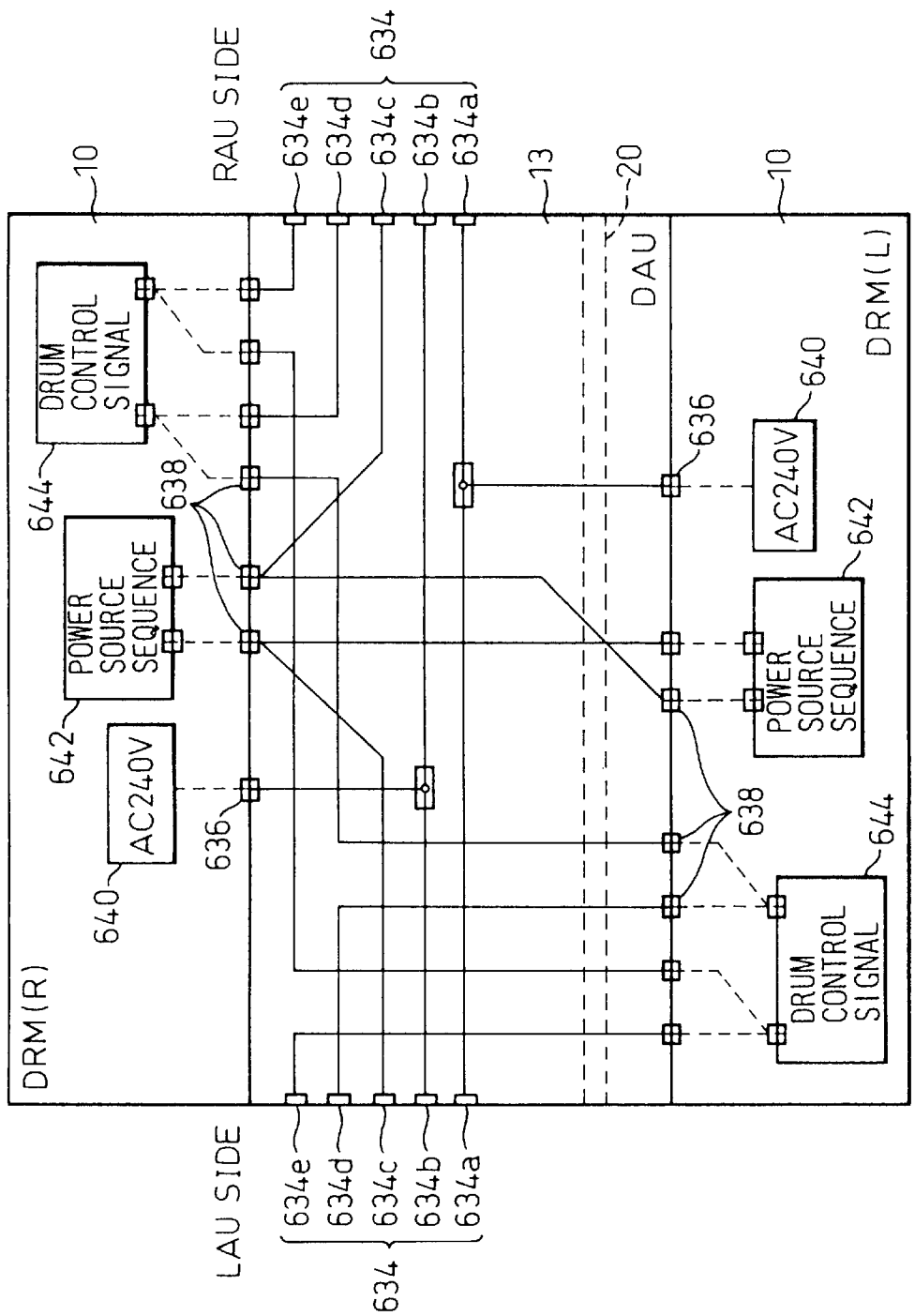
FIG. 16 is a wiring diagram for explaining the connection of signal cables in the passage unit and the connection thereof with the drum unit.

FIG. 16 is the illustration for explaining the wiring of signal cables in the passage unit 13 and the drum unit 10.

In the drawing, the passage unit 13 is coupled on the respective side thereof with the drum unit 10.

The drum unit 10 is provided with an AC power source 640, a power source sequence control circuit 642 and a drum control circuit 644. Among the connectors 634 in the passage unit 13, the connectors 634*a* and 634*b* supply an electric power from the power source provided in the housing 4 of the library apparatus 2 to the AC power source 640 via the connector 636. A connector 634*c* transmits a power source control signal from a power source controller provided in the housing 4 of the library apparatus 2 to the power source sequence control circuit 642. A connector 634*d* transmits a control signal from a controller for controlling the accessor 14 provided in the accessor unit 9 to the drum control circuit 644. A connector 634*e* transmits a control signal from a controller for controlling the accessor 14 provided in the accessor unit 7 to the drum control circuit 644. The connector 638 connects signal cables connected to the connectors 634*c* through 634*e* to the power source sequence control circuit 642 and the drum control circuit 644.

Figure 17:
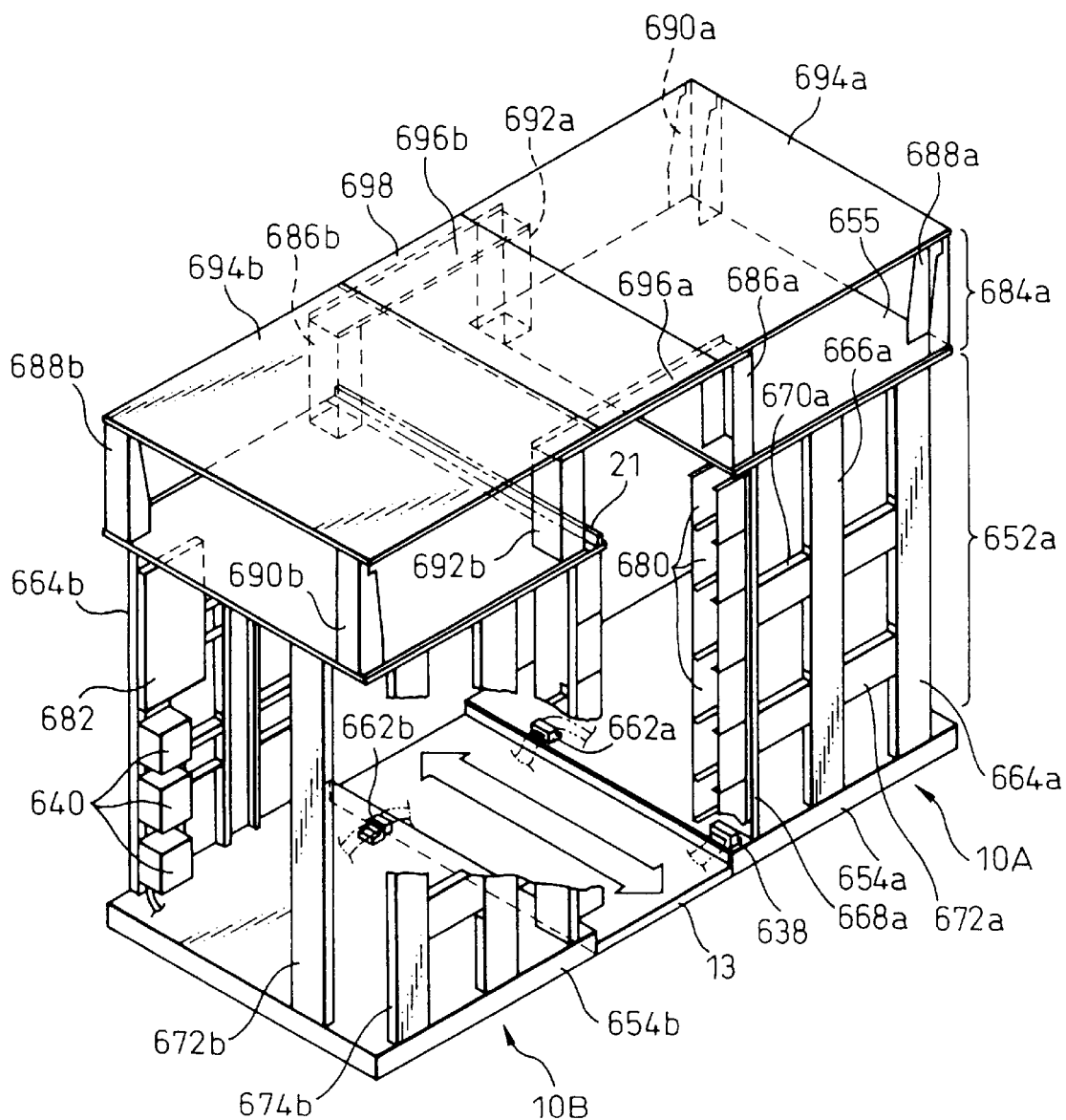
FIG. 17 is a view illustrating the coupling between the drum unit and the passage unit.
Figure 18:
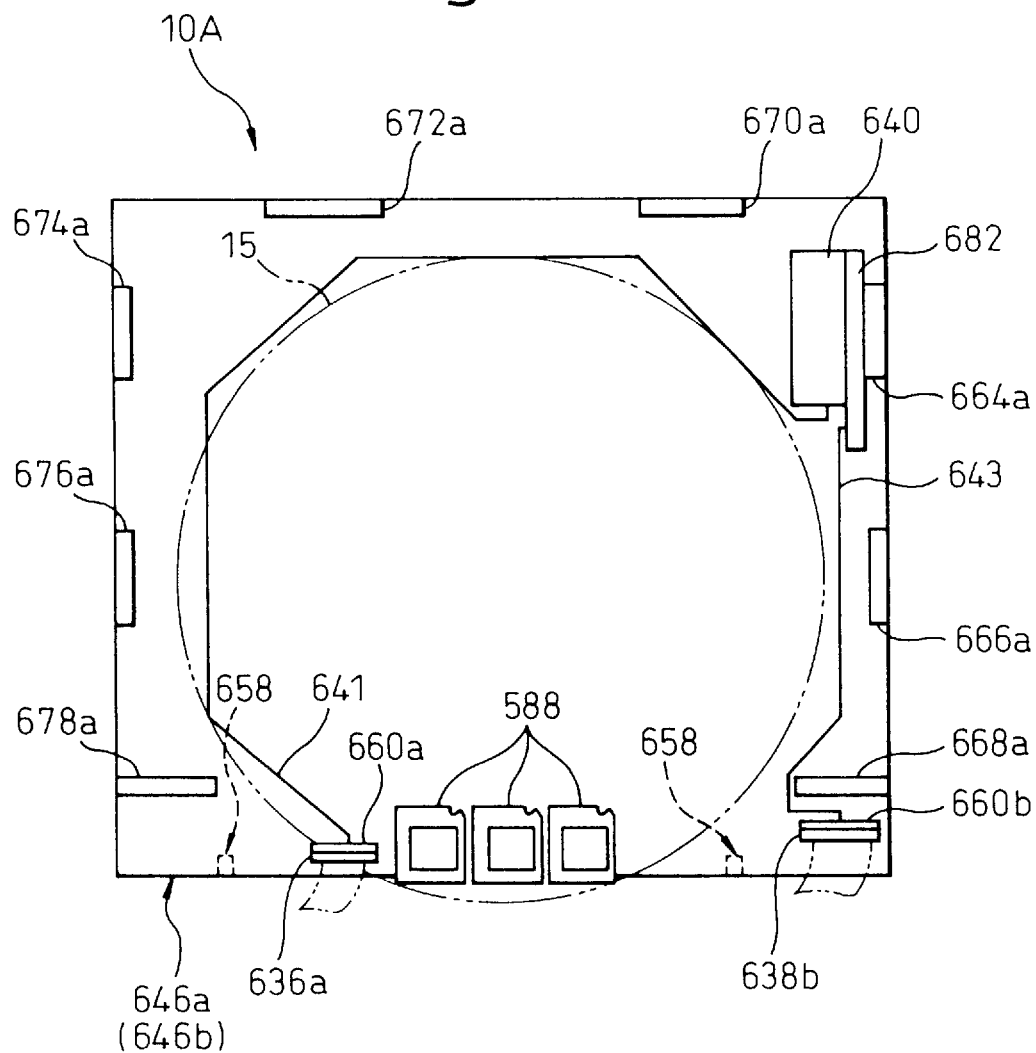
FIG. 18 is a plan view of the drum unit.
Figure 19:
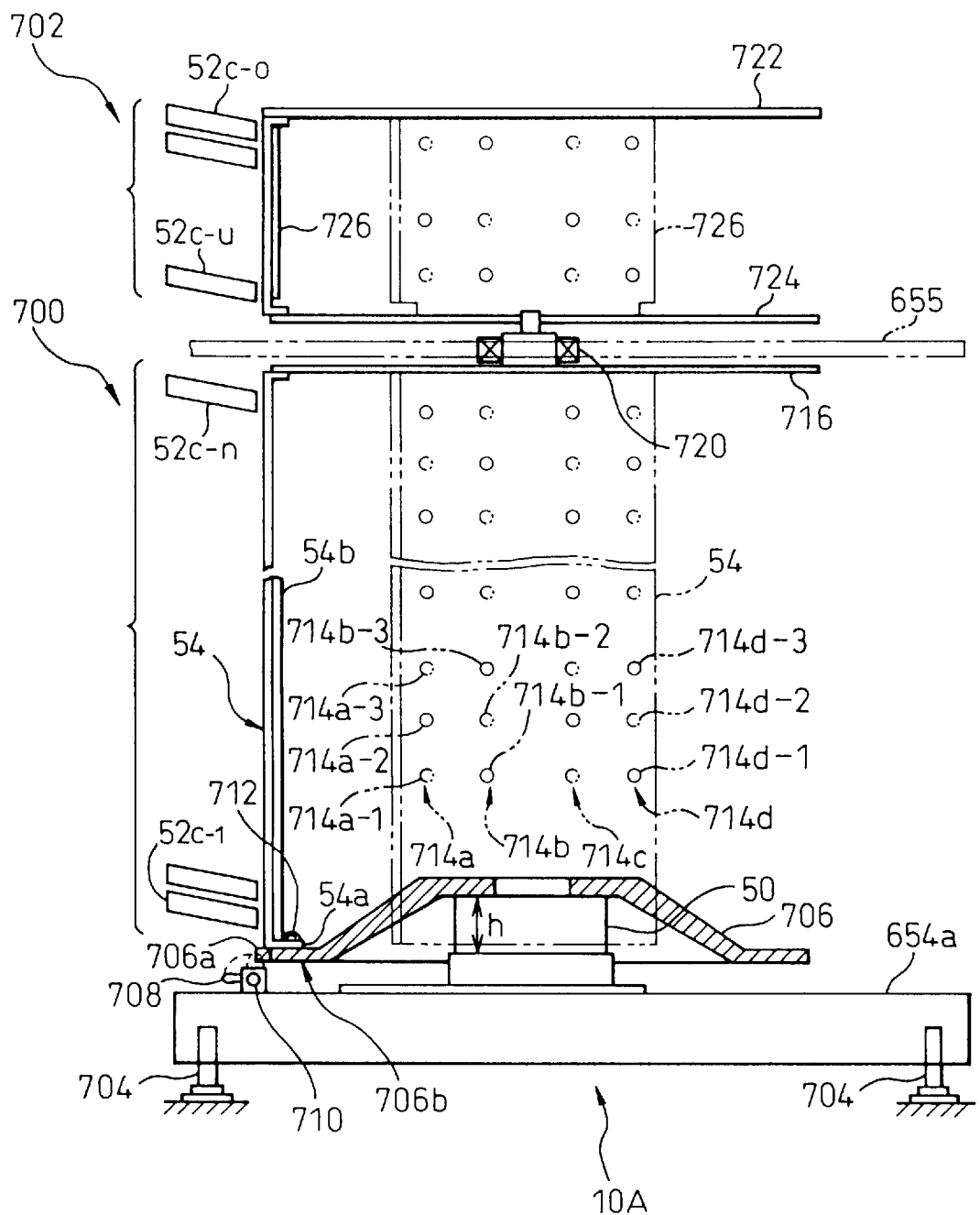
FIG. 19 a side sectional view of the drum unit.
Figure 20:
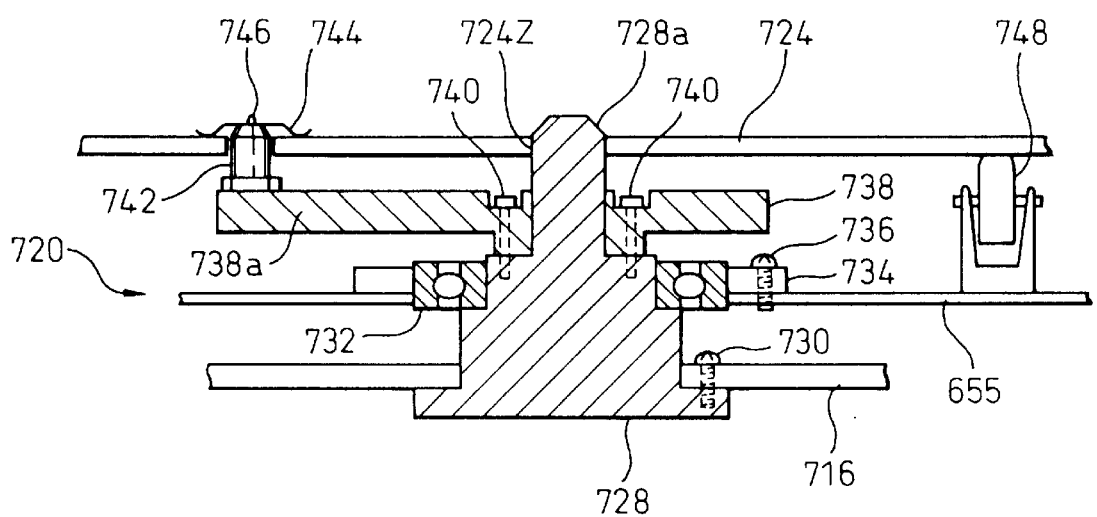
FIG. 20 is a side sectional view of a coupling mechanism between upper and lower units of the drum unit.
Figure 21:
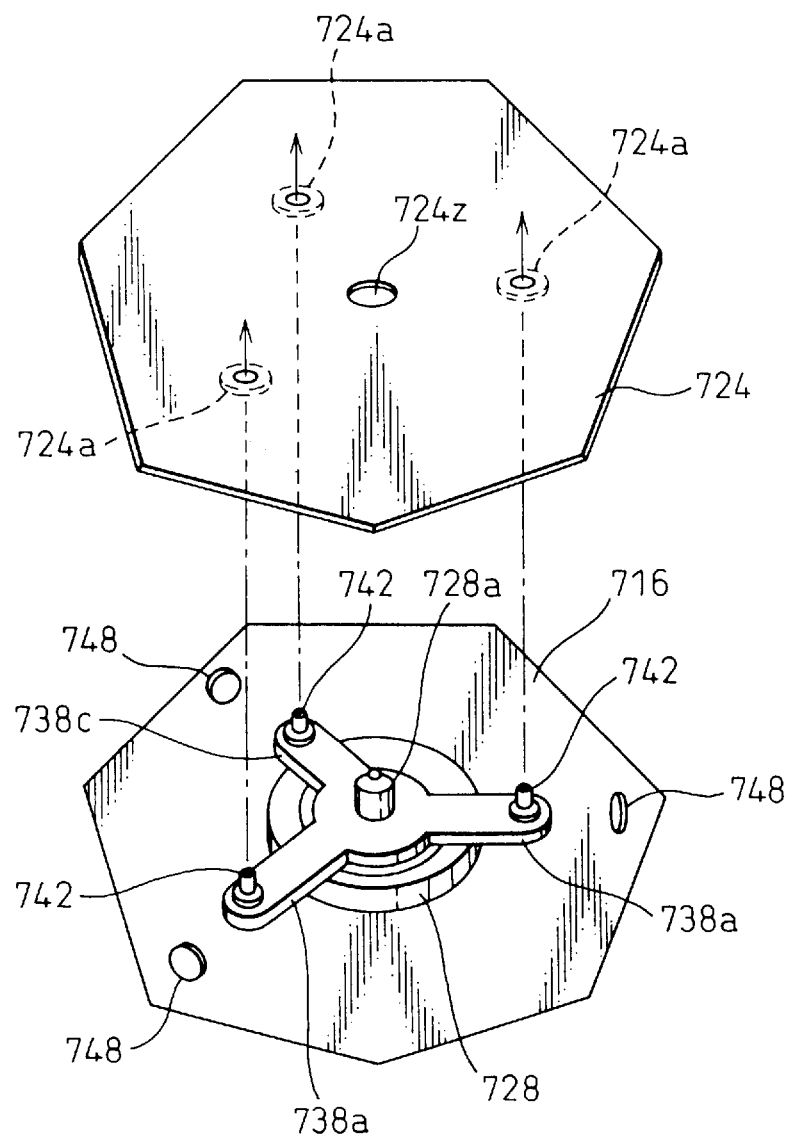
FIG. 21 is a perspective view for illustrating a method of phase-alignment of the coupling mechanism.
Figure 22:
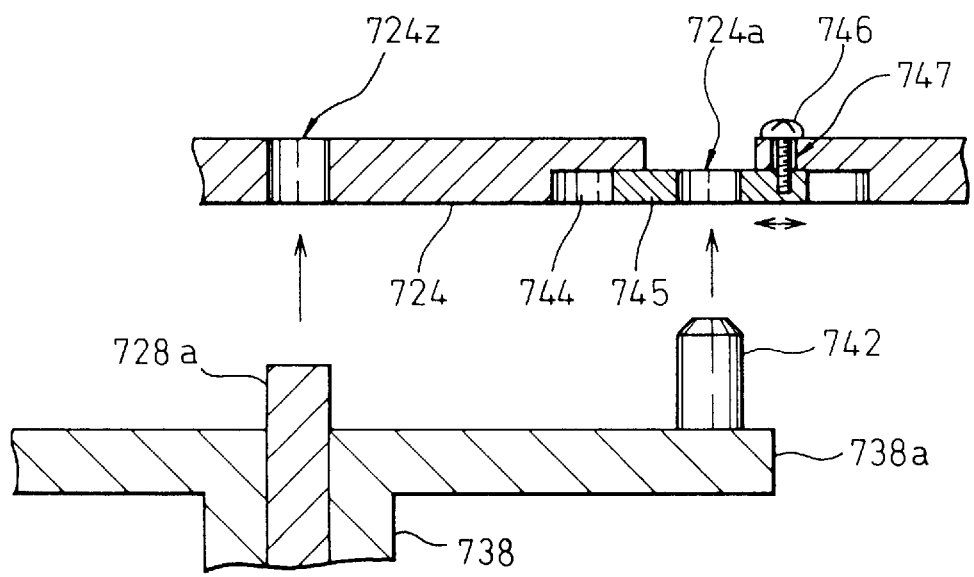
FIG. 22 is a side sectional view of a coupling area of the coupling mechanism.

FIG. 17 illustrates a coupling state between the drum unit 10 and the passage unit 13, FIG. 18 is a plan view of the drum unit 10, FIG. 19 is a side sectional view of the drum unit 10, FIG. 20 is the illustration for explaining a mechanism for coupling upper and lower units of the drum unit, FIG. 21 is the illustration for explaining the phase alignment of the coupling mechanism in FIG. 20, and FIG. 22 is the illustration for explaining the connection part of the coupling mechanism in FIG. 20.

The drum units 10A and 10B are coupled, respectively, to both sides of the passage unit 13 after the passage unit 13 has been coupled to the reference unit 11. In this regard, since the drum units 10A and 10B have the same structure, the explanation will be made solely on the drum unit 10A and that of the drum unit 10B will be added as necessary.

With reference to FIG. 17, the passage unit 13 is located at a center. On the respective sides of the passage unit 13 are arranged the drum units 10A and 10B, respectively. In the drum unit 10A, a front end surface 646*a* (646*b*) of a base 654*a* of a lower unit 652*a* is brought into contact with the side panel 536*b* of the passage unit 13. While, in the drum unit 10B, a front end surface 656*a* of a base 654*b* of a lower unit 652*b* is brought into contact with the side panel 536*a* of the passage unit 13. The positioning between the passage unit 13 and the drum unit 10A is carried out by the insertion of the positioning pin 626 of the passage unit 13 into a positioning hole 658 of the drum unit 10A. Connectors 660*a* and 660b provided in the drum unit 10A are coupled to the connectors 636 and 638, respectively, provided in the passage unit 13. The connector 660a is held by the base 654a of the drum unit 10A via a connector supporting plate 662a.

The positioning and the connector connection between the drum unit 10B and the passage unit 13 are carried out in a similar manner as in the drum unit 10A. In this regard, connectors in the drum unit 10B are held on a base 654b of the drum unit 10B via a connector supporting plate 662b.

In the lower unit 652a of the drum unit 10A, a plurality of pillars 664a, 666a, 668a, 670a, 672a, 674a, 676a and 678a are held on a base 654a. The pillars 664a, 666a and 668a are coupled to each other with beams 670a and 672a. A top panel 655 is provided above the lower unit 652a of the drum unit 10A. The drum unit 10A is provided with the drum 15 of a heptagonal cross-section as described with reference to FIG. 1. The respective surface thereof has cells arranged in three rows. Within the respective cell, the magnetic tape cartridge 588 of Type 13480 is accommodated. Other than the drum 15, the drum unit 10A is provided with fixed cells 680a. The pillars 668a and 678a support a plurality of cells 680 formed from a rightside cell unit and a leftside cell unit as stated later.

The drum unit 10A is provided with a printed circuit board 682 carrying the power source 640, the power source sequence control circuit 642 and the drum control circuit 644. The power source 640 and the printed circuit board 682 are fixed to the pillar 664a. The power source 640 is connected to the connector 660a via a power source line 641. The printed circuit board 682 is connected to the connector 660b via a signal line 643.

The upper unit 684a of the drum unit 10A includes pillars 686a, 688a, 690a and 692a and a top cover 964a. The drum units 10A and 10B are coupled to each other with a connecting bar 696a to which are integrally fixed the pillar 686a of the drum unit 10A and a pillar 692b of the drum unit 10B and a connecting bar 696b to which are integrally fixed the pillar 692a of the drum unit 10A and a pillar 686b of the drum unit 10B. After being coupled by the connecting bars 696a and 696b, a top panel 698 is fixed to the connecting bars 696a and 696b with screws. Thereafter, the top cover 964a is fixed to the pillars 686a and 692a with screws.

The drum unit 10B holds the top rail 21 for guiding the vertical column 18 of the accessor 14.

The lower unit 652a of the drum unit 10A supports a drum 700 as shown in FIG. 19. Also, the upper unit 684a is provided with an upper drum 702 rotatable together with the drum 700.

The base 654a of the lower unit 652a of the drum unit 10A is provided with four footings 704. The base 654a has a drum motor 50. An output shaft of the drum motor 50 is coupled to a drum base 706. The drum base 706 is of a cup shape. The drum base 706 of a cup shape is coupled to the drum motor 50 in the upside-down state. Accordingly, the drum base 706 is capable of accommodating the drum motor 50 within a height h of the drum base 706. This reduced height h contributes to the increase in the number of cells.

The drum base 706 is provided with a cutout portion 706a. The base 654a supports a lock lever 708 to be rotatable on a shaft 710. When the drum unit 10a is transported, the lock lever 708 is located at a position to be engageable with the cutout portion 706a. During the use of the drum unit 10A, the engagement between the lock lever 708 and the cutout portion 706a is released.

Seven flat panels 54 are fastened to a flange 706b of the drum base 706 with screws. The flat panel 54 has a flange 54a on a lowermost edge thereof. The flange 54a is fixed to the flange 706b of the drum base 706 with screws 712. The flat panel 54 has a flange 54b on one lateral edge thereof. The flange 54b is fastened to another flat panel with screws while being overlapped with an end surface of the other flat panel. A leftside cell unit 240, two central cell units 242a and 242b and a rightside cell unit 244 are attached to the flat panel 54-2 to form cells. Positioning pins provided on back surfaces of these cell units are inserted into rows of holes 714a, 714b, 714c and 714d. Cartridges 52c-1 through 52c–n are accommodated within cells in a middle row of three rows supported on the flat panels 54.

The seven flat panels 54 are coupled with the flange 706b of the drum base 706, respectively, and also fixed to a top panel 716. The drum 700 is assembled in such a manner. The assembly is carried out in a factory.

A drum 702 of the upper unit 684a of the drum unit 10A is coupled to the drum 700 of the lower unit 652a via a coupling mechanism 720. The drum 702 includes an top panel 722 and a bottom panel 724. The top panel 722 and the bottom panel 724 are coupled with each other with seven flat panels 726. The drum 702 has a heptagonal cross-section similar to the drum 700. A leftside cell unit 240, two central cell units 242a and 242b and a rightside cell unit 244 are attached to the flat panels 726 to form cells, similar to the drum 700. Cartridges 52c–o through 52c–u are accommodated within cells in a middle row of three rows of cell.

The drums 700 and 702 are coupled with each other via the coupling mechanism 720 to be rotatable together. As shown in FIG. 20, a stud 728 is fixed to the top panel 716 of the drum 700 with screws 730. An end section 728a of the stud 728 is inserted into a hole 724z of the bottom panel 724 of the drum 702. A bearing 732 is fixed to the top panel 655 via a bearing holder 734 with screws 736. The stud 728 is rotatable via the bearing 732. A connecting arm 738 is secured to the end section 728a of the stud 728 with screws 740. As shown in FIG. 21, the connecting arm 738 is provided with three arms 738a. At an end of the respective arm 738a, a pin 742 is projected. The pin 742 is inserted into a hole 724a of the bottom panel 724. At an end of the pin 742, a blade spring 744 is secured by a screw 746, as shown in FIG. 20. The blade spring 744 operates so that the top panel 724 is prevented from being dismounted from the stud 728 due to the vibration caused by, for example, an earthquake. Also as shown in FIGS. 20 and 21, three wheels 748 are secured to the top panel 655. The wheels 748 support a weight of the drum 702. Since the weight of the drum 702 is supported by the top panel 655, a weight load on the drum motor 50 can be mitigated.

The end section 728a of the stud 728 is inserted into the hole 724z of the bottom panel 724. The pin 742 provided at the end of the arm 738a is inserted into a corresponding hole 724a of the bottom panel 724 of the drum 702. Angles made between every pair of the adjacent arms 738a are different from each other. Accordingly, it is impossible for all of the pins 742 to be inserted into the holes 724a unless the positional relationship is correctly adjusted between the pin 742 projected at the end of the arm 738a and the hole 724a of the bottom panel 724.

As shown in FIG. 22, a slide plate 745 is provided in the respective hole 724a. The slide plate 745 is inserted into a groove 743 provided in the bottom panel 724, to be movable therein. The slide plate 745 is fixed by a screw 746 after the pin 742 projected from the end of the arm 738a has been inserted into the hole 724a. The screw 746 is movable within an elongated hole 747.

The drums 700 and 702 are attached after the flat panel 54 of the drum 700 and the flat panel 726 of the drum 702 have been positioned to be flush with each other in the same plane while using a jig.

Next, the structure of the drum units 10a and 10b enabling the direct entry/exit (DEE) of the cartridge by the operator will be explained. The drum units 10a and 10b have a DEE door 64.

Figure 23:
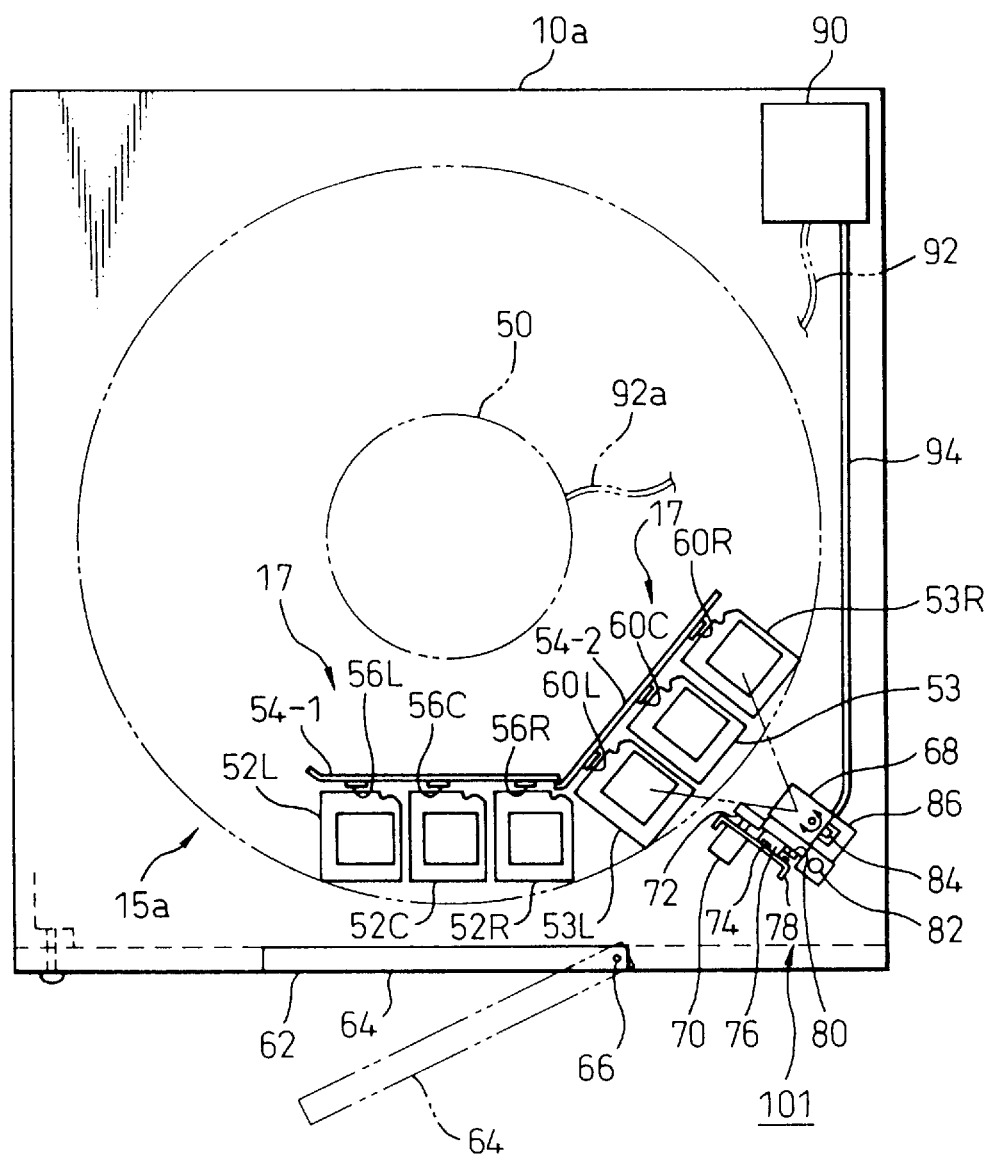
FIG. 23 is a top view of a drum unit with a DEE door.
Figure 24:
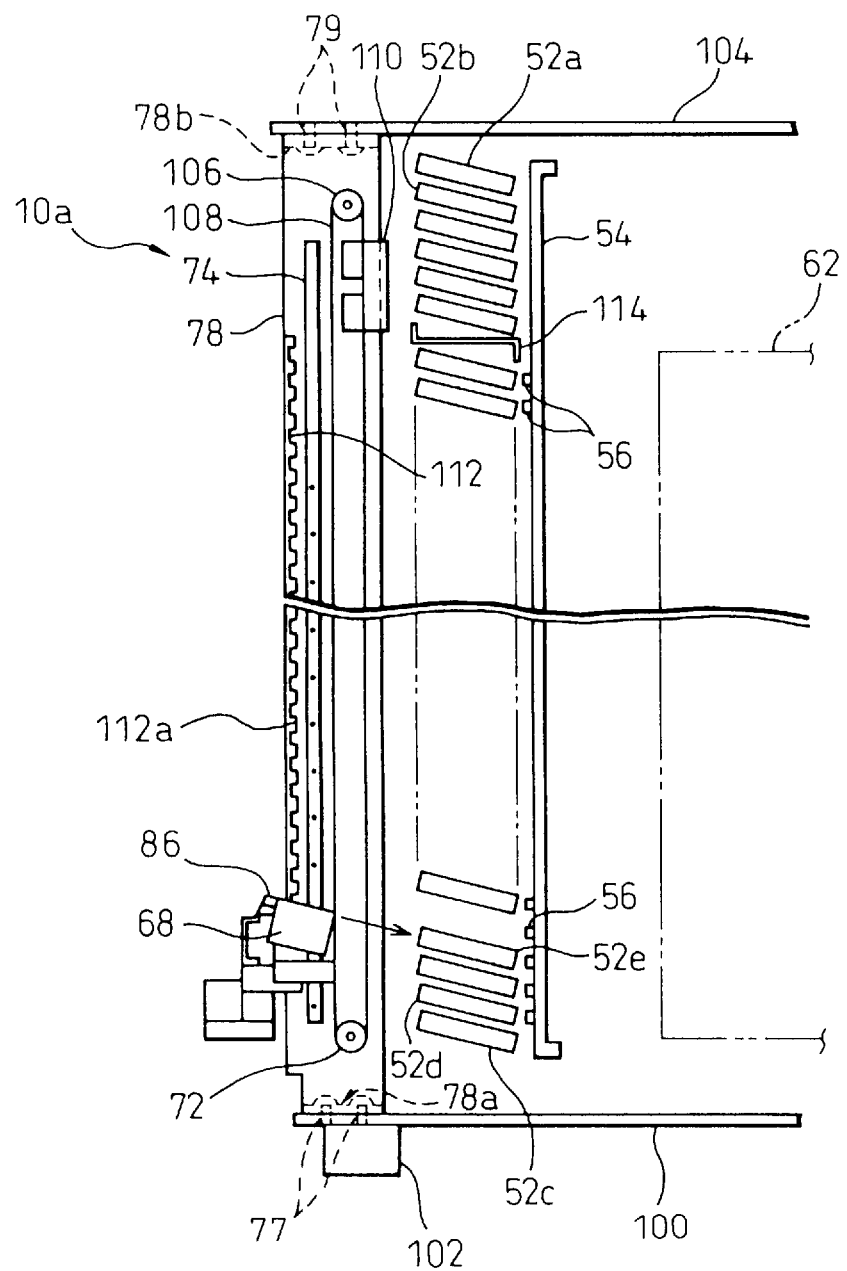
FIG. 24 is a side sectional view of the drum unit with the DEE door.

FIG. 23 is a top view of the drum unit 10a with DEE door, and FIG. 24 is a side sectional view thereof.

In the drawings, the drum unit 10a has the DEE door 64 rotatable on a hinge 66. A solid line shows a state wherein the door 64 is closed to the drum unit 10a, while chain line shows a state wherein the door 64 is open to the drum unit 10a. The door 64 is provided in a DEE window 62 formed on a front decorative panel of the drum unit 10a.

A cell drum motor 15a is driven by a motor 50. Seven flat panels are coupled with the cell drum 15a of a heptagonal cross-section. In FIG. 23, two (54-1, 54-2) of the seven flat panels 54 are illustrated. FIG. 24 shows two of the seven surfaces of the cell drum 15a of the drum unit 10a. Each surface of the cell drum 15a corresponds to one of cell segments. Each of the flat panels 54-1 and 54-2 has cells arranged at n stages while forming three rows. The respective cell on the flat panel 15-1 accommodates cartridges 53L, 53C and 53R. Cells in the cell drum 15a are formed by a plurality of combinations of a rightside cell unit 244, central cell units 242a and 242b and a leftside cell unit 240 as shown in FIG. 43 stated later, which are then attached to the respective flat panels of the cell drum 15a, to be arranged at n stages while forming three rows. Also, each of the cells in the cell drum 15a is attached to the flat panel at a position sloped upward from a horizontal plane at an angle of 12°. This inclination angle is determined so that the cell is prevented from being ejected out of the cell due to the vibration caused by, for example, an earthquake.

During the entry of the cartridge into the cell, the operator opens the DEE door 64 of the drum unit 10a, and inserts the cartridge into the respective cell of the cell drum 15a.

The cartridges 52a and 52b located at upper positions higher than the DEE window 62 to be opened by DEE door 64 are those which have been inserted through the cartridge entry opening 6 of the cartridge access station 5 described with reference to FIG. 1. It is impossible for the operator to insert the cartridge into a cell located at a position higher than the DEE window 62.

Accordingly, the number of stages of cells to which the direct entry/exit of cartridge can be carried out by the operator is only m of n stages.

The cartridges 52a and 52b to be stored in the remaining cells are transported by the accessor 14 from a position of the cartridge entry opening 6 to the cell on the cell drum 15a of the cell unit 10a.

The drum unit 10a is provided with an upper unit 684a, similar to in the drum unit 10A or 10B, wherein a drum 702 is coupled with the drum 700.

Each of cartridges 52L, 52C, 52R, 53L, 53C and 53R accommodated in the cells on the cell drum 15a has a bar code label on the front surface thereof. Also each of the seven flat panels 54 has bar codes 56 in an area wherein cells are formed opposite to the DEE window 62, corresponding to positions at which the cartridges are to be accommodated. The bar codes 56 are attached to the flat panels 54 before the cell units 240, 242a, 242b and 244 are mounted to the flat panels 54. A numbering system of the bar codes 56 attached to the flat panels of the cell segments 17 of the cell drum 15a is different from that of the bar codes given to the cartridges 52L, 52C, 52R, 53L, 53C and 53R.

The bar codes on the cartridges and the flat panels are read by a bar code reader 68. The bar code reader 68 is coupled to a slide guide 76 and movable together therewith. The slide guide 76 reciprocates along a slide rail 74. The slide rail 74 is carried on a vertical column base 78. The vertical column base 78 carries thereon the bar code reader 68, a lower pulley 72, an upper pulley 106, a pulse motor 70, a position flag bar 112, the slide rail 74 or others. Around the lower pulley 72 and the upper pulley 106, a timing belt 108 is wrapped. A balance weight 110 is attached to the timing belt 108 as a counterbalance of the weight of the bar code reader 68. The bar code reader 68 is rotatable on an axis of the slide guide 76. A motor 82 is provided on the slide guide 76 for rotating the bar code reader 68. At a rear end of the bar code reader 68, a sensor flag 84 is provided. A sensor 86 for detecting the sensor flag 84 is provided. The sensor 86 includes a first bar code reader position sensor for detecting that the bar code reader 68 is inclined rightward and a second bar code reader position sensor for detecting that the bar code reader 68 is inclined leftward.

The pulse motor 70 drives the lower pulley 72. The rotation of the lower pulley 72 is transmitted to the timing belt 108 which then reciprocates the slide guide 76 carrying the bar code reader 68 along the slide rail 74. A position of the slide guide 76 on the vertical column base 78 is detected by counting the number of flags on the position flag bar 112 by a sensor 80 fixed to the slide guide 76. The sensor 80 and the position flag bar 112 constitute a position detection mechanism for the bar code reader 68.

The vertical column base 78 carries the bar code reader 68 and a mechanism for reciprocating the bar code reader 68, which consists of the motor 70, the lower pulley 72, the upper pulley 106, the slide guide 76, the slide rail 74 and the timing belt 108.

The vertical column base 78, the bar code reader 68, the position detection mechanism and the reciprocation mechanism are assembled to form a bar code reader unit 101.

A flange section 78a provided at the lower end of the vertical column base 78 is fastened to a base 100 of the drum unit 10a with screws 79. In this regard, the base 100 is provided with footings 102.

Accordingly, the bar code reader unit 101 can be detached from the drum unit 10a by loosening the screws 77 and 79. The flange sections 78a and 78b and the screws 77 and 79 are used for mounting/dismounting the bar code reader 101 to/from the drum unit 10a. The base 100 of the drum unit 10a has nuts to be engaged with the screws 77. Also, a top panel 104 is provided with nuts to be engaged with the screws 79. The base 100 and the top panel 104 have positioning plates or slits for positioning the flange sections 78a and 78b.

A control signal for controlling the bar code reader unit 101 is issued from a control circuit 90 carried on a control printed circuit board provided at a corner of the drum unit 10a. The control signal is transmitted to the bar code reader unit 101 from the control circuit 90 via a signal cable 94. The bar code reader unit 101 and the signal cable 94 are adapted to be connectable to and separable from each other via a connector not shown. The control circuit 90 transmits a drive signal for driving the drum motor 50 to the drive motor 50 of the cell drum 15a via a signal cable 92. If the drum motor 50 and the cell drum 15a constitute the drum unit, the signal cable 92 is adapted to be connectable to and separable from the drum motor 50 via a connector not shown.

The bar code reader unit 101 is provided at a rightside front corner of the housing of the drum unit 10*a*. Since the drum unit 10*a* uses the rotating cell drum 15*a*, it is possible to mount the bar code reader unit 101 at the corner of the housing. Access to the upper cells of the cell drum 15*a* is possible through an opening provided on a back surface of the drum unit 10*a*.

Accordingly, the bar code reader unit 101 can read the bar code label attached to the inserted cartridge before the cell segment to which the entry/exit operation of the cartridge has been carried out by the operator reaches a position behind the drum unit 10*a*.

Such a bar code reader unit 101 can be mounted to the drum unit 10*a* by screws at a later stage if necessary as an optional unit. Similarly, a decorative panel provided on the front surface of the drum unit 10*a* can be changed from one with the DEE door 64 to one without the DEE door 64. This replacement can be easily carried out by using fastening means such as screws or the like.

On the other hand, the drum unit 10*b* shown in FIG. 1 has no DEE function, and solely includes the cell drum unit and the control circuit. That is, the drum unit 10*b* corresponds to the drum unit 10A or 10B already described with reference to FIGS. 18 through 22.

The drum unit 10*b* can be converted to a drum unit having the DEE function by changing the decorative panel thereof to one having a DEE door 64 and mounting the bar code reader unit 101 thereto.

Next, a method will be explained for reading a bar code attached to the cartridge 52 by the bar code reader 68.

Figure 25:
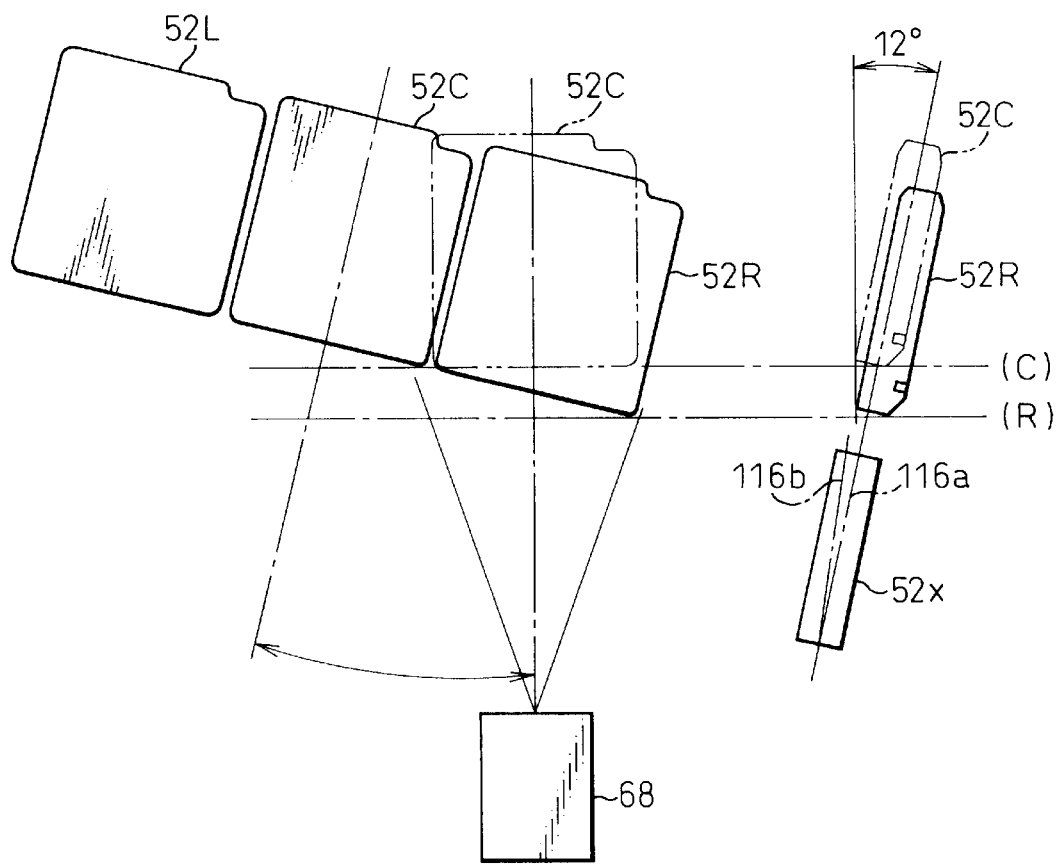
FIG. 25 is the illustration for explaining the relationship between a scanning beam of a bar code reader and a cartridge surface on which a bar code label is attached.

FIG. 25 is an illustration for explaining the relationship between a scanning beam of the bar code reader 68 and a cartridge surface on which the bar code is attached.

As described with reference to FIG. 23, the cell drum 15*a* is a rotary drum of a heptagonal cross-section structured by seven flat panels. Three rows of cells are provided on each of the surfaces of the drum. If an end surface of the cartridge 52C in a central row held by cells on the flat panel 54 is denoted as 52*x*, on which the bar code label is attached, a locus (C in FIG. 25) of the end surface 52*x* is inside a rotational locus (R in FIG. 25) depicted by a leftside corner of a tip end of the cartridge 52L and a rightside corner of a tip end of the cartridge 52R. A scanning beam of the bar code reader 68 coincides with a vertical directional center of the bar code label on the end surface 52*x* of the cartridge 52C in a central row when the cartridge 52C in the central row is correctly positioned in front of the bar code reader 68. Such a scanning beam is represented by 116*a* in FIG. 25.

However, as shown in FIG. 25, when the cartridge 52R in the rightside row is correctly positioned in front of the bar code reader 68, the scanning beam of the bar code reader 68 represented by 116*b* is inclined to the center line 116*a* of the end surface 52*x* of the cartridge 52R, because the cartridge 52R and the bar code reader 68 are disposed at the inclination angle of 12° relative to the horizontal plane. In this regard, in the cartridge 52L in the leftside row, the inclination is reverse to that of the cartridge 52R, though it is not illustrated.

It is necessary to correct the scanning beam of the bar code reader in accordance with positions of rows of cells for accommodating cartridges 52.

Figure 26:
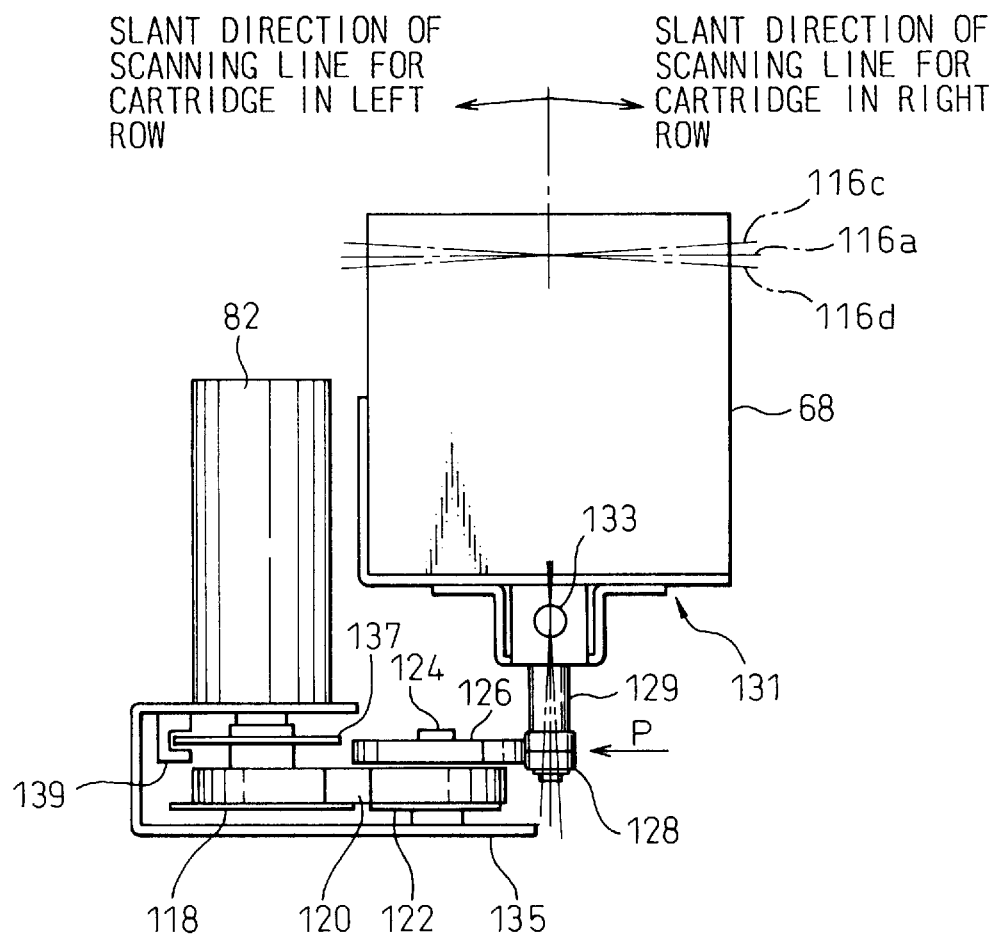
FIG. 26 is a front view of an inclination adjustment mechanism for the bar code reader.
Figure 27:
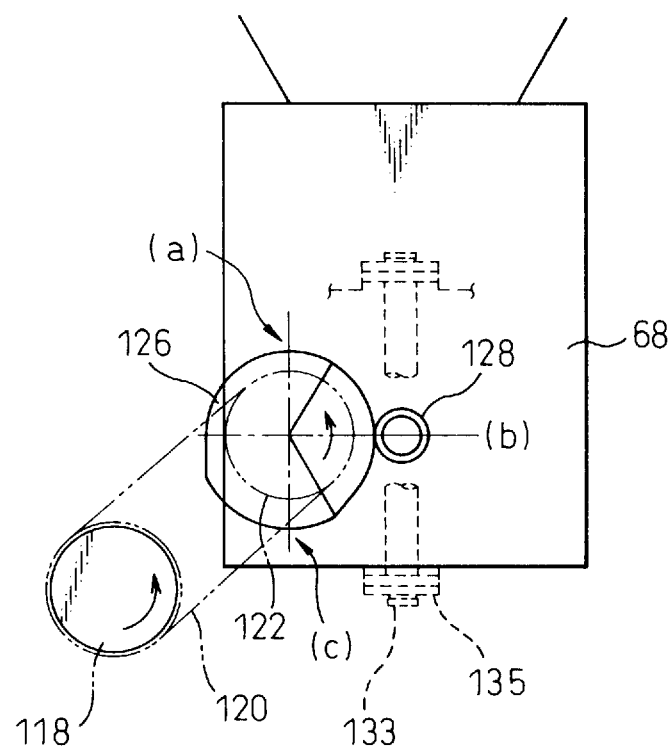
FIG. 27 is a bottom view of the inclination adjustment mechanism for the bar code reader.

FIGS. 26 and 27 are illustrations of an inclination adjustment mechanism for a scanning beam of the bar code reader 68; wherein FIG. 26 is a front view thereof and FIG. 27 is a bottom view thereof.

In FIGS. 26 and 27, the bar code reader 68 is held by a holder 131. The holder 131 is rotatably held by a shaft 133. The shaft 133 is rotatably mounted to a base 135 which is in turn fixedly secured to the slide guide 76. A shaft 129 having a roller 128 at one end thereof is mounted to the holder 131. The roller 128 is brought into contact with a surface of a cam 126 fixedly secured to a shaft 124 rotatably held by the base 135. The shaft 129 of the roller 128 is always biased in the arrowed direction P by a spring not shown. This biasing force operates as a pressure for forcing the roller 128 to press the surface of cam 126. The shaft 124 is provided with a pulley 122. The pulley 122 is operatively coupled to a drive pulley 118 via a belt 120. The drive pulley 118 is fixedly mounted to an output shaft of a motor 82 supported by the base 135. An encoder 137 is fixedly secured to the output shaft of the motor 82. A slit of the encoder 137 is detected by a motor-stop timing sensor 139.

The slit of the encoder 137 is adapted to be capable of detecting positions at which points (a), (b) and (c) on the surface of the cam 126 are in contact with the roller 128. When the point (b) on the surface of the cam 126 is in contact with the roller 128, a central position is reached. At point (b), the bar code reader 68 reads the bar code label on the cartridge 52C in the central row. The scanning beam of the bar code reader 68 represented by 116*a*. When the point (a) on the surface of the cam 126 is in contact with the roller 128, the bar code reader 68 reads the bar code label on the cartridge 52R in the rightside row. The scanning beam of the bar code reader 68 is represented by 116*d*. When the point (c) on the surface of the cam 126 is in contact with the roller 128, the bar code reader 68 reads the bar code label on the cartridge 52L in the leftside row. The scanning beam of the bar code reader 68 is represented by 116*c*.

Figure 28:
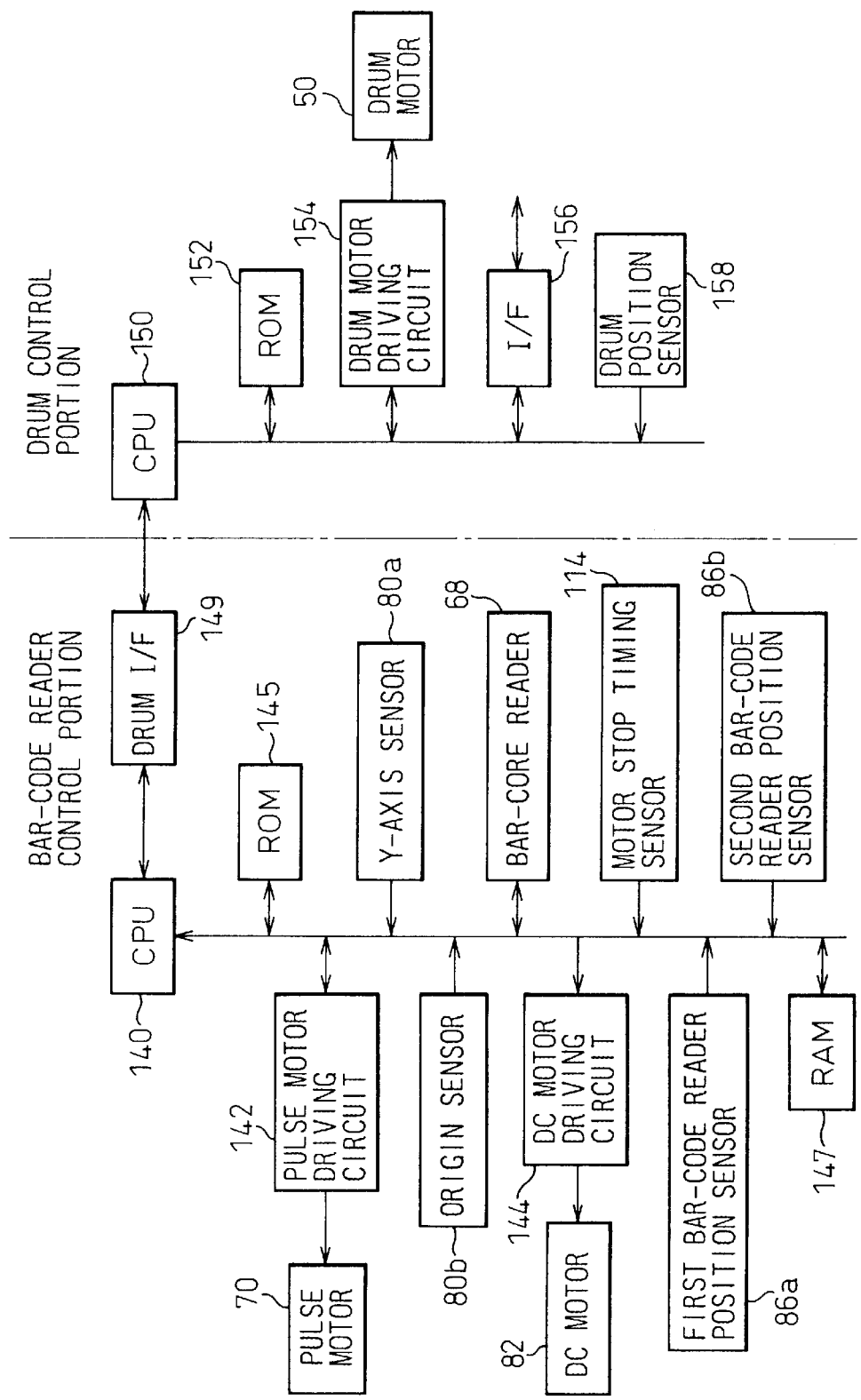
FIG. 28 is a block diagram of a control circuit including a bar code reader control portion.

FIG. 28 shows a block diagram of a control circuit including a control portion for the bar code reader (see FIG. 23).

In FIG. 28, the control portion for the bar code reader is provided with CPU 140 consisting of a microcomputer or the like. Also the control portion for the bar code reader has the following structure.

CPU 140 executes the control operation for the bar code reader 68 or others in accordance with a program stored in ROM 145. A pulse motor drive circuit 142 drives the pulse motor 70 for reciprocating the bar code reader 68 along the slide rail 74. A Y-axis sensor 80*a*, which constitutes a detection means for detecting a flag 112*a* of the position flag bar 112, is mounted to the slide guide 76. An original point sensor 80*b*, which constitutes a detection means for detecting an original position flag provided at a lowermost end of the position flag bar 112, is mounted to the slide guide 76. The original point flag can be discriminated from the position flag 112*a* because it extends further than the position flag 112*a*.

A DC motor drive circuit 144 drives a DC motor 82 for rotating the bar code reader 68 on the shaft 133. A motor stop timing sensor 139 consists of a light emitting element and a light receiving element for detecting a slit provided on an encoder 137 fixedly secured on an output shaft of the motor 82. The sensor 130 outputs a stop timing signal in accordance with the detection of the slit on the encoder 137.

A bar code reader position sensor 86 is provided on a rear portion of the bar code reader 68 as shown in FIG. 23. The bar code reader position sensor 86 consists of a pair of sensors 86*a* and 86*b*. The sensor 86*a* is used for detecting a state wherein the bar code reader 68 rotates clockwise on the shaft 133 to incline rightward. The sensor 86*a* is provided at a position rear left of the bar code reader 68. The sensor 86a is provided with a light emitting element and a light receiving element not shown and outputs a detection signal when a flag 84 on the bar code reader 68 is positioned between the light emitting element and the light receiving element. The sensor 86b is used for detecting a state wherein the bar code reader 68 rotates counterclockwise on the shaft 133 to incline leftward. The sensor 86b is provided at a position rear right of the bar code reader 68. The sensor 86a is provided with a light emitting element and a light receiving element not shown and output a detection signal when a flag 84 on the bar code reader 68 is positioned between the light emitting element and the light receiving element.

Also, the bar code reader control portion executes the communication with CPU 150 of a drum control portion via a drum interface circuit 149.

The drum control portion is provided with CPU 150 consisting of a microcomputer of the like. Also, the drum control portion has the following structure.

CPU 150 executes the control operation for the drum motor 50 or others in accordance with a program stored in ROM 152. A drum motor drive circuit 154 drives the drum motor 50 for rotating the cell drum. A drum position sensor 158 detects a rotational position of the cell drum. In accordance with the output from the drum position 158, CPU 150 outputs a control signal to the drum motor drive circuit 154 to drive the drum motor 50 so that the cartridges 52c, 52R and 52L in the respective rows on the cell drum shown in FIG. 23 are correctly positioned in front of the bar code reader. An interface 156 is used for the communication with a host apparatus.

Next, the bar code label reading operation will be explained.

The bar code reader 68 reads the bar code label as follows.

Figure 29:
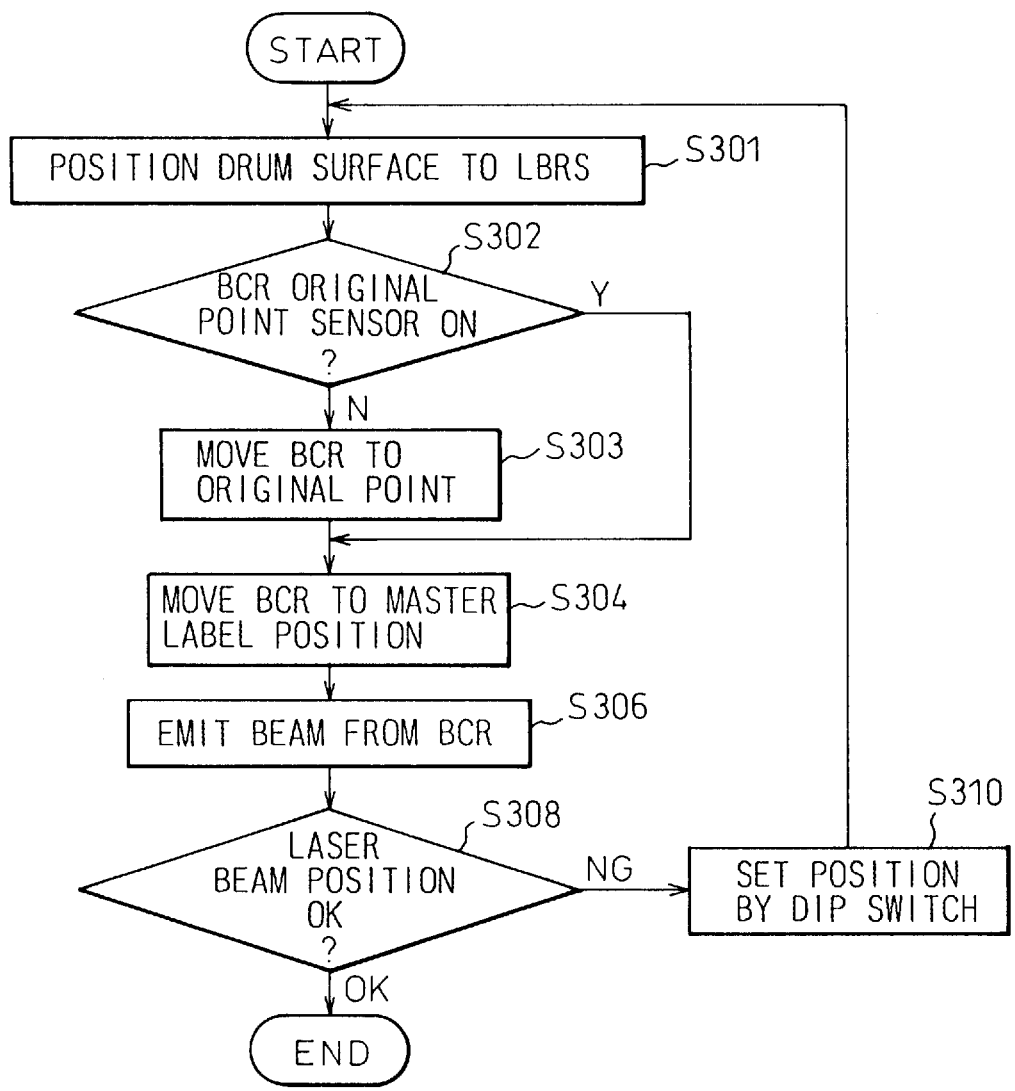
FIG. 29 is a flow chart for the adjustment operation of a reading position of the bar code reader.

FIG. 29 is the illustration for explaining the adjustment of a position at which the reading operation of the bar code reader is carried out.

As stated before, the bar code reader unit 101 is mounted later onto the base 100 of the drum unit 10a. Also, the cell drum 15a is mounted onto the base 100 of the drum unit 10a. Because of the dimensional error of the bar code reader unit 101 during manufacture and that caused by the mounting of the unit 101 to the base 100, there is an offset of relative position between the position flag 112a on the position flag bar 112 and the respective cell in the cell drum 15a.

Accordingly, even though the bar code reader is located at a position in front of a cartridge, for example, the cartridge 52e shown in FIG. 24, in a desired cell, a scanning beam of the bar code reader 68 is actually emitted to a position different from the bar code label on the cartridge 52e.

Therefore, the bar code reader control portion executes the adjustment of the position at which the bar code reader 68 reads the bar code prior to the initiation of the actual reading operation of the bar code reader 68.

This adjustment of the reading position is as follows:

First, the operator of the library apparatus 2 inputs a command for executing the adjustment of the reading position of the bar code reader, through an operator panel on the housing 4. In accordance with this command, a control portion provided on the housing 4 transmits the adjustment command to a control circuit 90 of the drum unit via a signal cable connected to the control circuit 90. The control circuit 90 transmits the adjustment command to CPU 150 via an interface 156 of the drum control portion. CPU 150 transmits the command to CPU 140 via an interface 149. CPU 140 executes the following steps upon receiving the command.

(1) Step S301: As shown in FIG. 29, CPU 140 issues a command to CPU 150 of the drum control portion via the drum interface 149 to locate the bar code label of the cartridge in a central row of the cell segment 17 of the cell drum 15a at a position correctly in front of the bar code reader 68. CPU 150 drives the drum motor 50 via the drum motor drive circuit 154 to locate the bar code label of the cartridge in a central row of the cell segment 17 of the cell drum 15a at a position correctly in front of the bar code reader 68. When the drum position sensor 158 detects the completion of the positioning operation, CPU 150 informs the completion of the positioning operation to CPU 140 via the interface 149.

(2) Step S302: Upon the reception of the completion of the positioning operation signal, CPU 140 determines by the output from the original point sensor 80b whether or not the bar code reader 68 is located at the original point position of the vertical column base 78. If the output of the original point sensor 80b is ON, the control proceeds to step S304.

On the contrary, if the output of the original sensor 80b is OFF, the control proceeds to step S303.

(3) Step S303: CPU 140 executes the operation for locating the bar code reader 68 at the original point position. That is, CPU 140 drives the pulse motor 70 via the pulse motor drive circuit 142 to displace the bar code reader downward. If the original sensor 80b is ON, the pulse motor 70 is made to stop via the pulse motor drive circuit 142 to locate the bar code reader 68 at the original point position.

Figure 30:
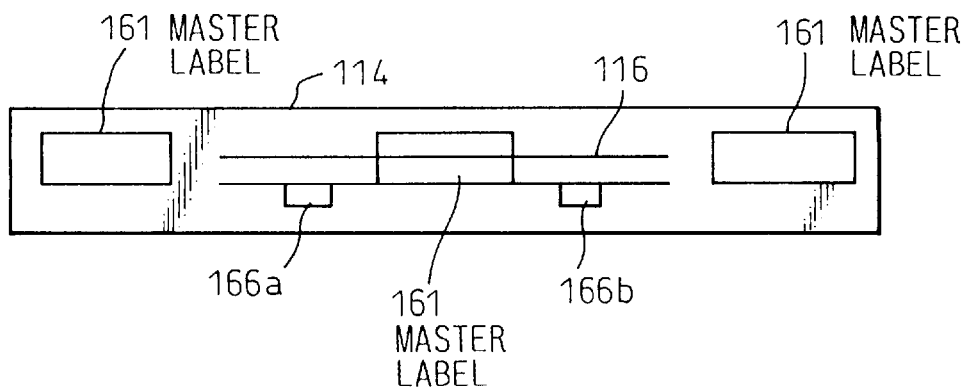
FIG. 30 is the illustration for explaining a master bar code label.

(4) Step S304: The operation is executed for emitting the scanning beam of the bar code reader 68 at a position at which the master label 161 is attached. As shown in FIG. 30, the master label 161 is adhered to a front side of a plate member 114 attached to the flat panel 54 of the cell segment 17 of the cell drum 15a. The plate member 114 is provided with slits 166. The slits 166 are formed on the plate member 114 so that the upper ends of the slits 166 are in line with the lower end of the master label 161. When the bar code reader 68 is located at a position in front of the master label, CPU 140 first drives the pulse motor 70 via the pulse motor drive circuit 142 to displace the bar code reader 68 upward. When the number of flags 112a detected by the Y-axis sensor 80a reaches a value required for the arrival at the plate member 114, CPU 140 interrupts the drive of the pulse motor 70. The number of stages of the cells capable of executing DEE is thirty six. Since a position of the plate member 114 corresponds to a thirty-seventh stage, the number of flags to be counted is thirty seven.

(5) Step S306: After the bar code reader 68 has been located at a position in front of the master label 161, the scanning beam is emitted from the bar code reader 68.

(6) Step S308: The operator visually confirms whether or not the lower end of the scanning beam 164 emitted from the bar code reader 68 coincides with the lower end of the master label 161 and with the upper end of the slits 166. If the answer is negative, the control proceeds to step S310.

(7) Step S310: The operator estimates an amount of offset between the lower end of the scanning beam 116 and the lower end of the master label 161 or the upper end of the slits 166, and inputs a value corresponding to this offset amount to CPU 140 via a dip switch (not shown) provided on the bar code reader unit 101. The value to be input by the operator is the number of pulses of the pulse motor 70, corresponding to the offset amount. CPU 140 stores this value in an internal register not shown. CPU 140 executes the operation defined by steps S301 through S306 when the operator again commands the positional adjustment operation.

(8) CPU 140 executes the following additional operations when step S304 is executed. That is, after the position flag 112a corresponding to a position of the plate member 114 has been detected, CPU 140 confirms the value input to the dip switch. If this value is zero, additional operations are not carried out. Since the dip switch is set to a value other than zero as stated above, a number of pulses corresponding to the value designated by the dip switch are applied to the pulse motor drive circuit 142 to drive the pulse motor 70.

(9) According to this application of pulses, the reading position of the bar code reader 68 is adjusted. Then, the operator confirms whether or not the lower end of the scanning beam 116 emitted from the bar code reader 68 coincides with the lower end of the master label 161 and the upper ends of the slits 166. If the answer is negative, the same operation as above is repeated again.

On the other hand, if the operator determines that the coincidence has been obtained, the operator inputs the completion of the positional adjustment via the operator panel on the housing 4 to CPU 140 via the control circuit, in a similar manner as the initiation of the positional adjustment. Then, CPU 140 completes the positional adjustment to locate the bar code reader 68 at the original point.

Accordingly, CPU 140 can execute the positioning operation of the bar code reader with reference to the dip switch as set as described above.

Next, the explanation will be made on the operation for reading the bar code label adhered to the cartridges 52 and 53 inserted into cells of the cell drum 15a through the DEE door 64 of the drum unit 10a.

Figure 31:
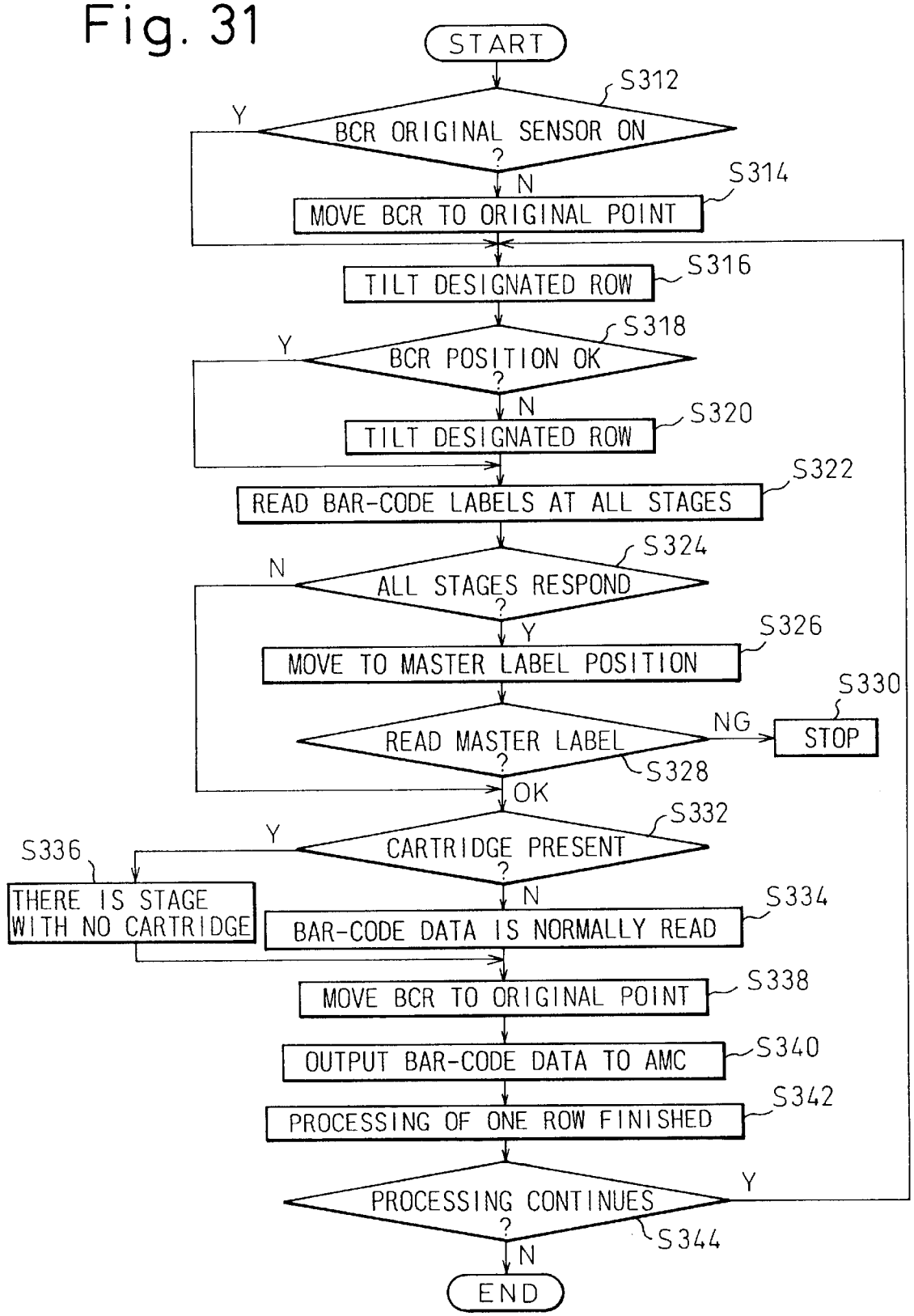
FIG. 31 is a flow chart for the reading operation of the bar code reader.

FIG. 31 is a flow chart for illustrating the reading operation of the bar code reader.

First, when a sensor not shown detects that the DEE door of the cell drum 10a is open, CPU 140 commands CPU 150 of the drum control portion to interrupt the rotation of the drum motor 50 and hold the position thereof. Upon the reception of this command, CPU 150 immediately interrupts the drive of the drum motor 50. Further, CPU 150 determines which cell segment in the seven cell segments 17 is positioned in front of the DEE door 64 in accordance with the output from the drum position sensor 158. It is assumed that a certain cell segment 17 is located in front of the DEE door 64.

The operator executes the DEE operation (direct entry/exit operation) of cartridges to cells arranged at n stages while forming three rows. When the DEE operation has been finished, the operator shuts the DEE door. The completion of DEE operation is input through the operator panel provided on the housing 4 or the drum unit 10a.

When the completion of the DEE operation is input by the operator after a sensor not shown has detected that the DEE door 64 of the cell drum 10a is closed, the bar code reader starts the reading operation shown in FIG. 31.

(1) Step S312: CPU 140 determines whether or not the original point sensor 80b is ON. If the original point sensor 80b is ON, the control proceeds to step S316, while if the original sensor 80b is OFF, the control proceeds to step 314.

(2) Step S314: CPU 140 drives the pulse motor 70 to locate the bar code reader at the original point position. When the original sensor 80b is ON, CPU 140 interrupts the drive of the pulse motor 70 and the control proceeds to step S316.

(3) Step S316: CPU 140 commands CPU 150 to locate a cartridge in a selected row in rightside, central and leftside rows of the cell segments 17 are located in front of the bar code reader 68. For example, CPU 140 designates the rightside rows. CPU 150 of the drum control portion drives the drum motor 50 so that the cell drum 15a rotates to locate the cartridge 52R in the rightside row of the cell segment 17 in front of the bar code reader 68.

(4) Step S318: On the other hand, CPU 140 confirms whether or not the inclination of the bar code reader 68 coincides with the designated row. This confirmation is carried out by CPU 140 in accordance with the outputs from the bar code reader position sensors 86a and 86b. Since CPU 140 designates the rightside row at step S316, the outputs from the bar code reader position sensors 86a and 86b must be in such a combination that the sensor 86a is ON and the sensor 86b is OFF (while being interrupted by the flag 84). If the combination of sensor outputs is NG, the control proceeds to step S320, while if the combination of sensor outputs is OK, the control proceeds to step S322.

Figure 33:
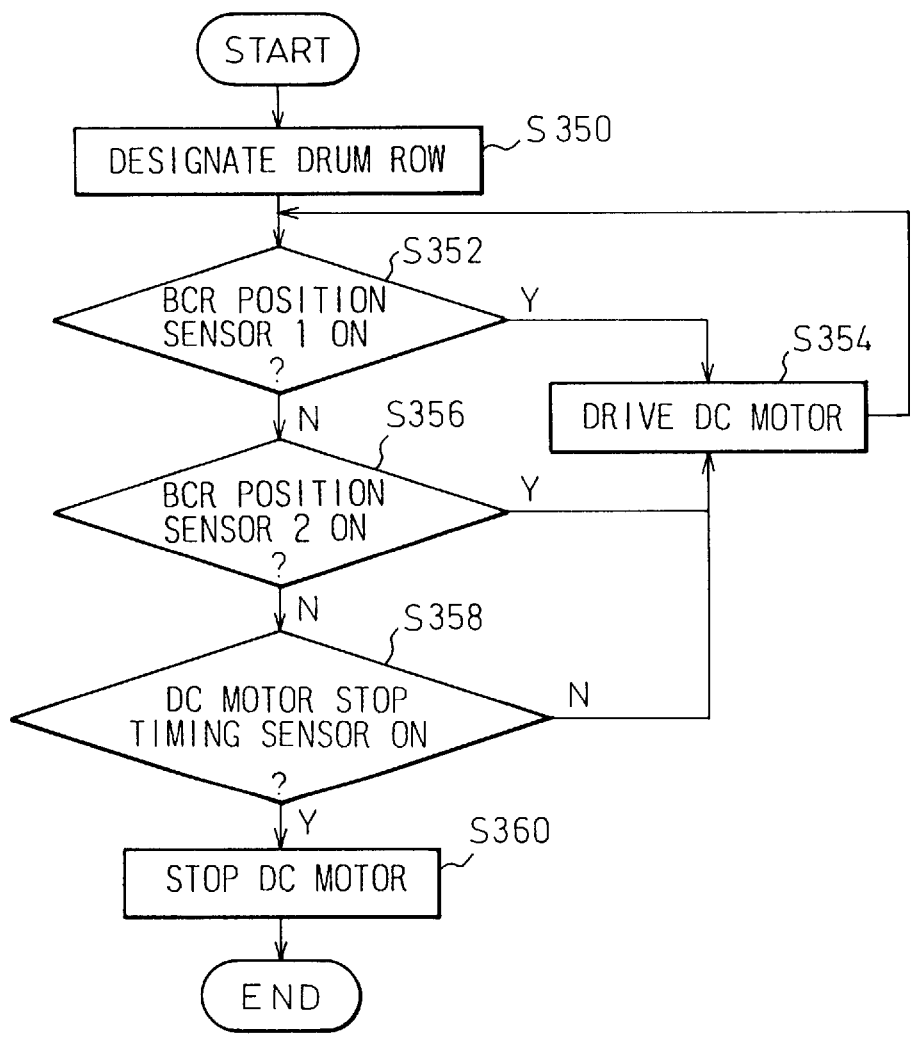
FIG. 33 is a flow chart for the operation for positioning the bar code reader at a position for reading a cartridge in a central row.
Figure 34:
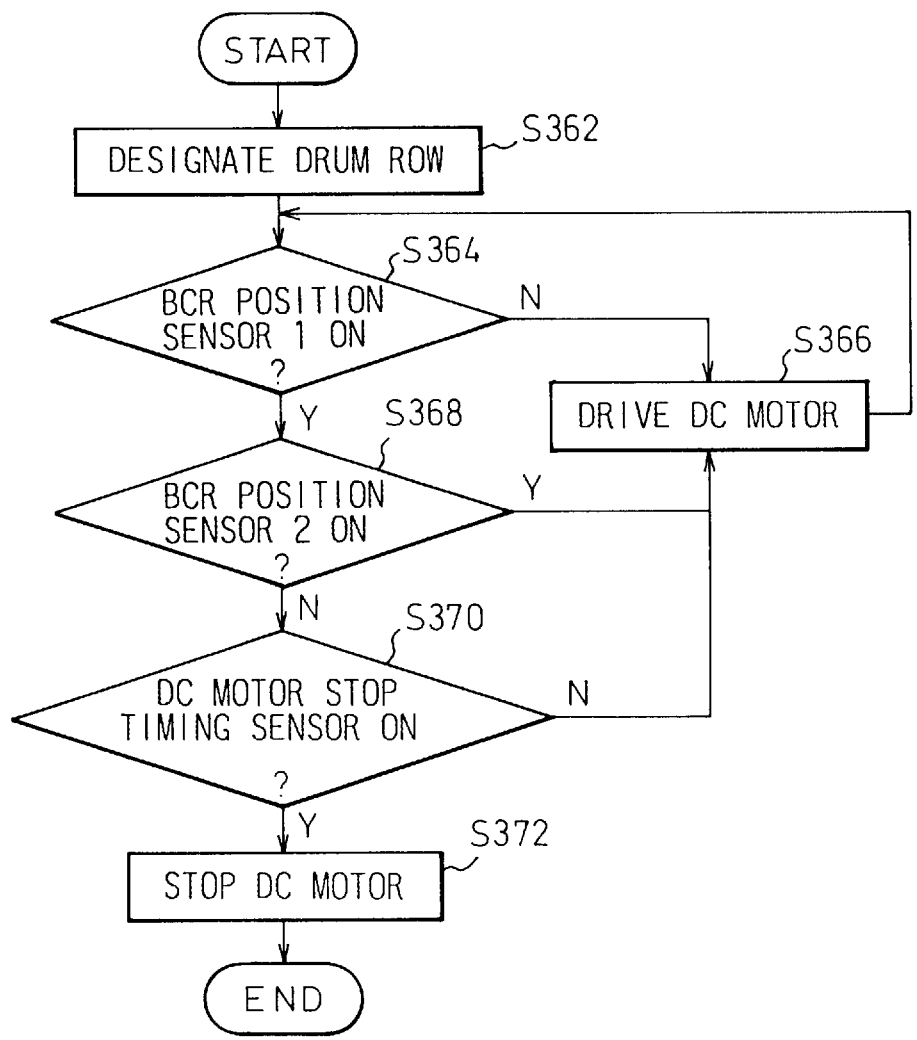
FIG. 34 is a flow chart for the operation for positioning the bar code reader at a position for reading a cartridge in a rightside row.
Figure 35:
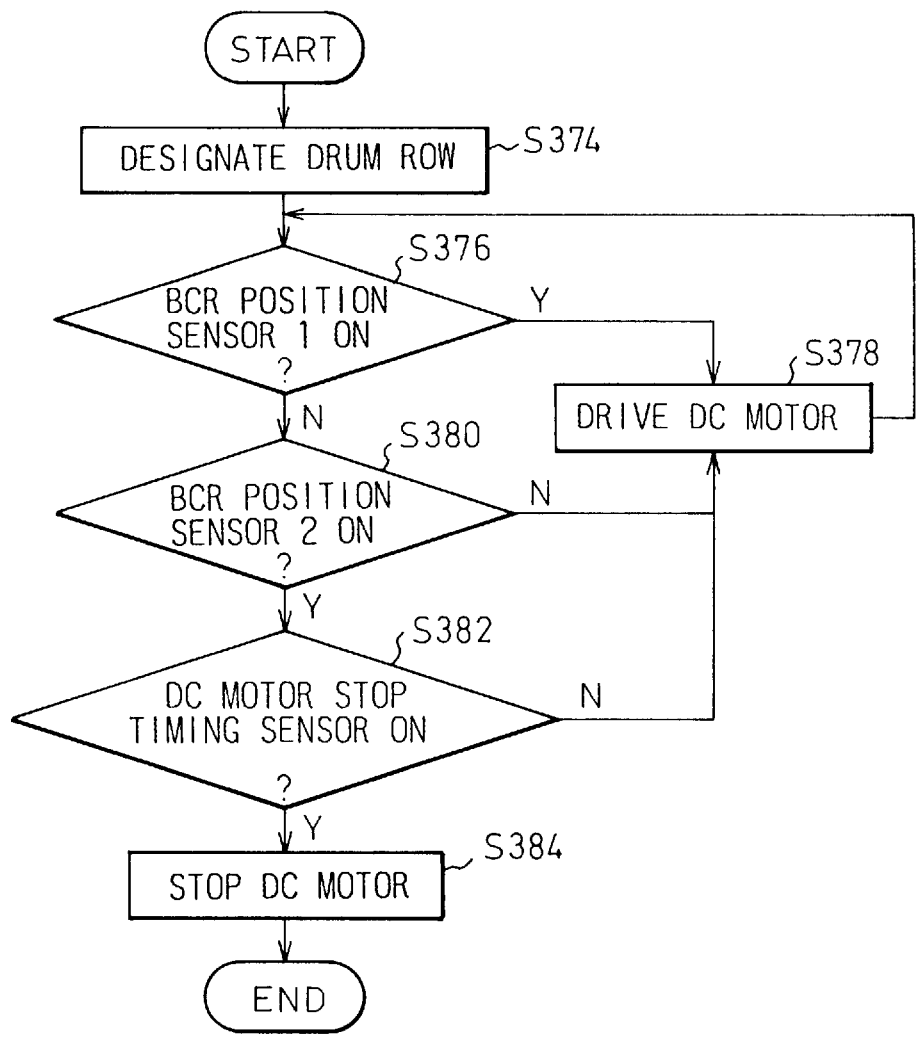
FIG. 35 is a flow chart for the operation for positioning the bar code reader at a position for reading a cartridge in a leftside row.

(5) Step S320: CPU 140 executes the inclination operation suitable for the row designated at step S316. If the central row is designated, the operation shown in FIG. 33 is executed. If the rightside row is designated, the operation shown in FIG. 34 is executed. If the leftside row is designated, the operation shown in FIG. 35 is executed. Details of these operations will be described later.

Figure 32:
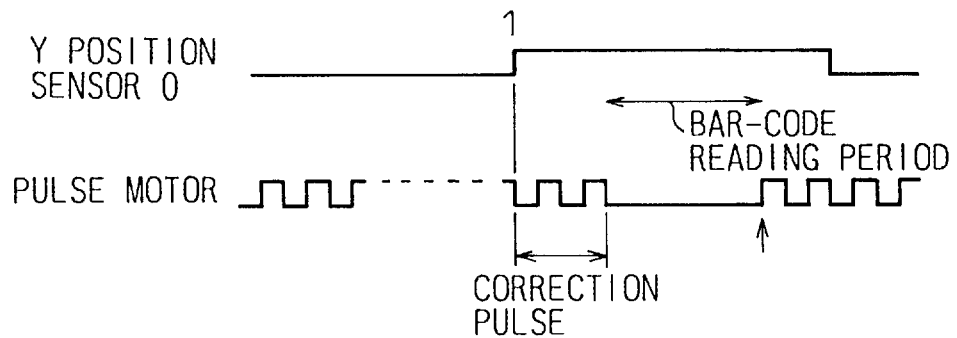
FIG. 32 is the illustration of wave shapes for explaining the position-correction operation of the bar code reader.

(6) Step S322: CPU 140 executes the reading operation of the bar code label on all of m stages of cells capable of carrying out the DEE operation through the DEE door 64. That is, CPU 140 issues a command to the pulse motor drive circuit 142 to rotate the pulse motor 70. The bar code reader 68 starts to travel upward from the original point position. When the Y-axis sensor 80a detects the first position flag 112a on the position flag bar 112, CPU 140 interrupts the drive of the pulse motor 70. That is, as shown in FIG. 32, during a period wherein the detection output from the Y-axis sensor 80a is "0", drive pulses are applied to the pulse motor 70 via the pulse motor drive circuit 142. If the detection output from the Y-axis sensor 80a becomes "1", CPU 140 interrupts the issuance of drive pulse after the predetermined number of drive pulses have been applied to the pulse motor 70 as a correction pulse corresponding to the number designated to the dip switch. Accordingly, the bar code reader 68 is located at a position in front of the cartridge 52C in the position-corrected state. The application of correction pulses is executed at every stages.

When the positioning operation of the bar code reader 68 has been completed, CPU 140 drives the bar code reader to emit the scanning beam and carry out the reading operation of the bar code label. The positioning operation and the bar code label reading operation of the bar code reader 68 are repeated a plurality of times corresponding to the number of cell stages. In this embodiment, these operations are repeated thirty six times. In this regard, these operations are executed irrespective of whether or not cartridges are stored in the cells. The results of the reading operation are stored in RAM 147 by CPU 140, while being classified to the respective cells. CPU 140 prepares, in RAM 147, a table showing the relationship between a cell address representing the cell position and a label number of the bar code label. A cell address and "all zero" value are given to cells on which the bar code label cannot be read. Since the bar code label adhered to the flat panel 54 is read by the bar code reader 68 when the cartridge is not stored in the cell, the value represented on the bar code label is stored in RAM 147 together with the cell address. The cell address given to the bar code label 56b on the flat panel 54 is stored in RAM 147.

(7) Step S324: CPU 140 determines whether or not the cell address wherein the "all zero" value is stored is present based on the content of the table stored in RAM 147 for the purpose of confirming the presence of a non-response stage. If there is no such a cell address, the control proceeds to step S326.

(8) Step S326: CPU 140 locates the bar code reader 68 at a position in front of the master label 161. Then the master label 161 is read by the bar code reader 68 (step S328). When the master label 161 cannot be normally read, CPU 140 determines that the bar code reader has a problem and the control proceeds to step S330. At step 330, CPU 140 interrupts the operation for reading the bar code label and informs the generation of error via the interface 149 or others to an overall library control circuit in the housing 4. The overall library control circuit issues an alarm to the operator.

On the other hand, if the master label can be normally read, the control proceeds to step S332.

(9) CPU 140 confirms whether or not a cartridge is present in a cell. As stated before, if a cartridge is not stored in a cell, the value of the bar code label read by the bar code reader 68 represents a cell address. Accordingly, if it is confirmed that the cell address coincides with the read value of the bar code label as a result of checking the content of the table in RAM 147, it is determined that the cartridge is not present in the cell. If it is confirmed that there is no cell in which no cartridge is present, it is determined that the bar code label is normally read by the bar code reader 68 (step S334).

On the contrary, if it is determined that there is a cell in which no cartridge is stored, a flag of the cell address in the table prepared in RAM 147 is ON.

Then CPU 140 drives the pulse motor 70 to locate the bar code reader 68 at the original point position (step S338).

(10) Step: S340: CPU 140 transmits the content of the table prepared in RAM 147 to an accessor mechanism controller AMC constituting the library overall control circuit provided in the housing 4 via the drum interface 149 and the like.

CPU 140 determines that the treatment of one row of the cells in the segment 17 has been completed (step 342), and then determines whether or not the reading of the bar code labels in all the rows is completed (step S344). If any rows to be read are still remain, steps S316 through S344 are repeated. If the treatment of all the rows has been completed, CPU 140 returns to a waiting state.

Next, the inclination operation executed at step S320 in the flow chart shown in FIG. 31 will be described with reference to FIGS. 33 and 34.

FIG. 33 shows a flow chart of the operation for locating the bar code reader 68 at the reading position in front of the central row of cartridges.

(1) Step S350: CPU 140 issues a command to CPU 150 of the drum control portion to designate the central row. CPU 140 determines whether or not the bar code reader position sensor 86a is ON (step S352). If CPU 140 determines that the sensor 86a is ON, CPU 140 drives the DC motor 82 via the DC motor drive circuit 144 to rotate the cam 126 leftward (FIG. 27) (step S354).

(2) Step S356: The DC motor 82 continues to rotate. If the sensor 86a becomes OFF, CPU 140 confirms whether or not the sensor 86b is ON. When the sensor 86b is OFF, the control proceeds to step S358. While, if the sensor 86b is ON, the control proceeds to step S354 at which the DC motor 82 is driven to rotate the cam 126 further leftward.

(3) Step S358: After the sensor 86b has become OFF, CPU 140 continues to drive the DC motor 82 until the point (b) on the surface of the cam 126 is brought into contact with the roller 128 and the motor stop timing sensor 139 is ON. If the sensor 139 is ON, CPU 140 interrupts the drive of the DC motor 82. Thus the operation has been completed, for locating the bar code reader 68 at the reading position in front of the central row.

FIG. 34 shows a flow chart of the operation for locating the bar code reader 68 at the reading position in front of the rightside row of cartridges.

(1) Step S362: CPU 140 issues a command to CPU 150 of the drum control portion to designate the rightside row. CPU 140 determines whether or not the bar code reader position sensor 86a is ON (step S364). If the sensor 86a is OFF at step S364, CPU 140 drives the DC motor 82 via the DC motor drive circuit 144 to rotate the cam 126 leftward (FIG. 27) (step S366).

(2) Step S368: If the sensor 86a becomes ON, CPU 140 confirms whether or not the sensor 86b is ON. When the sensor 86b is OFF, the control proceeds to step S370. While, if the sensor 86b is ON, the control proceeds to step S366 at which the DC motor 82 is driven to rotate the cam 126 further leftward.

(3) Step S370: CPU 140 continues to drive the DC motor 82 until the point (a) on the surface of the cam 126 is brought into contact with the roller 128 and the motor stop timing sensor 139 is ON. If the sensor 139 becomes ON after the sensor 86a has been OFF and the sensor 86b has been ON, CPU 140 interrupts the drive of the DC motor 82 (step S372). Thus the operation, for locating the bar code reader 68 at the reading position in front of the rightside row has been completed.

FIG. 35 shows a flow chart of the operation for locating the bar code reader 68 at the reading position in front of the leftside row of cartridges.

(1) Step S374: CPU 140 issues a command to CPU 150 of the drum control portion to designate the leftside row. CPU 140 determines whether or not the sensor 86a is ON (step S376). If the sensor 86a is OFF at step S364, CPU 140 drives the DC motor 82 via the DC motor drive circuit 144 to rotate the cam 126 leftward (step S378).

(2) Step S380: If the sensor 86a is OFF, CPU 140 confirms whether or not the sensor 86b is ON. If the sensor 86b is ON, the control proceeds to step 382. While, if the sensor 86b is OFF, the control proceeds to step 378, at which the DC motor 82 is driven to rotate the cam 126 further leftward.

(3) Step S382: CPU 140 continues to drive the DC motor 82 until the point (c) on the surface of the cam 126 is brought into contact with the roller 128 and the motor stop timing sensor 139 is ON. If the sensor 139 becomes ON after the sensor 86a has been OFF and the sensor 86b has been ON, CPU 140 interrupts the drive of the DC motor 82 (step S383). Thus the operation has been completed, for locating the bar code reader 68 at the reading position in front of the leftside row.

As apparent from the above description, it is possible to sequentially read the bar code labels on the cartridges stored by the DEE operation by the reciprocation of the bar code reader 68. Since the operation for reading the bar code labels can be completed before the cell segment 17 on which the DEE operation has been carried out is positioned in a rear area of the drum unit 10a, it is possible to shorten the transportation time by the accessor.

Figure 36:
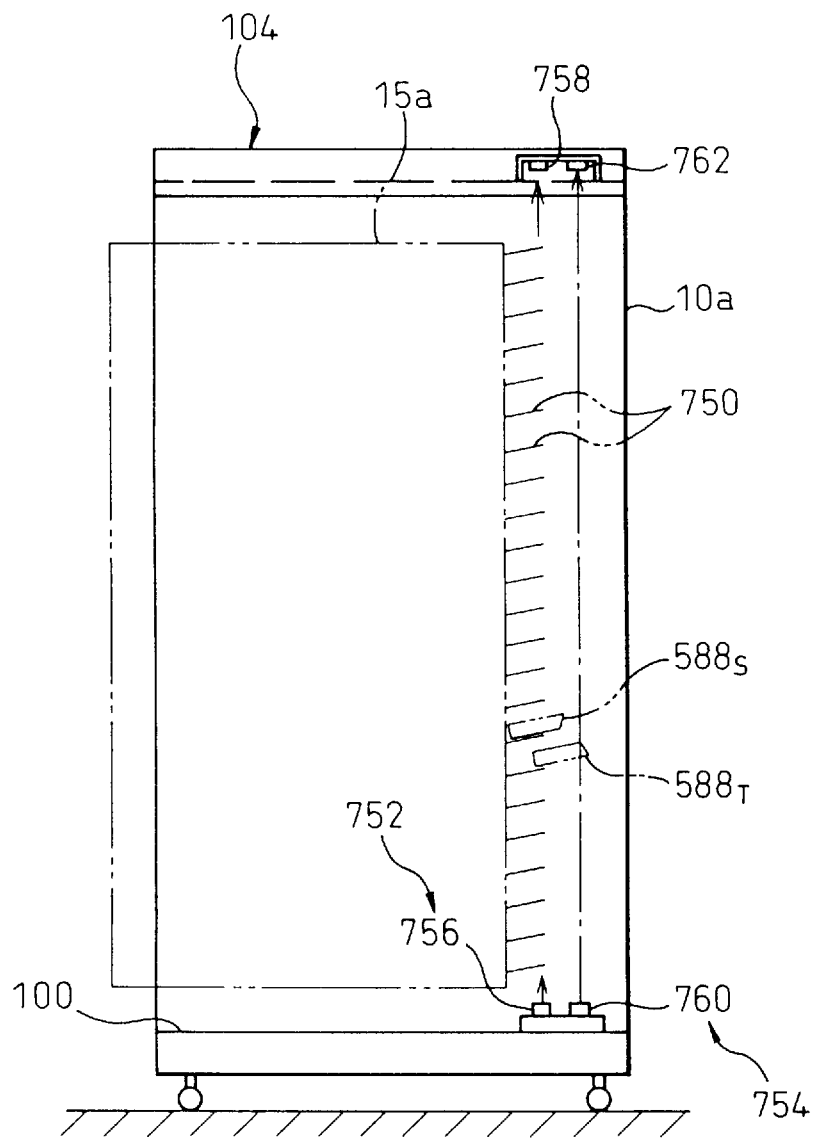
FIG. 36 is a side view of a cartridge-detection mechanism provided in the drum unit with the DEE door.
Figure 37:
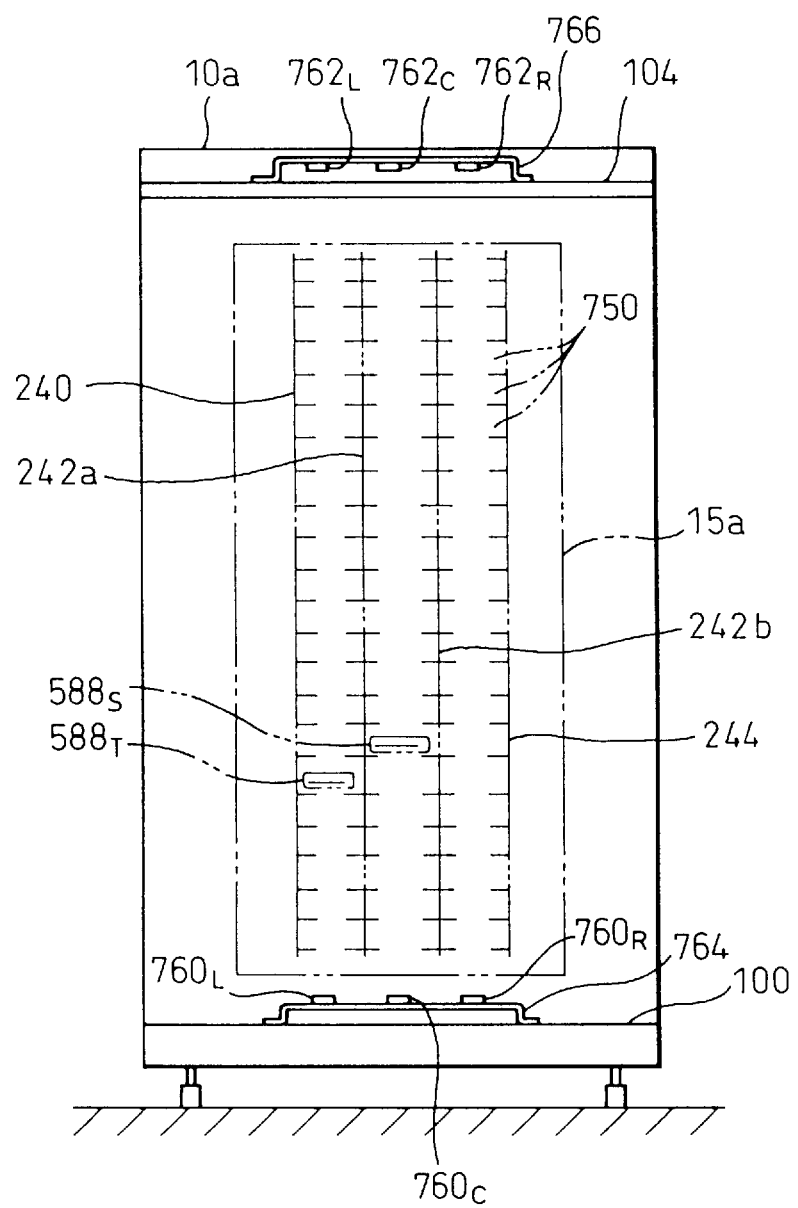
FIG. 37 is a front view of the cartridge-detection mechanism provided in the drum unit.

FIG. 36 is a side view of a cartridge detection mechanism to be provided in the drum unit 10a or 10b having a DEE door. FIG. 37 is a front view of a cartridge detection mechanism to be provided in the drum unit 10a or 10b having a DEE door.

In FIG. 36, the cell drum 15a has a plurality of cells 750. The cells 750 are arranged at n stages while forming three rows. A photoelectric sensor 752 for detecting whether or not cartridges 588 are present in the cells 750 and a photoelectric sensor 754 for detecting whether or not the cartridges 588 are accommodated in the cells 750 in the projecting-out state.

The photoelectric sensor 752 is constituted by a light-emission element 756 attached to the base 100 of the drum unit 10a and a light-reception element 758 attached to the top panel 104. The light-emission element 756 and the light-reception element 758 are positioned on the base 100 and the top panel 104 so that an optical axis between the light-emission element 756 and the light-reception element 758 is interrupted by a cartridge 588S normally accommodated in the cell 750.

The photoelectric sensor 754 is constituted by a light-emission element 760 attached to the base 100 of the drum unit 10a and a light-reception element 762 attached to the top panel 104. As shown in FIG. 36, the light-emission element 760 and the light-reception element 762 are positioned on the base 100 and the top panel 104 so that an optical axis between the light-emission element 760 and the light-reception element 762 is not interrupted by a cartridge 588S normally accommodated in the cell 750 but is interrupted by a cartridge 588T accommodated in the cell 750 in the projecting-out state.

The photoelectric sensors 752 and 754 have three pairs of the light-emission element and the light-reception element, respectively. Three light-emission elements 760L and 760C and 760R are attached to the base 100 via a mounting member 764. Three light-reception elements 762L, 762C and 762R are attached to the top panel 104 via mounting member 766.

Figure 38:
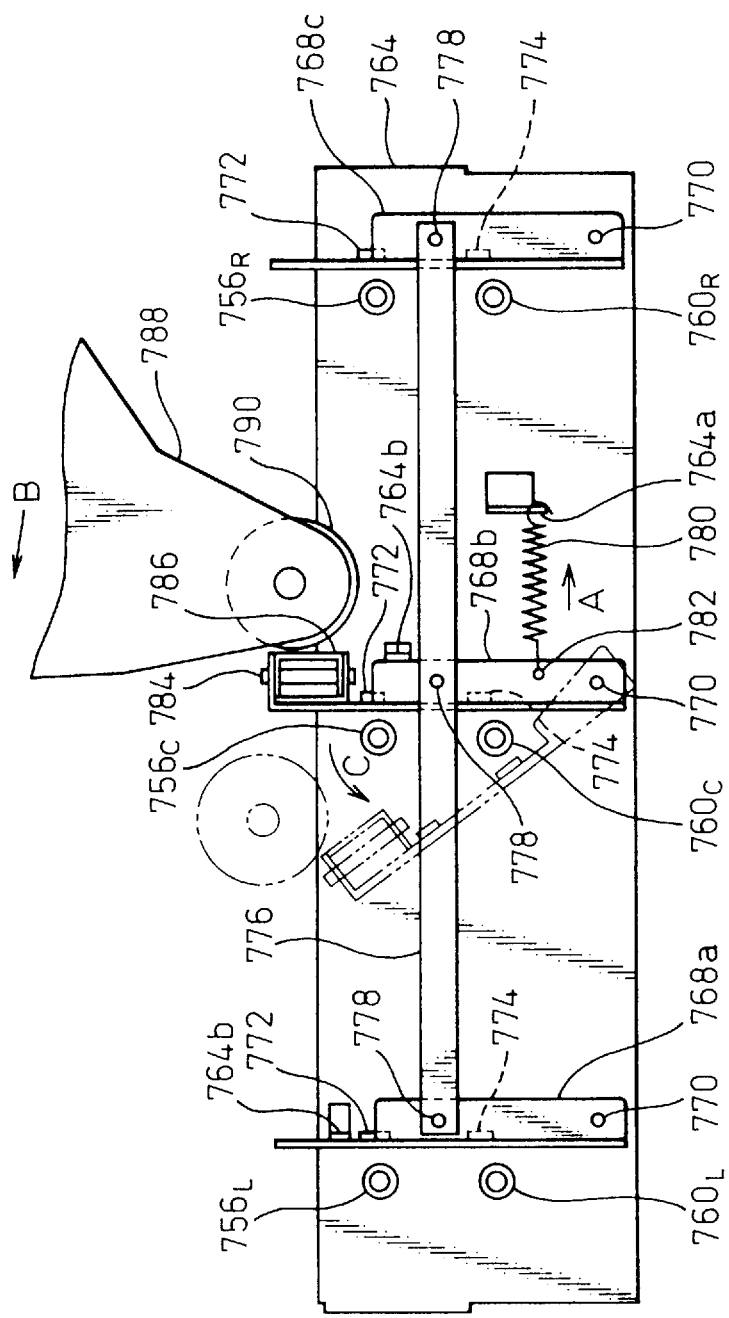
FIG. 38 is a detailed view for explaining a mechanism for cleaning the cartridge-detection mechanism.
Figure 39:
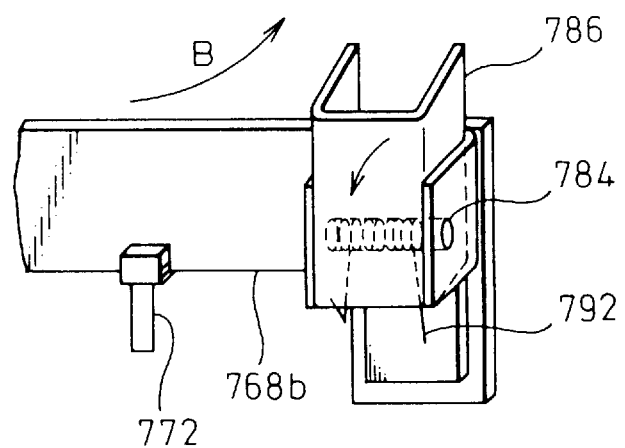
FIG. 39 is a perspective view of part of the cleaning mechanism shown in FIG. 38.

FIG. 38 is the illustration for explaining a mechanism for cleaning the cartridge detection mechanism. FIG. 39 is a perspective view of part of the cleaning mechanism shown in FIG. 38.

In FIG. 38, the light-emission elements 756L, 756C and 756R in the photoelectric sensor 752 and the light-emission elements 760L, 760C and 760R in the photoelectric sensor 754 are secured onto the mounting member 764. Three levers 768a, 768b and 768c are rotatably held on the mounting member 764, respectively, via pins 770. Each of the levers 768a through 768c carries brushes 772 and 774, the levers 768a through 768c are coupled with each other by a connecting bar 776, respectively, by pins 778. In relation to the connecting bar 776, the lever 768a is rotatable at one end of the connecting bar 776, the lever 768b is rotatable at a center thereof and the lever 768c is rotatable at the other end thereof. The lever 768b is biased in the arrowed direction A by a spring 780. One end of the spring 780 is hooked to a hole 782 of the lever 768b and the other end to an upright piece 764a cut and bent from the mounting member 764. The movement of the lever 768a is limited by an upright piece 764b cut and bent from the mounting member 764.

A contact plate 786 is attached to the lever 768b to be rotatable on a shaft 784. The contact plate 786 is provided at a position to be brought into contact with a roller 790 rotatably mounted to a tip end of a lever member 788 attached to the flange 706b of the drum base 706 of the drum unit 10a. When the roller 790 moves in the arrowed direction B as the drum 15a rotates, the roller 790 causes the contact plate 786 to rotate in the arrowed direction C. The lever 768b rotates on the pin 770 together with the contact plate 786. According to the rotation of the lever 768b, the brushes 772 and 774 provided on the respective levers 768a through 768c slide on the surfaces of the light-emission elements 756L, 756C, 756R, 760L, 760C and 760R. Accordingly, the surfaces of the light-emission elements 756L, 756C, 756R, 760L, 760C and 760R are always cleaned when the drum 15a rotates.

In this regard, when the drum 15a rotates reverse to the allowed direction B, the contact member 786 rotates on the shaft 784, but the lever 768b is still maintained at a position shown by a solid line in FIG. 38 by the action of the upright piece 764a. When the engagement between the contact member 786 and the roller 790 is released, the contact member 786 returns to a position shown in FIG. 38 by a biasing force of a spring 792.

Figure 40:
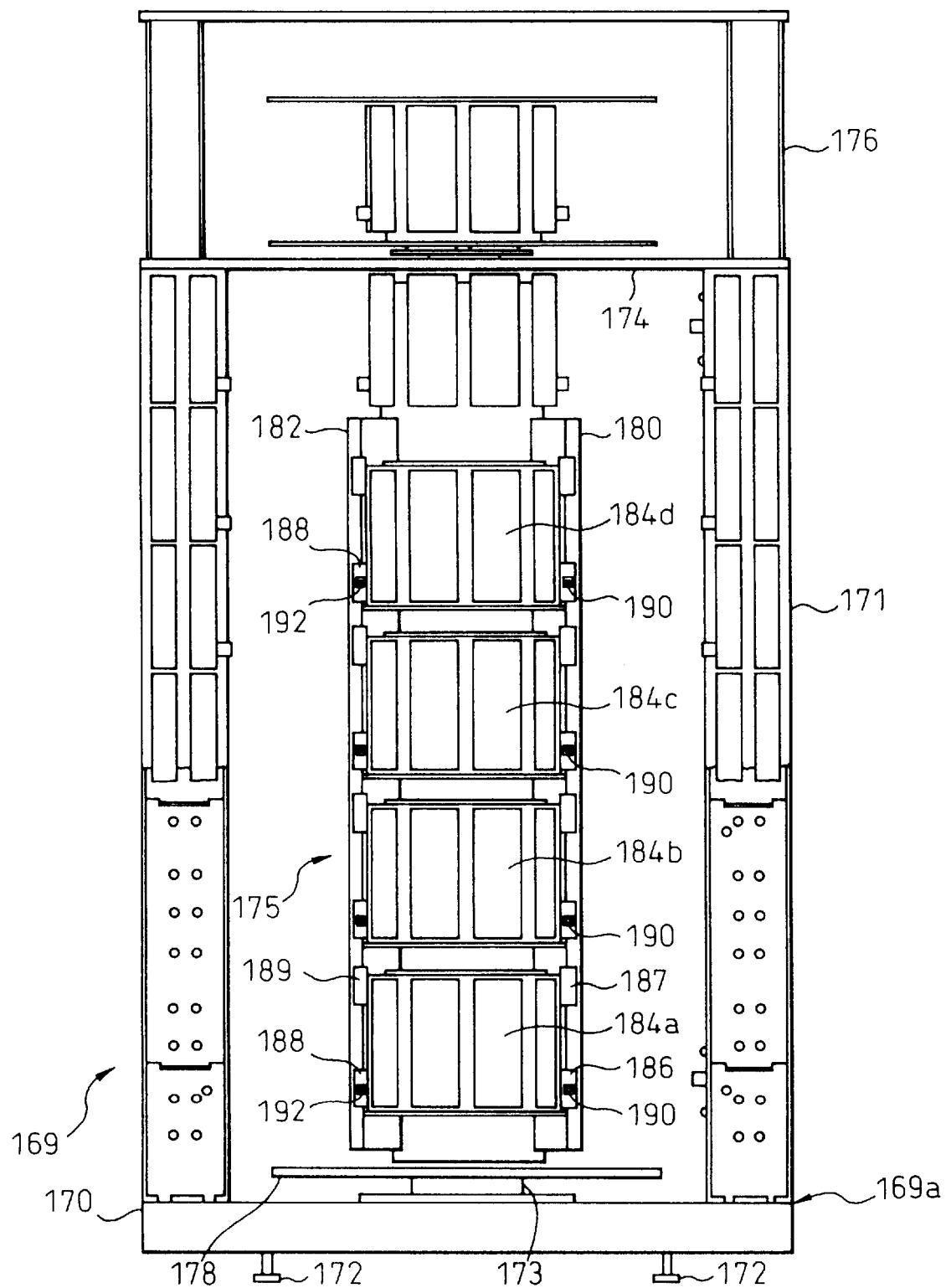
FIG. 40 is a side view of a structure of the drum unit using a DEE magazine.

FIG. 40 is the illustration for explaining the structure of a drum unit wherein a DEE magazine is used.

In FIG. 40, a drum unit 169 includes an upper unit 176 and a lower unit 171. In the lower unit 176, a magazine drum 175 is rotatably provided between a base 170 supported by footing 172 and a top panel 174. The upper unit 176 is provided with a cell unit rotatable with the magazine drum 175.

The magazine drum 175 is provided with a flange 178. The magazine drum 175 is driven to rotate when the flange 175 is rotated by a drum motor 173. The magazine drum 175 has a heptagonal cross-section similar to the cell drum 15a described with reference to FIGS. 23 and 24. The magazine drum 175 is constituted by seven flat panels assembled to have a heptagonal cross-section. Since FIG. 40 is a front view of the drum unit 169, only one surface of the magazine drum 175 is illustrated.

Frame panels 180 and 182 are attached to the respective flat panel of the magazine drum 175. Four magazine shelves 184a through 184d are formed between the frame panels 180 and 182 in a stacked manner. Each of the magazine shelves 184a through 184d has guide plates 186, 187, 188 and 189 used for an entry guide for the magazine. Position correction marks 190 and 192 are provided on the guide plates 186 and 188, respectively.

On the front surface of the drum unit 169, a decorative panel with the DEE door 64 is attached in a manner similar to that of the drum unit 10a shown in FIG. 23. A magazine 200 is loaded into each of the magazine shelves 184a through 184d by the operator while the DEE door 64 is opened.

Figure 41:
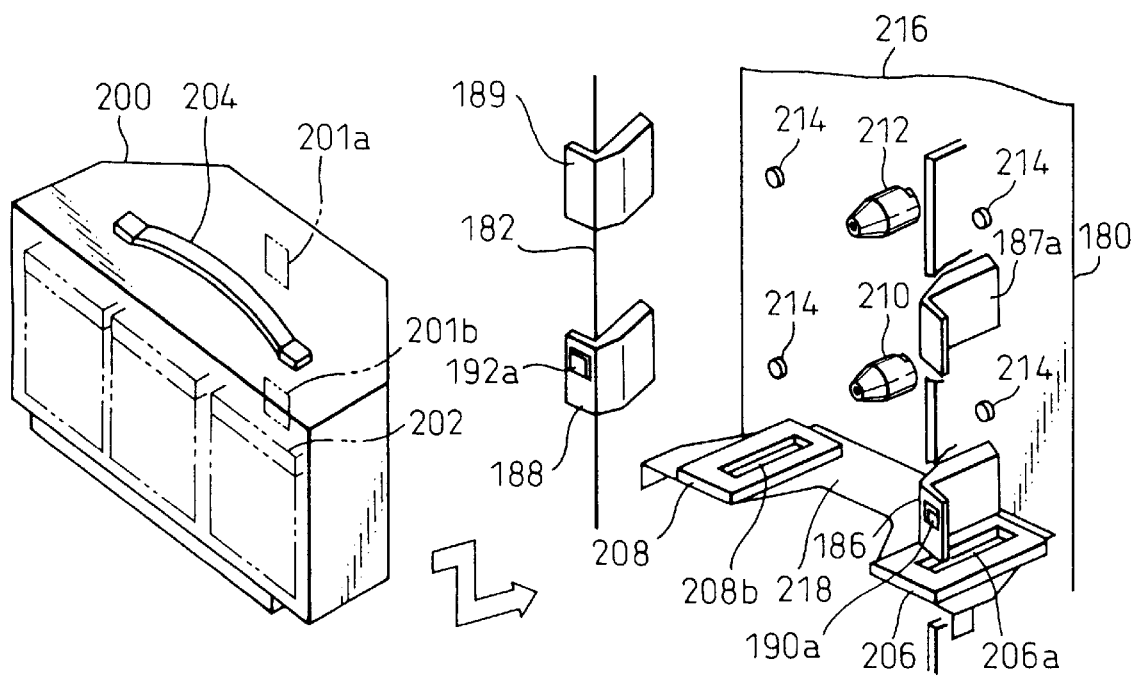
FIG. 41 is a diagrammatic perspective view showing a structure of the magazine and a magazine shelf.

FIG. 41 is an illustration for explaining the operation for loading the magazine to the magazine shelf of the drum unit.

Figure 42A:
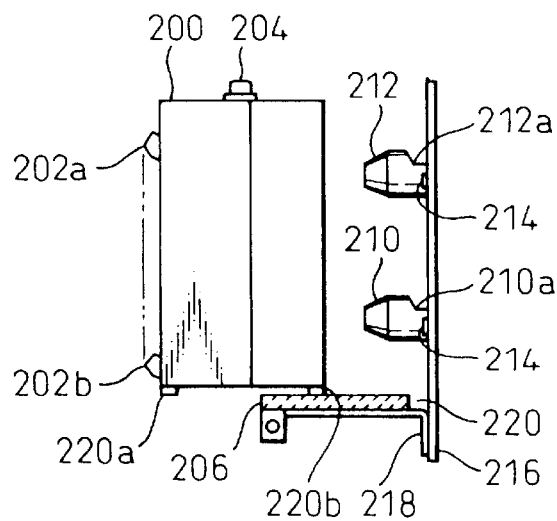
FIG. 42A is a view for explaining the operation for loading the magazine into the magazine shelf of the drum unit.
Figure 42B:
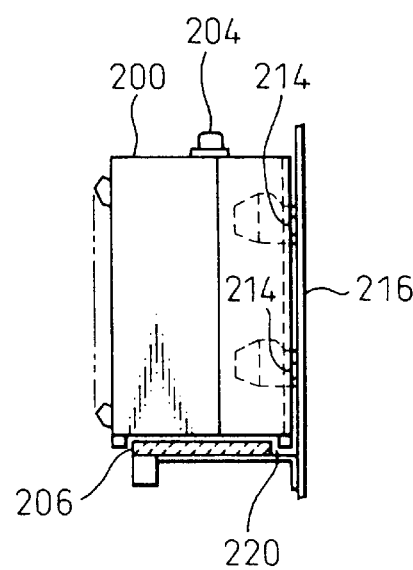
FIG. 42B is a view showing a state wherein the magazine is loaded in the magazine shelf of the drum unit.

With reference to FIGS. 41, 42A and 42B, the magazine 200 is provided with cells arranged at six stages while forming three rows. Accordingly, it is possible to load eighteen cartridges 202 at once in the drum unit 169 by the magazine 200. The magazine 200 has a grip 204 on the upper surface thereof and positioning holes 201a and 201b on the back surface thereof.

The magazine 200 is loaded into the magazine shelf 184a formed on the frame panels 180 and 182 along the guide plates 186, 187, 188 and 189. These guide plates 186 through 189 are accurately attached to the frame panels 180 and 182 so that a predetermined relationship is obtained between a lateral directional (X-directional) position thereof and a positioning reference point 169a of the drum unit 169 (see FIG. 40).

The magazine 200 is placed on magazine-placing plates 206 and 208 provided on a shelf plate 218 of the magazine shelf 184a. As shown in 31A, a space 220 is provided between the rear edge of the plates 206 and 208 and a back panel 216. When the magazine 200 is loaded, guide projections 220b provided on the lower part of the magazine 200 are engaged with guide grooves 206a and 208a formed on the plates 206 and 208, respectively. The magazine 200 is inserted along the guide grooves 206a and 208a. When the magazine 200 has been fully inserted to the innermost area of the magazine shelf 184a, the engagement between the guide projections 220b provided on the lower part of the magazine 200 and the guide grooves 206a and 208a is released, and the guide projections 220b is located within the space 220, as shown in FIG. 42B.

In other words, the positioning holes 201a and 201b are engaged with projections 212 and 210, respectively, provided on the back panel 216 constituting the magazine drum 175. These projections 210 and 212 are attached to the back panel 216 so that a predetermined relationship is obtained between the height directional (Y-directional) positions of recessed portions 210a and 212a of these projections 210 and 212 and the positioning reference point 169a defined at a rightside lower end of the drum unit 169 shown in FIG. 40.

Moreover, the inward directional positioning of the magazine 200 is achieved by abutting the back surface of the magazine to positioning projections 214 provided on the back panel 216 of the magazine drum 175. These projections 214 are attached to the back panel 216 so that a predetermined relationship is obtained between the inward directional (Z-directional) positions of the projections 214 and the positioning reference point 169a defined at a rightside lower end of the drum unit 169 shown in FIG. 40.

As stated above, the magazine 200 is accurately located at the predetermined position in the magazine shelf 184 of the magazine drum 175. In this regard, the position of the magazine shelf 184a for the magazine 200 is one wherein a rotating path of the cartridge 202 accommodated in the cell of the magazine 200 is the same as that of the cartridge 52 or 53 accommodated in the cell of the drum unit 10a shown in FIG. 23. That is, the respective cell in the magazine 200 is formed while using the positioning holes 201a and 201b as a reference.

Accordingly, after the magazine drum 175 has been driven to rotate by the drum motor 173 to a position opposite the accessor 14, the cartridges 202a and 202b in the cells of the magazine 200 can be gripped by the accessor 14 similar to the cartridges 52 and 53 stored in the cells of the drum unit 10a.

Figure 43A:
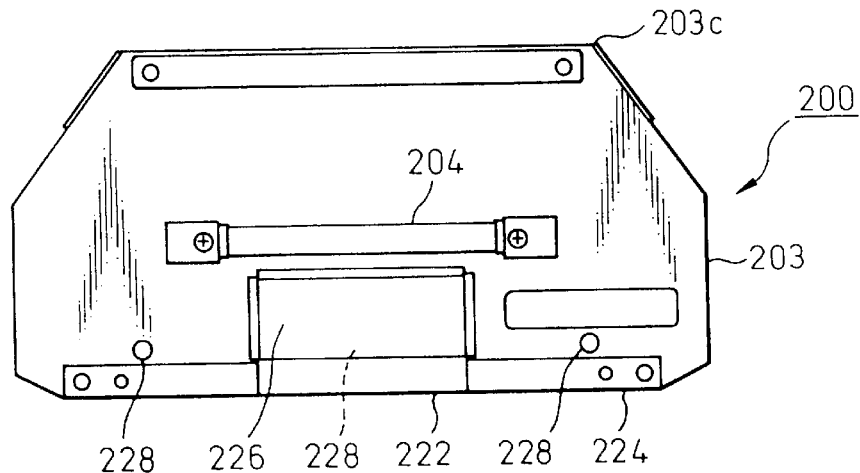
FIG. 43A is a plan view illustrating a detailed structure of the magazine.
Figures 43B, 43C:
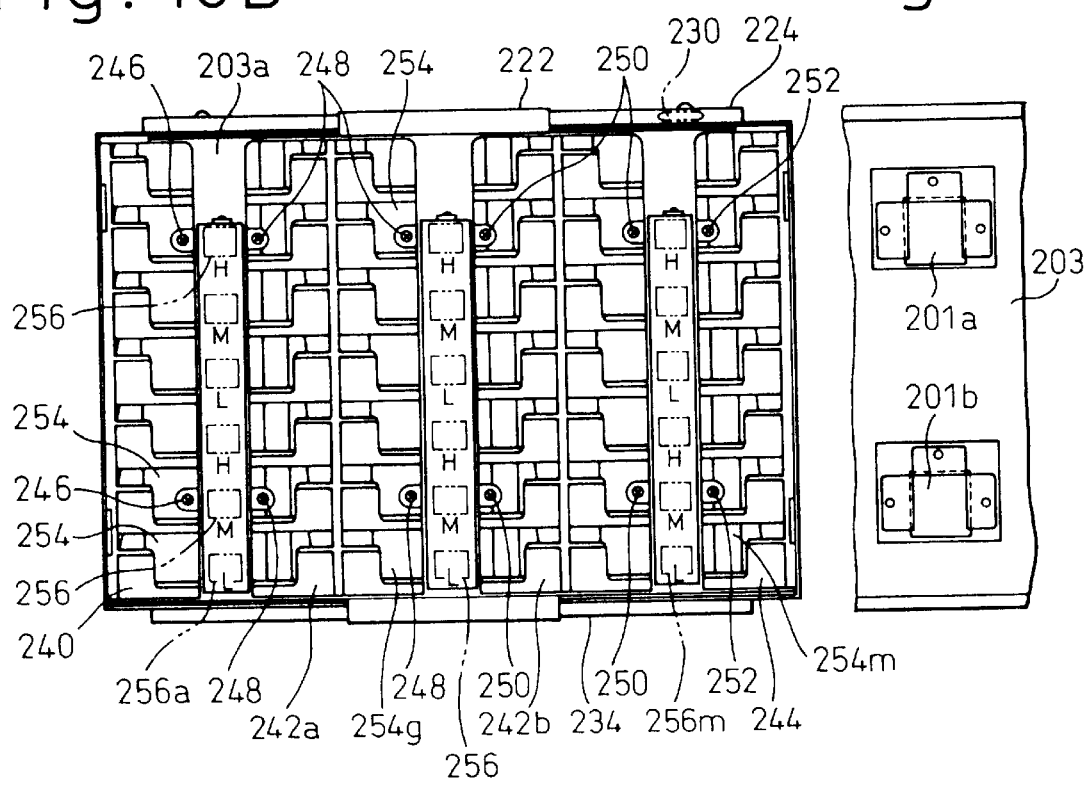
FIG. 43B is a front view illustrating a detailed structure of the magazine.
FIG. 43C is a back view illustrating a detailed structure of the magazine.

FIG. 43A is a plan view for illustrating the detailed structure of the magazine, FIG. 43B is a front view thereof, and FIG. 43C is a back view thereof.

With reference to FIGS. 43A through 43C, the magazine 200 has a housing 203 made of metal and a grip 204 on the upper part thereof for carrying the magazine. Other grips 222 and 232 are provided in upper and lower areas of the front surface of the housing 203 for loading the magazine 200 onto the magazine shelf 184a, the grips 222 and 232 are fixed to the housing 203 via plates 224 and 234 made of metal such as stainless steel. The housing 203 has an opening 226 for gripping the grip 222. The housing 203 is provided with holes 228 for allowing a light from a photoelectric sensor for detecting the presence of the cartridge to pass therethrough. The hole 228 for detecting the presence of the cartridge in the central row is not provided because the opening 226 for gripping the grip is formed in the housing 203. The surface of the metallic plate 224 is used as a position 230 for detecting the presence of the magazine.

The magazine 200 has cells 254 for accommodating the cartridges, arranged at six stages while forming three rows. These cells 254 are defined by a leftside rack 240, two intermediate racks 242a and 242b and a rightside rack 244. These racks 240, 242a, 242b and 244 are fastened to a metallic panel 203a located at a position different from that of a back panel 203c of the housing 203.

The leftside rack 240 is fastened to the metallic panel 203a with screws 246. The intermediate rack 242a is fastened to the metallic panel 203a with screws 248. The intermediate rack 242b is fastened to the metallic panel 203a with screws 250. The rightside rack 244 is fastened to the metallic panel 203a with screws 252.

A plurality of bar code labels 256 are attached to the metallic panel 203a. These bar code labels 256 correspond to the respective cells 254.

Thereby, according to the magazine 200 having these bar code labels, the operation for detecting the presence of the cartridge is assuredly carried out even when the bar code reader unit 101 such as one described with reference to FIGS. 23 and 24 is mounted to the drum unit 169.

Also, it is possible to load a number of cartridges at once into the library apparatus 2 by using the magazine 200. Since it is possible to handle the drum unit 169 using the DEE magazine 200 in a manner similar to drum units of other types, after the DEE magazine has been loaded into the magazine shelf 184, it is not always necessary to transfer the cartridges 202 in the DEE magazine loaded to the magazine shelf 184 to cells in another drum unit. Also, after the loading of cartridge into the cells in the other drum unit has been completed, the drum unit having the magazine shelf 184 in which the DEE magazine 200 is loaded can be handled in a manner similar to the other drum unit, resulting in the increase in the number of cartridges to be accommodated therein.

The drum unit 169 may be installed in place of the drum unit 10b of the library apparatus 2 shown in FIG. 1. Also, the library apparatus 2 shown in FIG. 1 may include four drum units 10b shown in FIG. 1, each solely provided with a cell drum 15b, one drum unit 10a shown in FIG. 23, and one drum unit 169. There are many possibilities for extending the drum units as shown in FIG. 2.

Figure 44:
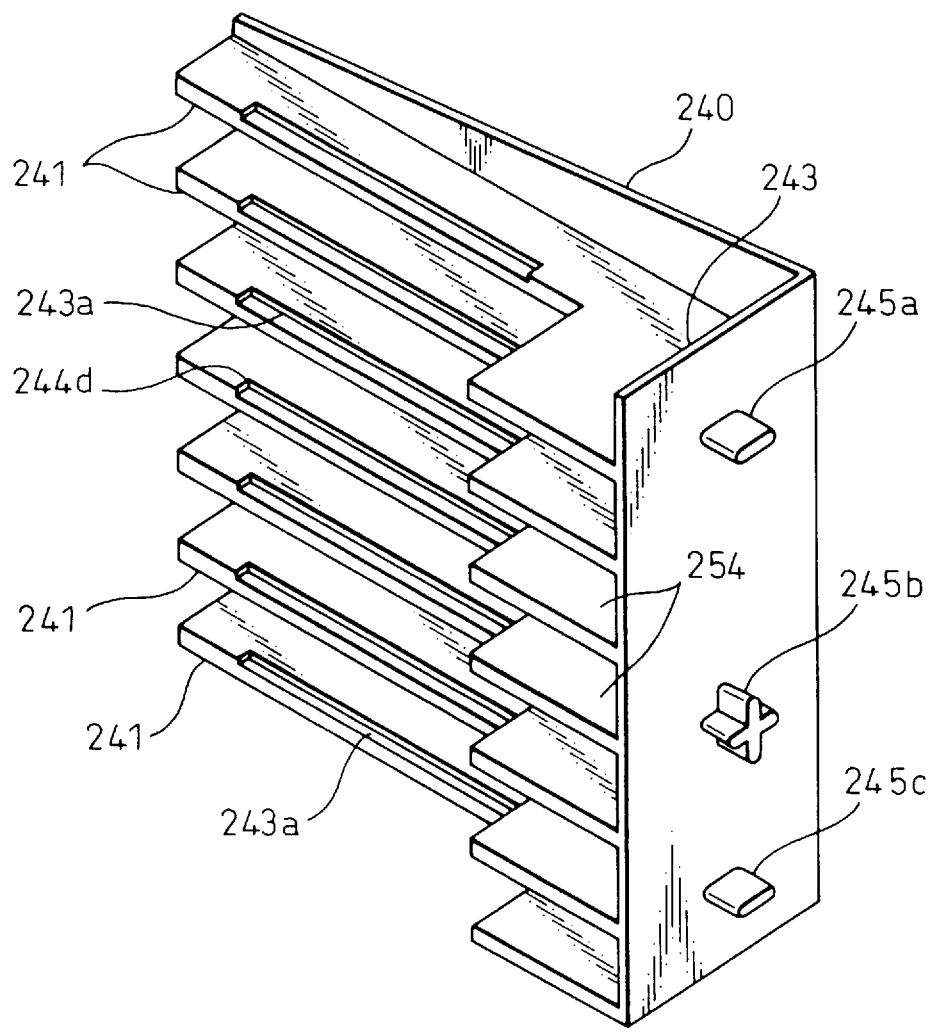
FIG. 44 is a perspective view of a leftside cell unit.
Figure 45:
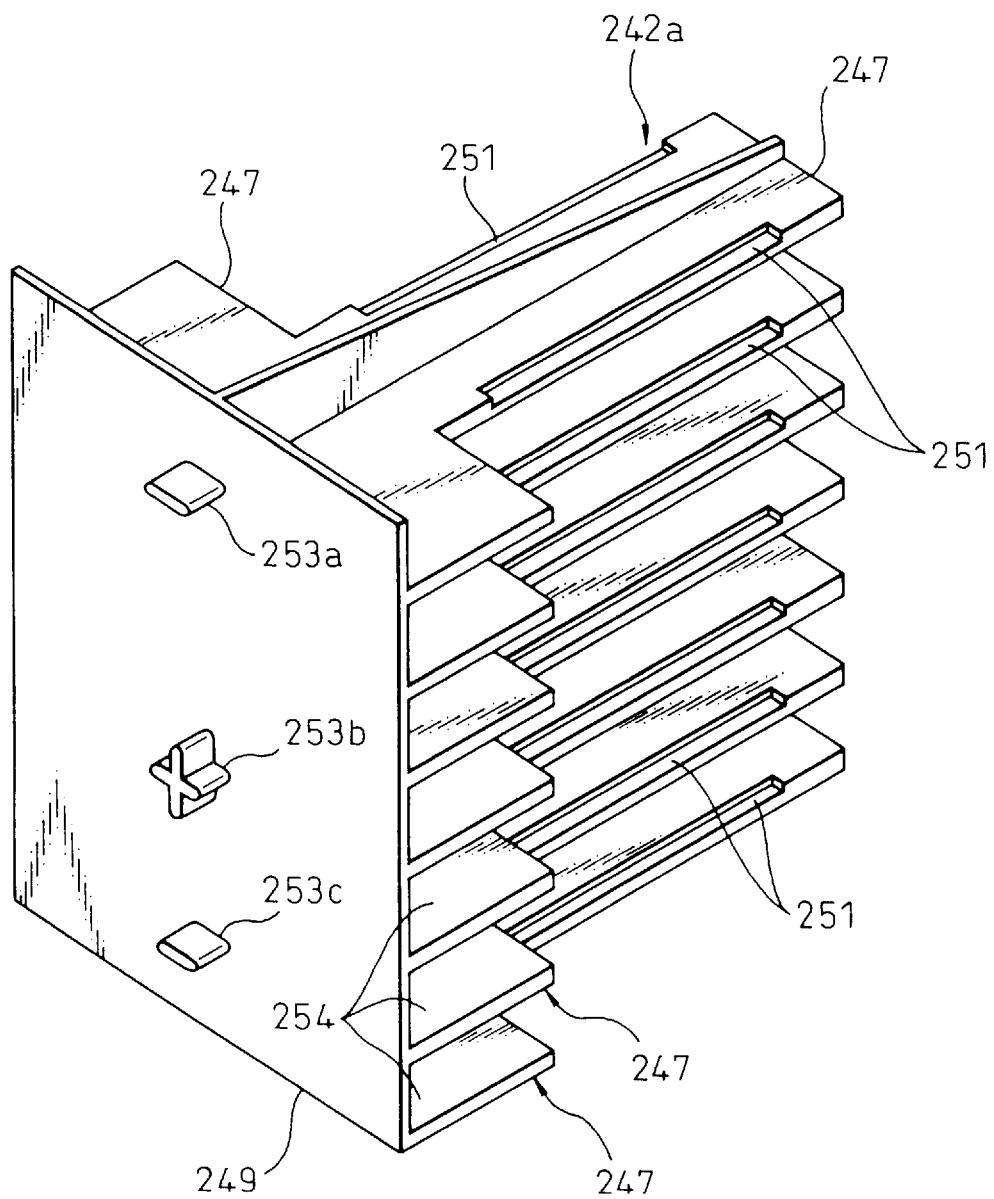
FIG. 45 is a perspective view of a central cell unit.
Figure 46:
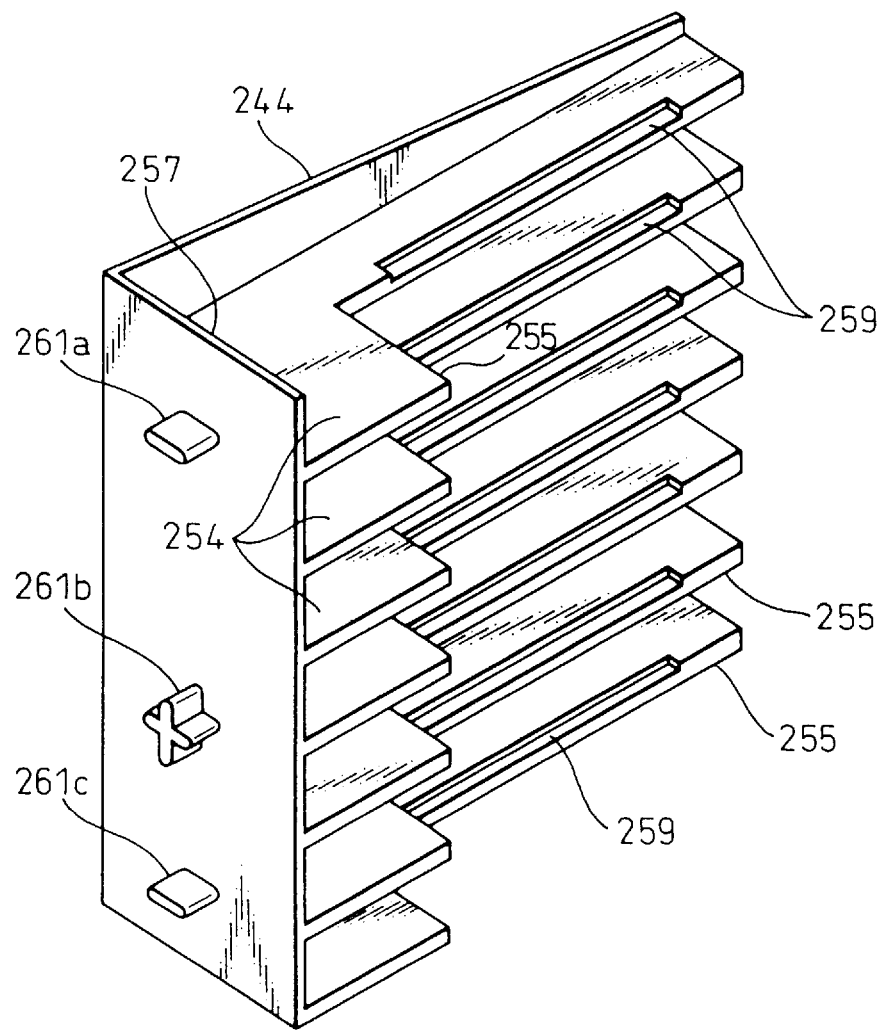
FIG. 46 is a perspective view of a rightside cell unit.

FIGS. 44, 45 and 46 are illustrations for explaining the leftside rack 240, the intermediate rack 242 and the rightside rack 244, respectively.

Figure 47:
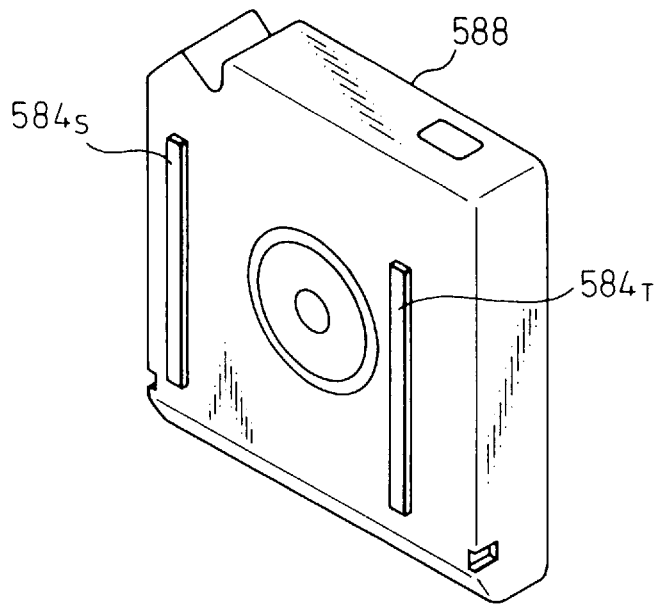
FIG. 47 is a perspective view of a magnetic tape cartridge.

In FIG. 44, the leftside rack 240 is molded in ABS resin. The leftside rack 240 is provided with shelf plates 241 for defining cells 254. Each of the shelf plates 241 extends obliquely upward from a back plate 243. An inclination angle of the shelf plate 241 relative to a horizontal plane is 12°. In other words, the inclination angle of the shelf plate 241 relative to the back plate 243 is 78°. The shelf plate 241 has a stepped portion 243a to be engageable with a projection 584S formed on the bottom surface of the magnetic tape cartridge 588 of a type 13480 shown in FIG. 47. The inclination angle of the shelf plate 241 and the stepped portion 243a constitute an anti-drop mechanism for the cartridge 588.

The back plate 243 has projections 245a, 245b and 245c on the surface opposite to the surface on which the shelf plate 241 is formed. The projection 245a is inserted into a hole 714a-1 in a row of holes 714a shown in FIG. 19. The projections 245b and 245c are inserted into holes 714a-2 and 714a-3, respectively. In this manner, when the three projections 245a through 245c of the back plate 243 are inserted into the holes 714a-1 through 714a-3, respectively, and fastened to the flat panel 54 by screws not shown, a camber thereof formed during the molding can be corrected. In this regard, positions on the leftside rack 240 at which screw holes are provided are shown in FIG. 43.

In FIG. 45, the intermediate rack 242a is molded in ABS resin in a similar manner as the leftside rack 240. Since the intermediate rack 242b has the same structure as the intermediate rack 242a, the explanation thereof will be omitted. The intermediate rack 242a is provided with shelf plates 247 for defining cells 254. Each of the shelf plates 247 extends obliquely upward from a back plate 249. An inclination angle of the shelf plate 247 relative to a horizontal plane is 12°. In other words, the inclination angle of the shelf plate 247 relative to the back plate 249 is 78°. The shelf plate 247 has a stepped portion 251 to be engageable with a projection 584T formed on the bottom surface of the magnetic tape cartridge 588 of a type 13480 shown in FIG. 47. The inclination angle of the shelf plate 247 and the stepped portion 251 constitute an anti-drop mechanism for the cartridge 588.

The back plate 249 has projections 253a, 253b and 253c on the surface opposite to the surface on which the shelf plate 247 is formed. The projections 253a through 253c are inserted into holes 714b-1 through 714b-3 of the flat panel 54, respectively, shown in FIG. 19. In such a manner, when the three projections 253a through 253c of the back plate 243 are inserted into the holes 714b-1 through 714b-3, respectively, and fastened to the flat panel 54 by screws not shown, a camber thereof formed during the molding can be corrected. In this regard, the positions on the intermediate rack 242 at which the screw holes are provided are shown in FIG. 43.

In FIG. 46, the rightside rack 244 is molded in ABS resin. The rightside rack 244 is provided with shelf plates 255 for defining cells 254 in association with the intermediate rack 242b. Each of the shelf plates 255 extends obliquely upward from a back plate 257. An inclination angle of the shelf plate 247 relative to a horizontal plane is 12°. In other words, the inclination angle of the shelf plate 255 relative to the back plate 257 is 78°. The shelf plate 255 has a stepped portion 256 to be engageable with a projection 584T formed on the bottom surface of the magnetic tape cartridge 588 of a type 13480 shown in FIG. 47. The inclination angle of the shelf plate 255 and the stepped portion 256 constitute an anti-drop mechanism for the cartridge 588.

The back plate 257 has projections 261a, 261b and 261c on the surface opposite to the surface on which the shelf plate 255 is formed. The projections 261a through 261c are inserted into holes 714d-1 through 714d-3 of the flat panel 54, respectively, shown in FIG. 19. In such a manner, when the three projections 261a through 261c of the back plate 257 are inserted into the holes 714c-1 through 714c-3, respectively, and fastened to the flat panel 54 by screws not shown, a camber thereof formed during the molding can be corrected. In this regard, the positions on the rightside rack 244 at which screw holes are provided are shown in FIG. 43.

In such a manner, the combination of the leftside rack 240, the two intermediate racks 242a, 242b and the rightside rack 244 enables to define the cells arranged at three stages while forming three rows.

In this regard, a plurality of sets of the leftside rack 240, the two intermediate racks 242a, 242b and the rightside rack 244 are attached to the flat panel 54 while being arranged in the height direction of the flat panel 54 in a stacked manner.

Between one set of the leftside rack 240, the two intermediate racks 242a and 242b and the rightside rack 244 and another set directly above the same, additional cells are defined for accommodating the cartridges. Since the DEE magazine 200 shown in FIG. 43 cannot form cells in the uppermost portion thereof because of the provision of grip 222, cells arranged at six stages while forming three rows are defined.

Also, by the combination of the leftside rack 240 and the rightside rack 244, cells arranged at six stages while forming one row can be defined. This is a case when a fixed cell 680a is defined in a pillar 668a of the drum unit 10A.

Alternatively, the combination of the leftside rack 240, the rightside rack 244 and the single intermediate rack 242a can define cells arranged at six stages while forming two rows.

As described above, it is possible to obtain various cell combinations in accordance with the number of the intermediate racks 242a and 242b arranged between the leftside rack 240 and the rightside rack 244. Further, such combinations of the leftside rack, the rightside rack and the intermediate rack can be used for defining cells for the DEE magazine.

Accordingly, when the cells for the DEE magazine, the fixed cell and the drum unit are defined, the leftside rack, the central cell, and the rightside rack can be commonly used. This enables the mass production of parts and a reduction in the manufacturing cost of cells.

FIGS. 48 through 57 are the illustration for explaining methods for coupling the respective units in the library apparatus according to the present invention.

Figure 48:
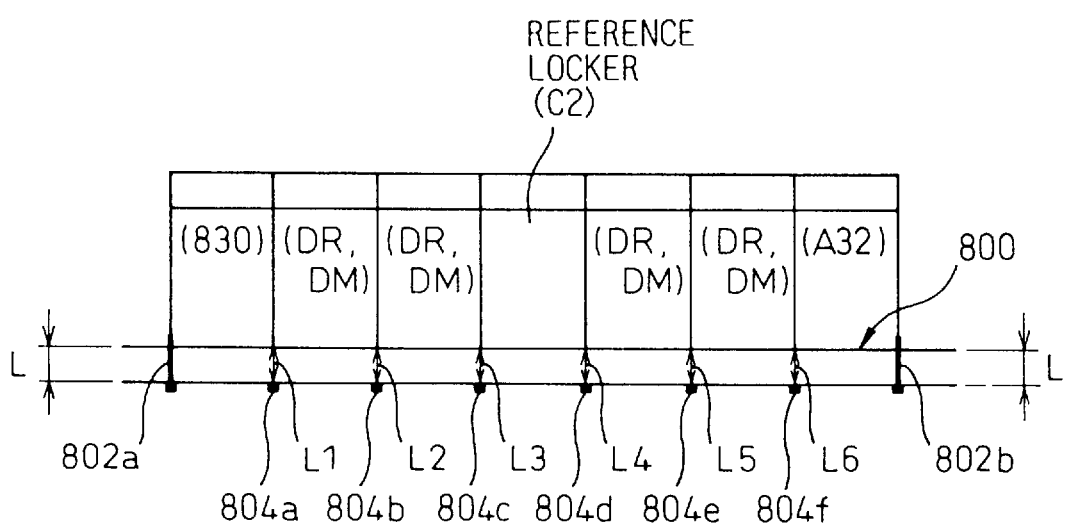
FIG. 48 is an illustration for explaining a method for manufacturing the library apparatus shown in FIG. 2.

FIG. 48 is the illustration for explaining a method for manufacturing the library apparatus shown in FIG. 2.

(a) Installation of Reference Cell Unit

In FIG. 48, a thread 800 is straightly extended on the floor in a tensioned state between poles 802a and 802b, while a position at which the reference unit 11 is to be installed is located at a center thereof. In this regard, when the thread 800 is extended on the floor in FIG. 48, the respective units are not located at a position at which the library apparatus is to be installed, but temporarily stored in part of a room in which the library apparatus is to be installed. Accordingly, the arrangement of the respective units shown in FIG. 48 is imaginary.

The poles 802a and 802b supporting the thread 800 are provided so that a height L thereof from the floor surface is, for example, 60 mm.

Next, marks 804a through 804f are marked on the floor surface at positions at which the respective units are to be installed. There are six marked positions on the floor. Heights L1 through L6 of the thread 800 from the floor surface are all measured at the marked positions. The marked position 804d at which the reference unit 11 is to be installed is selected as a reference point. A correction value is calculated from these measured values. The calculation is carried out by the following equation: Correction Value=L−(Minimum Value in L1 through L6). A corrected height of the reference unit 11 at the mark 804d is calculated by the following equation: Corrected Height=L3+Correction Value.

Figure 49A:
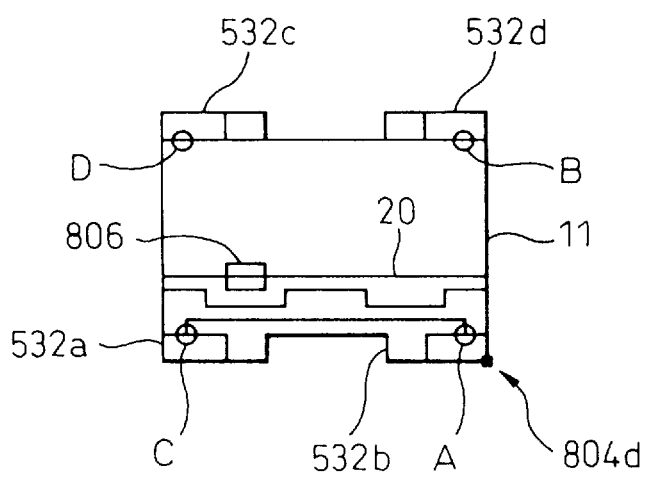
FIG. 49A is a bottom view of the reference unit for explaining a method for installing the reference unit.
Figure 49B:
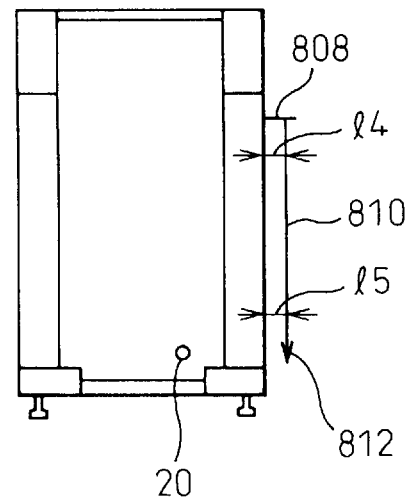
FIG. 49B is a side view of the reference unit for explaining a method for installing the reference unit.

The reference unit 11 which is a reference locker is actually installed so that the corrected height is equal to the calculated value at the marked position 804d. The marked position 804d is defined at one corner of the reference unit 11 at which the footing shown in FIG. 49A is provided. This marked position 804d becomes the reference point 11a.

After the reference point 11a of the reference unit 11 coincides with the mark 804d, the heights of the footings B through D are adjusted while fixing the footing A. The adjustment of the heights of the footings B through D is carried out by using a level 808 placed on the X rail 20 and a vertical measurement tool including a thread 810 hanging down from a member 808 on the reference unit 11 and a weight 812.

(b) Coupling of Passage Unit to Reference Cell unit

Figure 50:
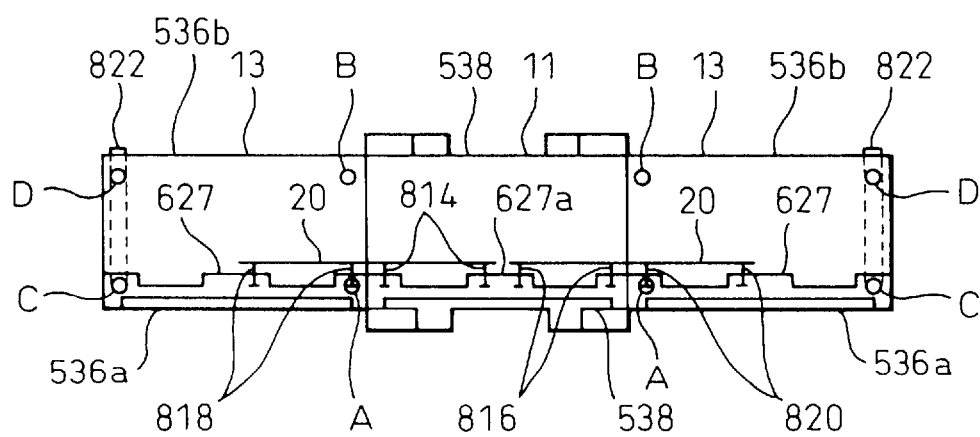
FIG. 50 is the illustration for explaining a method for coupling the passage unit to the reference unit.

The reference unit 11 has a structure similar to the passage unit 13 wherein signal cables and connectors are built-in for transmitting electric power, a power source sequence control signal and a drum control signal. First, the connectors of the reference unit 11 are coupled with those of the passage units 13 as shown in FIG. 50.

Thereafter, the passage units 13 are joined to both sides of the reference unit 11 while using the reference unit 11 as a reference. Footings A and C of the passage unit 13 are adjusted in height direction so that the upper edges of the side panels 536a, 536b of the passage unit 13 is flush with the upper edge of the surface plate 538 of the reference unit 13. Then, the footings C and D are adjusted in height so that a level not shown placed on the X rail 20 is within a tolerance. Further, the footings B and D are adjusted in height.

Next, a jig 822 is placed on a rail support 627 provided in the passage unit 13 and the upper surface of the side panel 536b in a bridge manner. The jig 822 is preliminarily prepared so that the upper surface thereof becomes horizontal when the upper end surfaces of a rail support 627 provided in the passage unit 13 and of the side panel 536b are horizontal. The footings B, C and D are adjusted in height so that a level placed on the jig 822 is within a tolerance, while fixing the height of the footing A.

After the X rail 20 of the passage unit 13 has been joined to a rail support for the X rail provided in the reference unit 11, the X rail 20 is fastened to the rail support with screws. The structure of the rail support 627a in the reference unit 11 is the same as the rail support 627 of the passage unit 13. To the rail support 627a of the reference unit 11, the X rail 20 is fastened with screws 814 and also the other X rail 20 is fastened with screws 816. To the rail support 627, the X rail 20 is fastened with screws 818. To the rail support 627 of the passage unit 13b, the X rail 20 is fastened with screws 820.

The height adjustment between the reference unit 11 and the passage unit 13 is carried out while using the side panel 536a of the passage unit 13. However, this is not limited thereto. For example, the height adjustment may be carried out so that the upper surfaces of the rail supports are flush with each other. Alternatively, the height adjustment may be carried out so that the upper surfaces of the rack supports to which a pinion of the X motor 42 is coupled are flush with each other.

Further passage units 13 corresponding to the number of drum units to be coupled with the library apparatus 2 can be coupled by repeating the operation described before. Since eight drum units are coupled in the library apparatus shown in FIGS. 2 and 487, two passage units 13 are arranged on each of both sides of the reference unit 11.

(c) Coupling of Accessor unit to Passage Unit

Figure 51:
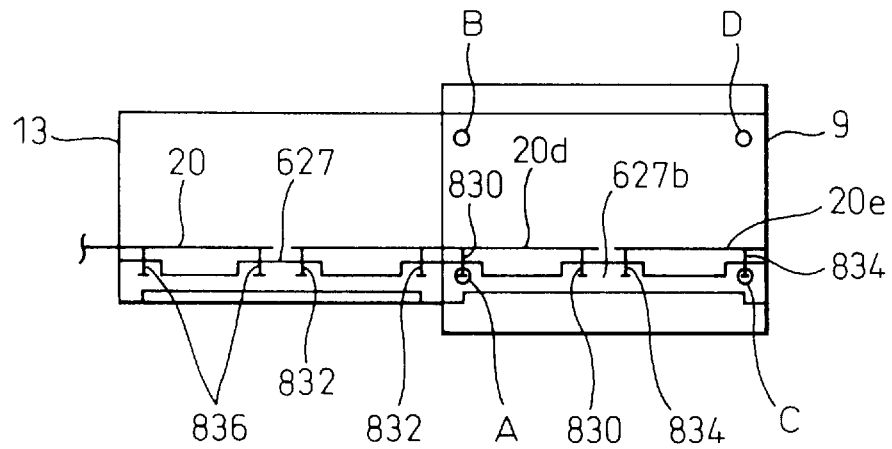
FIG. 51 is the illustration for explaining a method for coupling the accessor unit to the passage unit.
Figure 52:
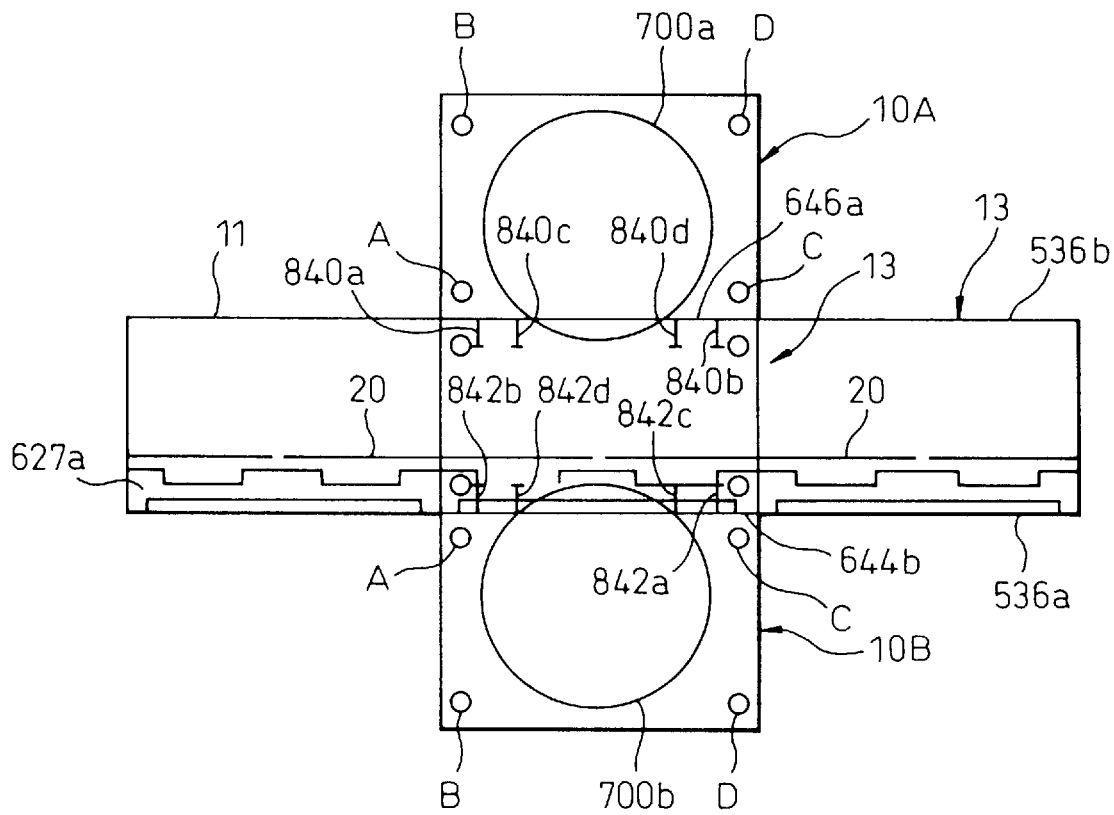
FIG. 52 is the illustration for explaining a method for coupling the drum unit to the passage unit.

As shown in FIG. 51, the accessor unit 9 is arranged adjacent the passage unit 13. The heights of the footings A and C of the accessor unit 9 are adjusted so that the upper surface of a rail support 627b of the accessor unit 9 and the rail support 627 of the passage unit 13 are flush with each other. The heights of footings C and D are adjusted while placing a level on the X rail 20 so that the level is within a tolerance. Then, while observing a vertical measurement tool consisting of a thread attached to the pillar 35a of the accessor unit 9 (see FIG. 6) and a weight, the heights of footings B, C and D are adjusted so that the height is within a tolerance while the footing A is maintained in a fixed state.

After the height adjustment of the footings A through D has been completed, an X rail 20d is shifted. Then the X rail 20d is fastened to the rail support 627 with screws 832. Further, the X rail 20d is fastened to the rail support 627b of the accessor unit 9 with screws 830. Next, an X rail 20e of half a length is fastened to the rail support 627b with screws 834. In this regard, the X rail 20 has been already fastened to the passage unit 13 with screws 836.

The coupling of the accessor unit 7 to the passage unit 13 is carried out in the same manner as described above.

(d) Coupling of Drum Unit to Passage Unit

The drum units 10A and 10B described with reference to FIG. 17 are transported from a factory to an installation site in a state wherein the lower unit 652a is separated from the upper unit 684a. The assembly of the lower unit 652a and the upper unit 684a is carried out in a room wherein the library apparatus 2 is to be installed. In the coupling operation, the end section 728a of the stud 728 provided in the upper part of the drum 700 in the lower unit 652a is inserted into the hole 724z of the bottom panel 724 of the drum 702 in the upper unit 684a, and the pin 742 in the end portion of the arm 738a of the connecting arm 738 fixed to the stud 728 is inserted into the hole 724a.

Thereafter, the drum units 10A and 10B are arranged adjacent the side panels 536a and 536b of the passage unit 13. Then, the reference surfaces 646a and 646b on the front surface of the drum units 10A and 10B are joined to the side panels 536a and 536b. Further, the height of the upper edges of the reference surfaces 646a and 646b are adjusted to be equal to that of the upper ends of the side panels 536a and 536b. This height adjustment is carried out via footings A and C. The drum units 10A and 10B are fastened to the passage unit 13 with bolts 840a, 840b, 842a and 842b. The inclination in the front/rearward directions is corrected via footings B and D while using a height measurement tool consisting of a thread hanging down from the top panel 655a of the drum unit 10A and 10B and a weight. Then, the inclination in the lateral direction is corrected via footings C and D or A and B. After the completion of the adjustment, the drum units 10A and 10B are fastened to the passage unit 13 with bolts 840a through 840d and 842a through 840d.

The drum unit 10A and 10B are coupled to the passage unit 13 one by one.

(e) Coupling of Drum Unit to Upper Unit

Figure 53:
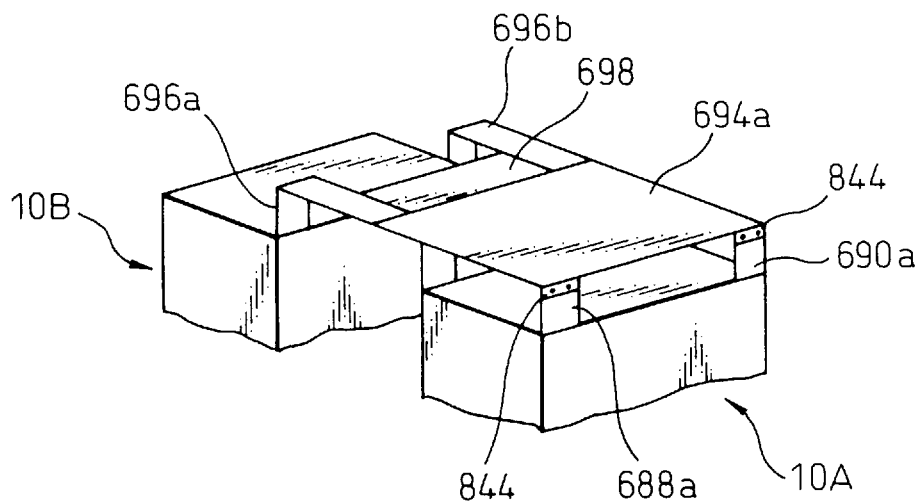
FIG. 53 is the illustration for explaining a method for coupling two drum units to each other.

As shown in FIG. 53, after the drum units 10A and 10B have been coupled to each other by the connecting bars 696a and 696b, the top panel 698 is fixed by screws. Further, the cover 694 is fastened to the pillars 688a and 690a with screws 844.

(f) Mounting of Upper Rail

Figure 54:
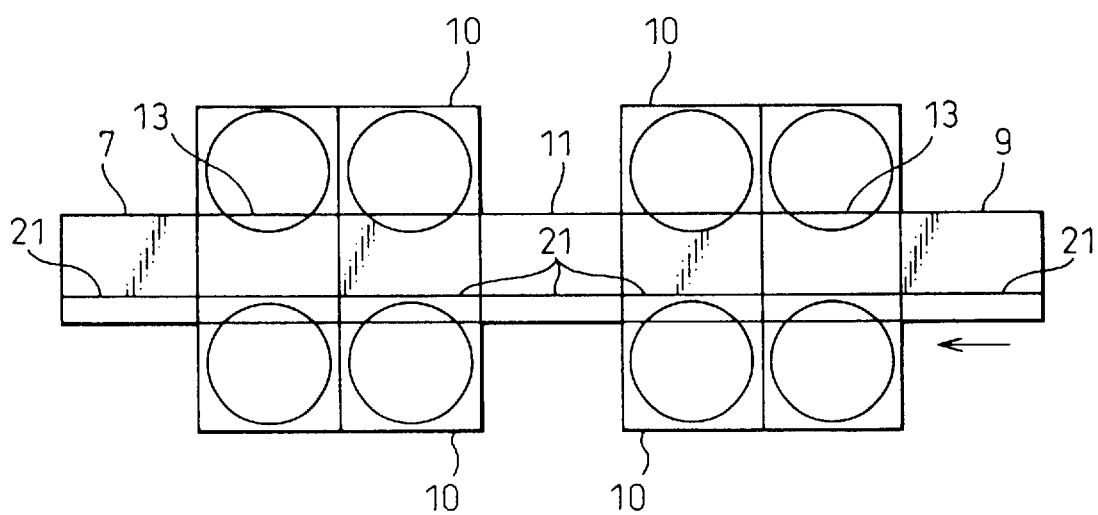
FIG. 54 is the illustration for explaining a method for mounting a top rail.

As shown in FIG. 54, the upper rail 21 is attached to the accessor unit 9 and then sequentially to the respective units.

(g) Coupling of Drive Unit

Then, as described with reference to FIGS. 8 and 9, the manual mount cell 554 of the tape drive unit 540 in the drive unit 12 is replaced by the accessor mount cell 556. The drive unit 12 is fastened to the reference unit 11 with screws 546.

(h) Finally, as described with reference to FIGS. 14 through 18, the connectors 636 and 638 in the passage unit 13 are connected to the connectors 660a and 660b in the drum unit 10.

In the above-mentioned manner, the library apparatus 2 is assembled.

Since the library apparatus 2 is assembled by units, the time necessary for the assembly can be shortened, after parts of the apparatus have been taken to the installation site. Also, since the parts are conveyed as units, it is easy to take the same into a room wherein the library apparatus is to be installed, even if the library apparatus is capable of accommodating a large number of cartridges therein.

In addition, since the upper unit can be coupled, it is possible to increase the number of cartridges to be accommodated in the height direction.

Since it is possible to selectively arrange the drum units or others having DEE magazines, the degree of freedom for systematizing the library apparatus 2 can be increased to a great extent.

Figure 55:
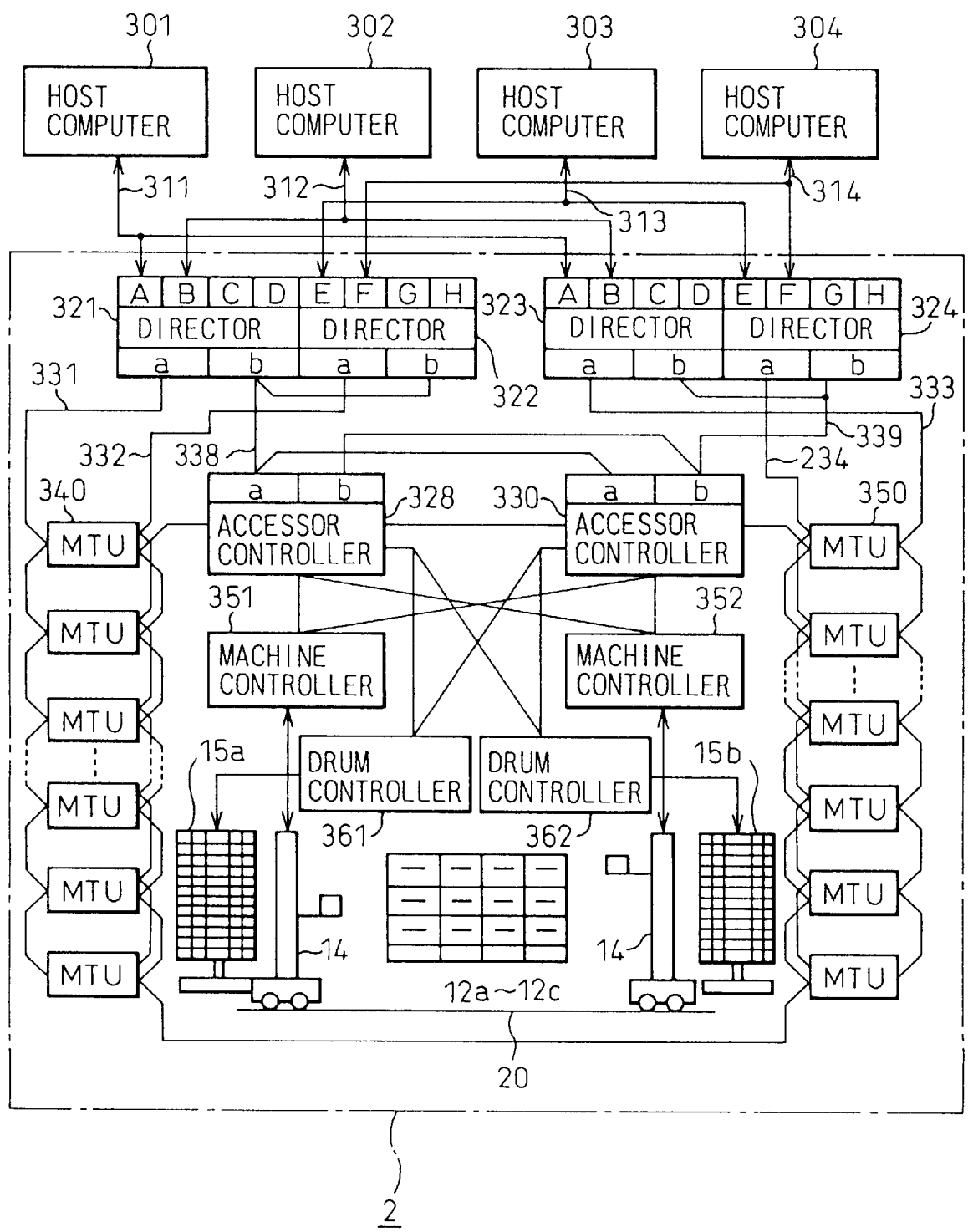
FIG. 55 is a diagram for illustrating one example of a structure of hardware of the library apparatus.

FIG. 55 illustrates one embodiment of a hardware of the library apparatus 2. In FIG. 55, four host computers 301 through 304 are connected to the library apparatus 2 via channel interface buses 311 through 314, respectively.

As such channel interface buses 311 through 314, a block multiplexer channel interface, an SCSI interface or the like can be used. For example, four directors 321 through 324 are provided in the library apparatus 2. The directors 321 and 323 have channels A, B, C and D, respectively. The directors 322 and 324 have channels E, F, G and H, respectively.

The channel interface bus 311 from the host computer 301 is connected to the channels A of the directors 321 and 323, and the channel interface bus 312 from the host computer 302 is connected to the channels B thereof. Also, the channel interface bus 313 from the host computer 303 is connected to the channels E of the directors 322 and 324, and the channel interface bus 314 from the host computer 304 is connected to the channels F thereof. Note the channels C and D of the directors 321 and 323 and the channels G and H of the directors 322 and 324 are not used.

Two channels a and b are provided on a terminal unit side of each of directors 321 through 324, wherein the channel a is for a recording/regeneration device and the channel b is for the accessor control. The directors 321 and 322 commonly have eight recording/regeneration devices 340 commonly connected to each other via device buses 331 and 332 from the channel a. Accordingly, the directors 321 and 322 can have access to the recording/regeneration device 340 via the channel a to carry out the writing/reading operation thereto. These eight recording/regeneration devices 340 are provided in the drive units 12a and 12c.

The directors 323 and 324 have eight recording/ regeneration devices 350 commonly connected to each other via device buses 333 and 334 from the channel a. Accordingly, the directors 321 and 322 can have access to the recording/regeneration device 350 via the channel a to carry out the writing/reading operation thereto. These eight recording/regeneration devices 350 are provided in the drive units 12b and 12d.

A device interface bus 238-1 connected to the channels b of the directors 321 and 322 is connected to the channel a of an accessor controller 228. Similarly, a device interface bus 338 extending from the channels b of the directors 323 and 324 is connected to the channels b of the accessor controller 328.

An accessor controller 330 is a spare wherein a device interface bus 338 connected to the channels b of the directors 321 and 322 is connected to the channel a thereof, while a device interface bus 339 connected to the channels b of the directors 323 and 324 is connected to the channel b thereof.

The accessor controllers 328 and 330 carry out the operation upon the reception of a command from any one of the directors 321 through 324. Machine controllers 351 and 352 are provided, under the supervision of the accessor controller 328, for controlling the accessor 14 in the accessor unit 7 and the accessor 14 in the accessor unit 9, respectively. In addition, drum controllers 361 and 362 are provided, under the supervision of the accessor controller 328, for controlling the cell drums 15a and 15b in the respective drum units 10a, 169 or others. In this regard, for the simplicity of the explanation, two cell drums 15a and 15b are shown as cell drums in FIG. 55.

The machine controllers 351 and 352 and the drum controllers 361 and 362 are also commonly connected to the accessor controller 330.

Each of the host computers 301 through 304 designates a logical machine number address, based on the demand for the input/output device to the library apparatus 2 accompanied with the job execution, and issues a move command functioning as an input/output starting command to the directors 321 and 322 through the channel allocated thereto. If the normal reception answer to the move command is obtained from the director side, the host computer transfers a data byte (command parameter) thereto as a medium-transportation information.

This data byte includes an address from which the cartridge exits (original address) and an address which the cartridge is delivered (delivery address), and is stored in a queuing table of the accessor controller 328. When it has recognized that the accessor 14 of the accessor units 7 and 9 is empty, the accessor controller 328 takes out the original address and delivery address from the queuing table, and makes the machine controllers 351 and 352 move the accessor 14. Also, if necessary, the accessor controller makes the drum controllers 361 and 362 rotate the cell drums 15a and 15b.

In this case, the accessor controller 328 converts the original and delivery cell addresses taken out from the queuing table to a rotating angle θ of the cell drum and a position of the accessor on the X, Y coordinates while referring to a conversion table. The cell drum and the accessor are driven accordingly.

Figure 56:
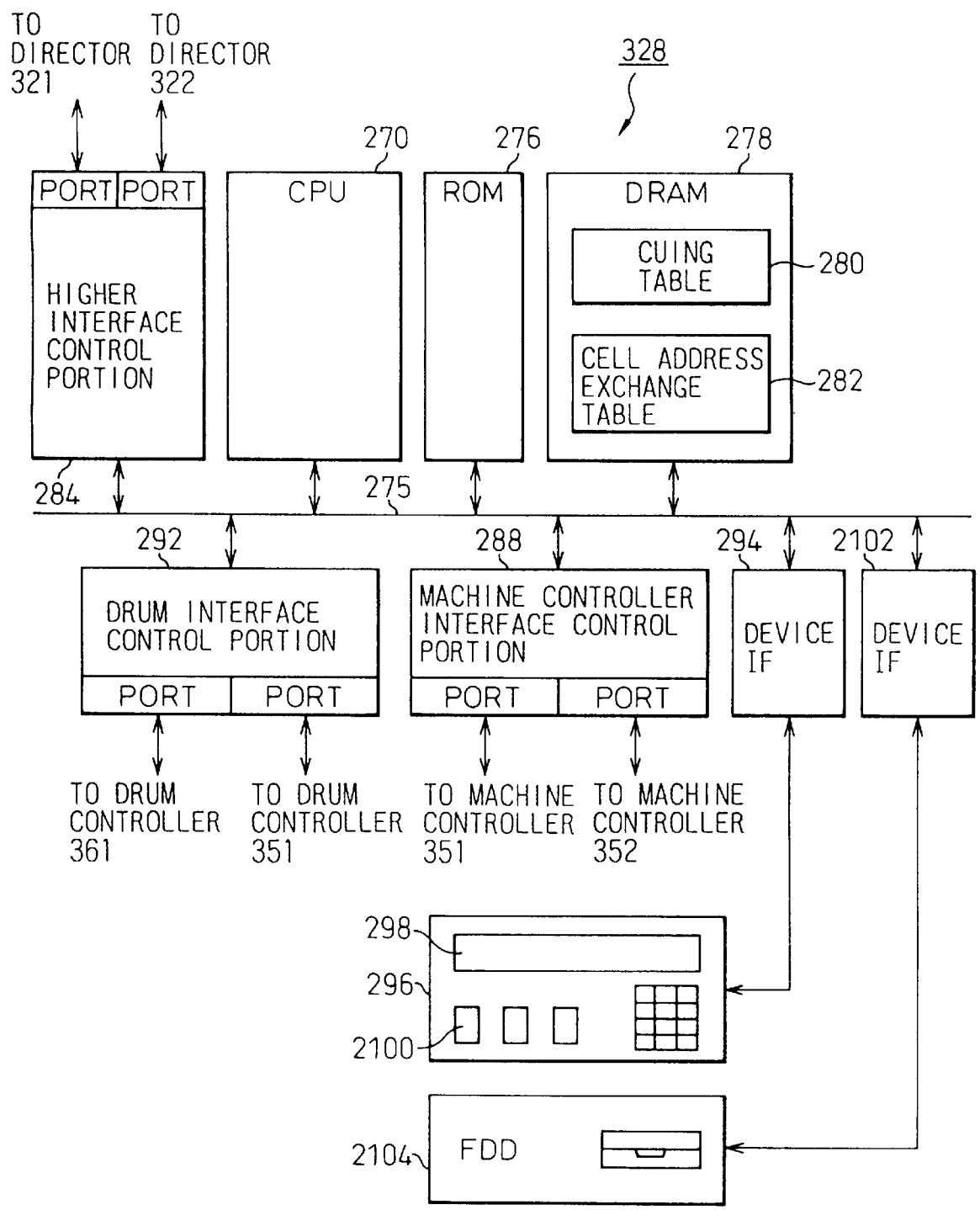
FIG. 56 is a diagram for illustrating one example of a structure of hardware of an accessor controller.

FIG. 56 is the illustration of one embodiment of a hardware structure of the accessor controller 328.

In FIG. 56, CPU 270 is connected via a bus 275 to ROM 276, DRAM 278, an higher interface control portion 284, a machine controller interface control portion 288, a drum interface control portion 292 and device interface control portion 294 and 2102. CPU 270 carries out the control operation based on a program stored in ROM 276. DRAM 278 has a queuing table 280 and a cell address conversion table 283. The queuing table 280 stores a move command issued from the host computer via the director. The cell address conversion table 282 stores a drum rotation angle θ and a coordinate (X, Y) of a position to which the accessor is delivered while using the cell address as an entry.

Also, a CE panel 296 having a display 298 and a floppy disk selection switch 2100 and a floppy disk device 2104 are connected to CPU 270 via the interface control portions 294 and 2102.

Figure 57:
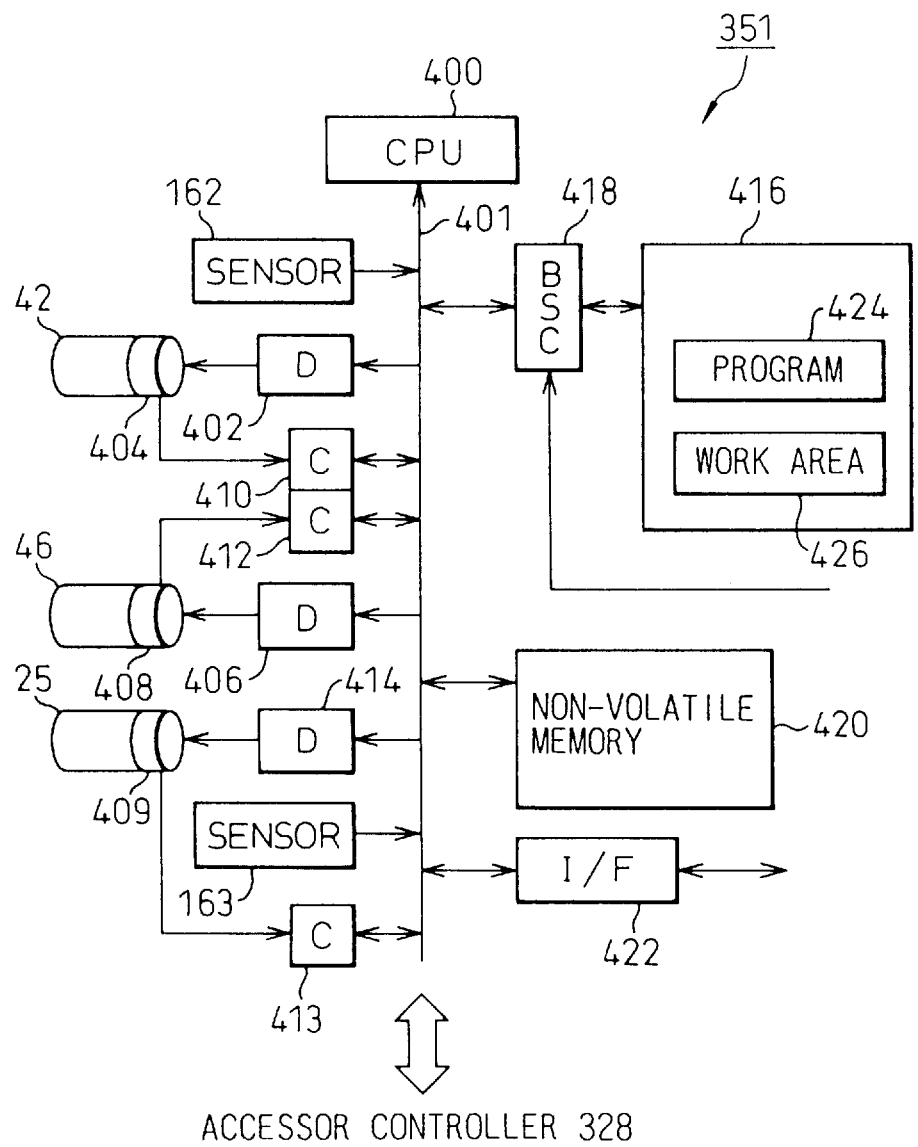
FIG. 57 is a diagram for illustrating one example of a structure of hardware of a machine controller.

FIG. 57 is the illustration of one embodiment of a hardware structure of the machine controller 351.

In FIG. 57, CPU 400 is connected via a common bus 401 to RAM 416 having a program storage area 424 and a work area 426, and a non-volatile memory 420. RAM 416 is commonly connected via a bus switching circuit 418 to the accessor controller 328. An operation control program is installed into the program storage area 424 from the floppy disk device 2104 of the accessor controller 328 via the bus switching circuit 418. The accessor controller 328 is connected to the machine controller via a signal line to transmit a bus switching signal to the bus switching circuit 418 and for transmitting data and addresses thereto.

CPU 400 is connected via an interface 422 to an interface 156 of the drum control portion. CPU 400 transmits information via these interfaces 422 and 156 to CPU 150. The interface 422 is also connected to a port 288A of the machine controller interface control portion 288 in the accessor controller 328.

A detection output is input to CPU 400 from the reflection type photoelectric sensor 162 provided at a tip end of the hand assembly 16. The drivers 402, 406 and 414 for driving the X-axis motor 42, the Y-axis motor 46 and the θ-rotation motor 25 of the accessor 14 are connected to CPU 400. CPU 400 is also connected to a counter 410 for counting outputs from an encoder 409 attached to the X-axis motor 42, a counter 412 for counting outputs from an encoder 409 attached to the Y-axis motor 46 and a counter 413 for counting outputs from an encoder 409 attached to the θ-rotation motor 25, to be able to read the counted numbers thereof and to reset them.

Next, the operation for correcting a position of the accessor 14 used as a carriage will be described.

Figure 58A:
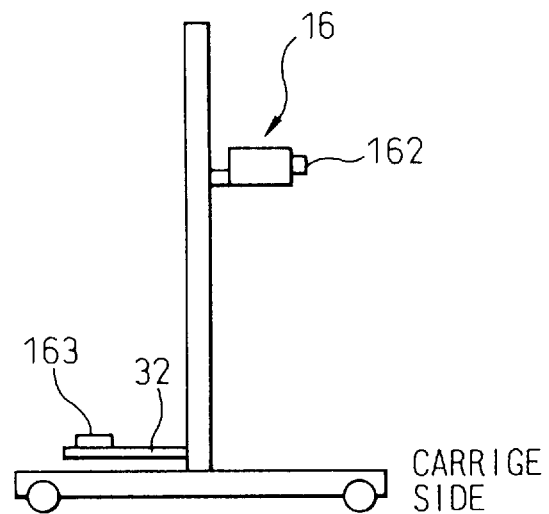
FIG. 58A is the illustration for explaining a sensor provided in the accessor.
Figure 58B:
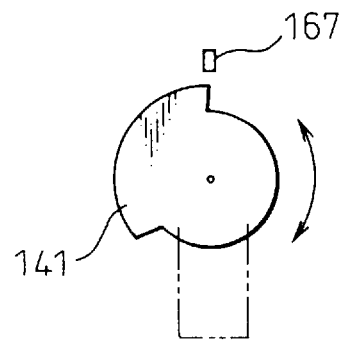
FIG. 58B is a partial enlarged view for explaining the sensor and a sensor flag provided in the accessor.
Figure 59:
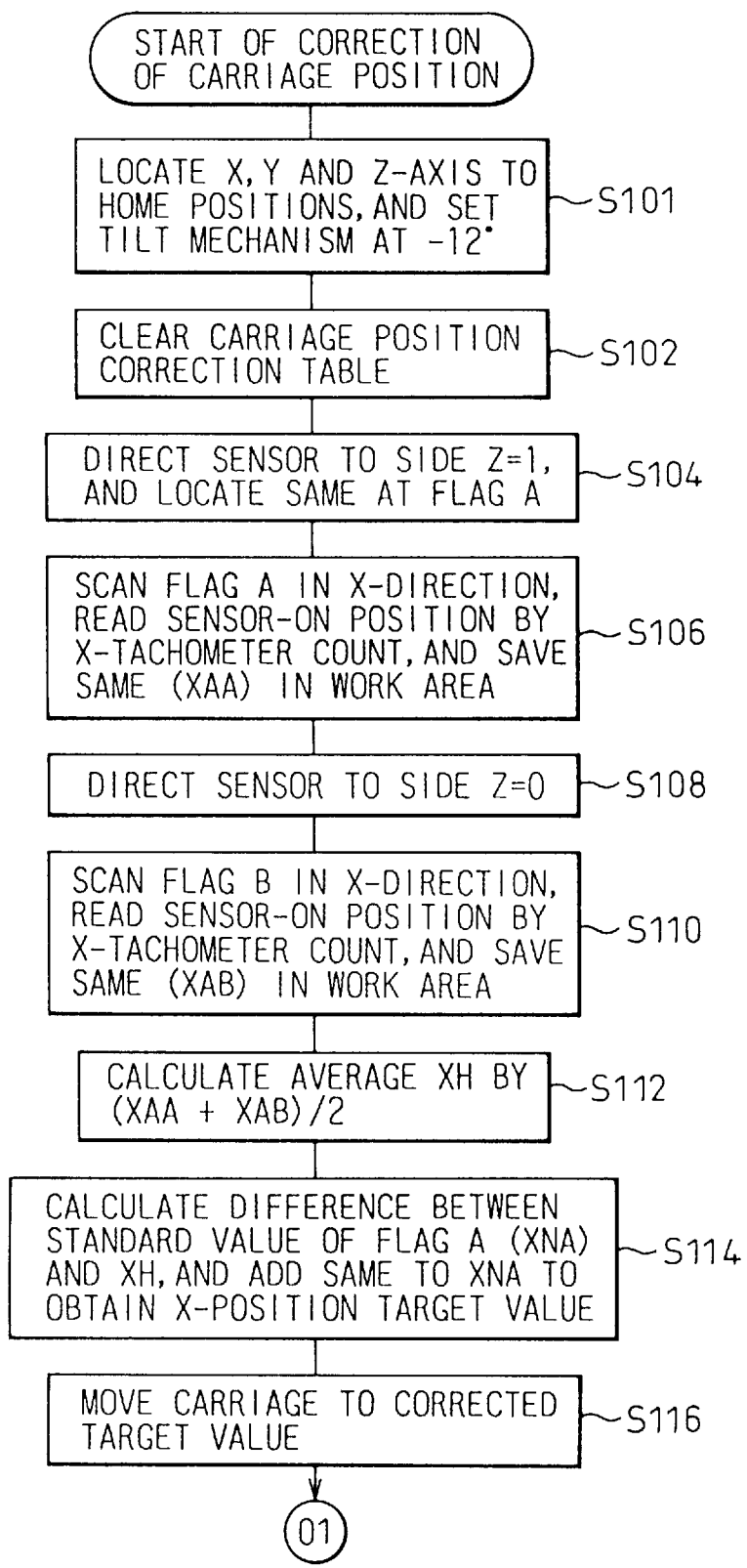
FIG. 59 is part of a flow chart for the explanation of the operation for correcting a position of the accessor.
Figure 60:
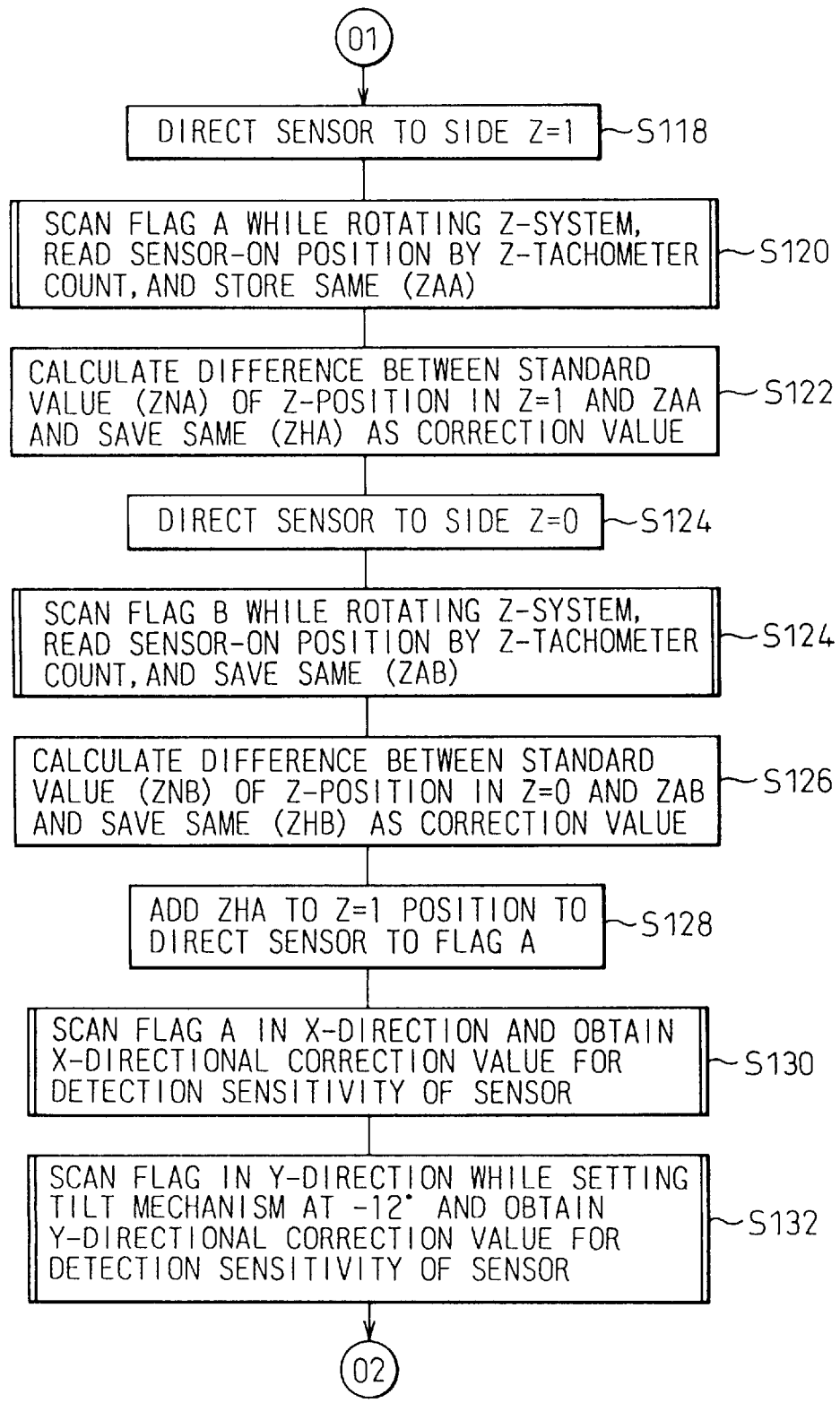
FIG. 60 is part of a flow chart for the explanation of the operation for correcting a position of the accessor.
Figure 61:
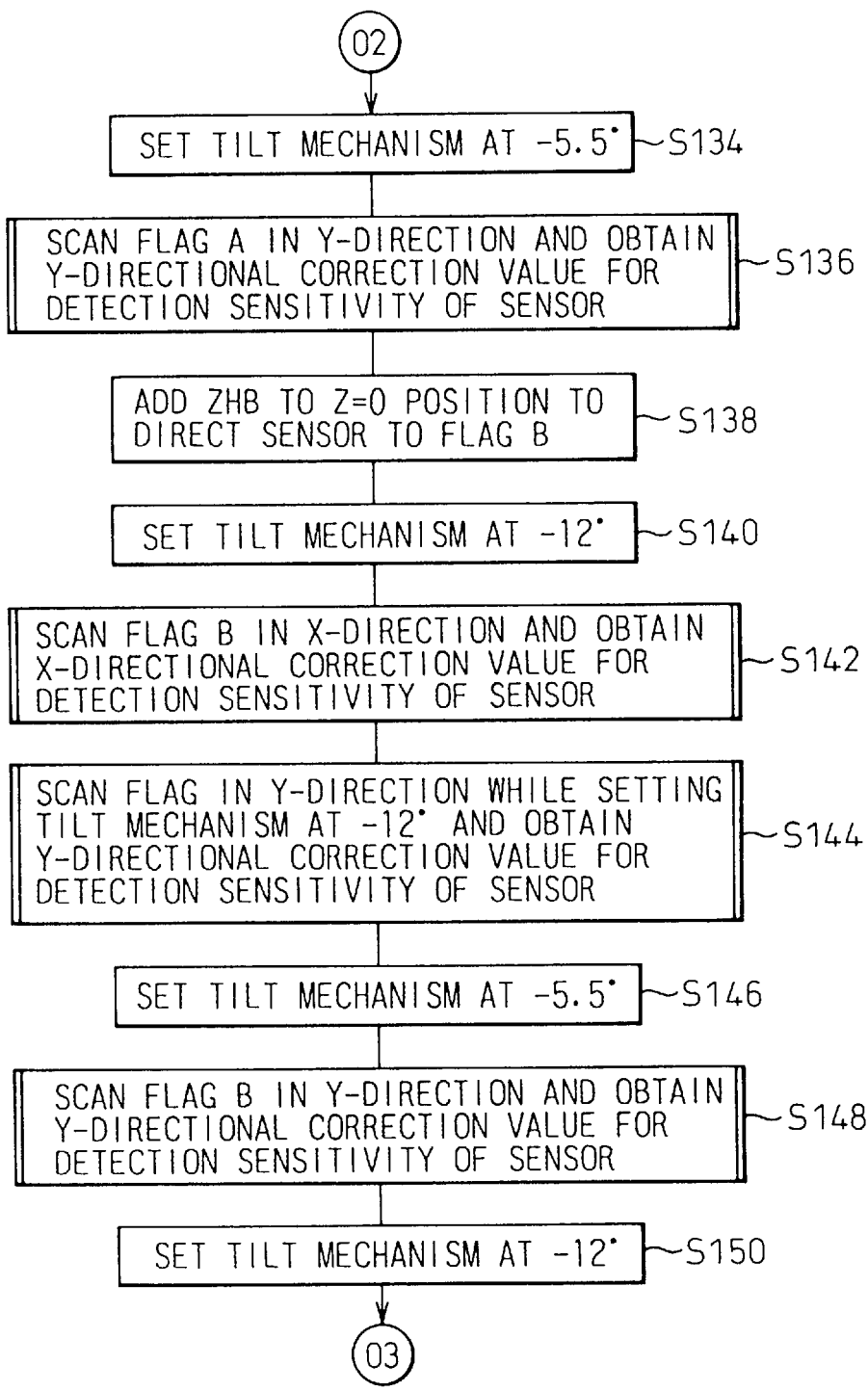
FIG. 61 is part of a flow chart for the explanation of the operation for correcting a position of the accessor.
Figure 62:
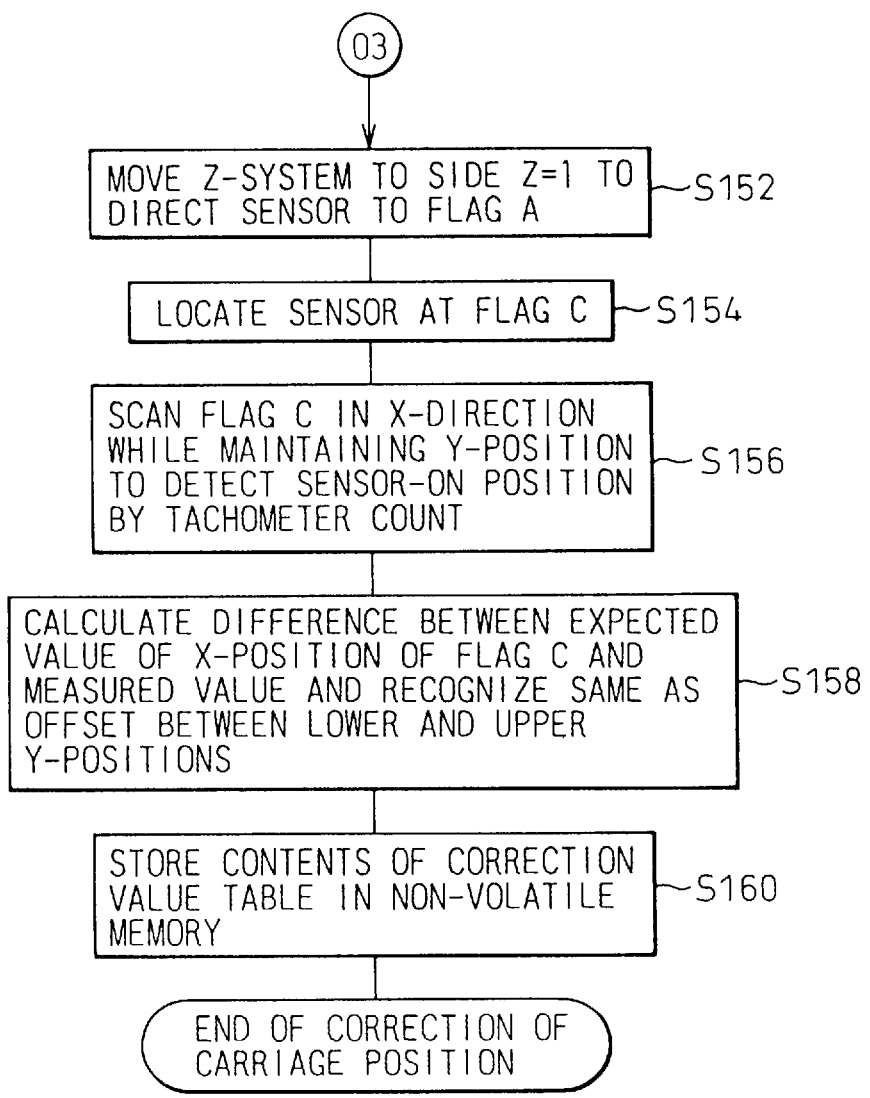
FIG. 62 is part of a flow chart for the explanation of the operation for correcting a position of the accessor.

FIGS. 58A and 58B are illustrations for explaining the sensors provided in the accessor 14.

In FIG. 58A, there are illustrated a sensor 162 mounted on the hand assembly 16 and a sensor 163 mounted on the rail base 32, for detecting a position in the X-direction. In FIG. 58B, a sensor 167 is illustrated for detecting a position of the base 27 of the hand assembly 16 relative to the base 24 of the hand assembly.

The X-directional positioning of the accessor 14 is carried out while using a position flag 165 representing an original point and provided in the accessor unit 9, as a reference. The original position flag 165 is detected by the sensor 163. However, there may be a case wherein an actual distance in the assembly is different from a predetermined value, between a position at which the sensor 163 is attached on the rail base 32 and a center of grip of a hand of the hand assembly 16. In such a case, even if the X-axis motor 42 is driven in accordance with the output from the sensor 163, there is a possibility in that the center of grip of the hand is offset in the X-direction. Also, the hand assembly 16 reciprocates in the Y-direction along the vertical column 18. However, if the vertical column 18 is obliquely mounted to the rail base 32, there is not only the Y-directional positional offset but also the X-directional positional offset between the lower and upper positions of the vertical column 18. In addition, if the sensor 167 and the detection position of the sensor flag 141 are offset in the rotational direction, the hand unit 130 grips the cartridge in a slanted position. When such positional offsets occur, it is impossible not only to correctly grip the cartridge accommodated in the cell but also to push the cartridge into the cell or the accessor mount cell. Accordingly, if an accessor 14 incapable of correcting such positional offset is used, it is impossible to reduce the cell pitch, whereby the increase in the number of cartridges to be accommodated in the library apparatus becomes difficult.

FIGS. 59 through 62 illustrate a flow chart for explaining the operation for the positional correction of the accessor 14 used as a carriage. The flow chart will be described with reference also to FIG. 57 and FIGS. 63 through 65.

Figure 63:
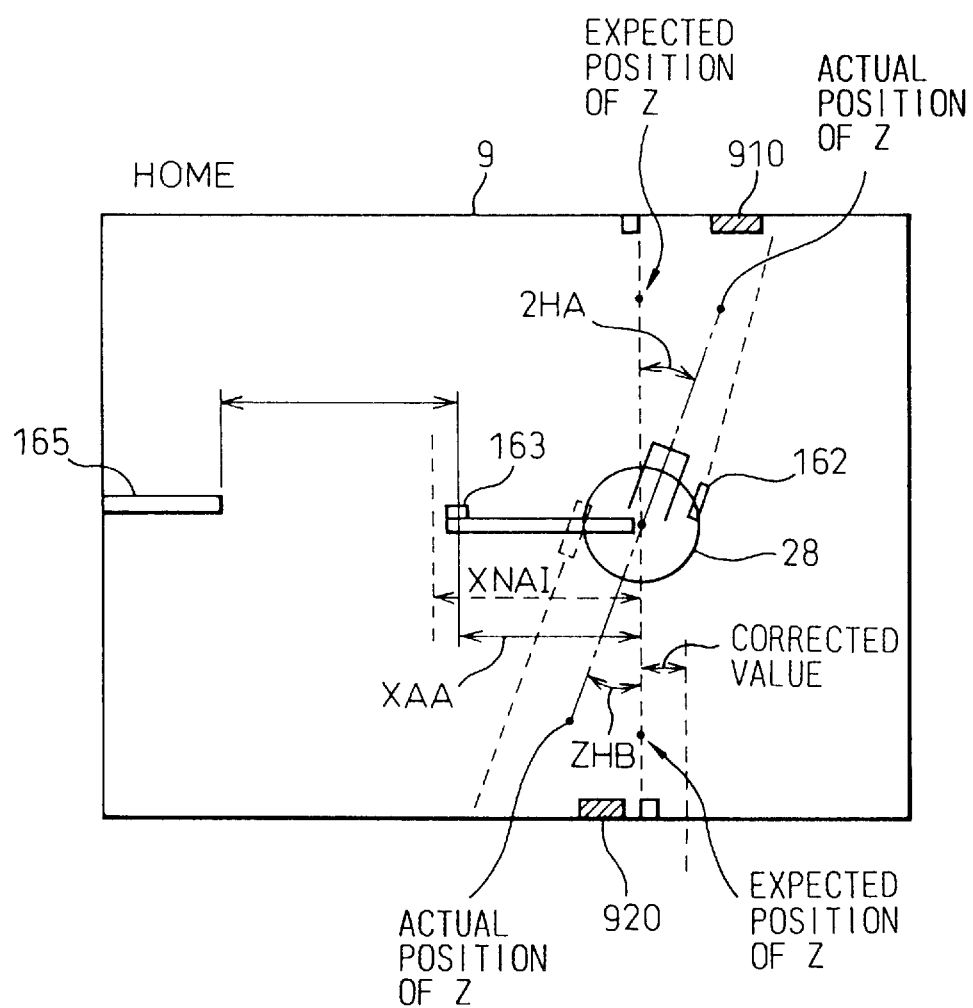
FIG. 63 is a plan view for the explanation of the operation for correcting a position of the accessor.
Figure 64A:
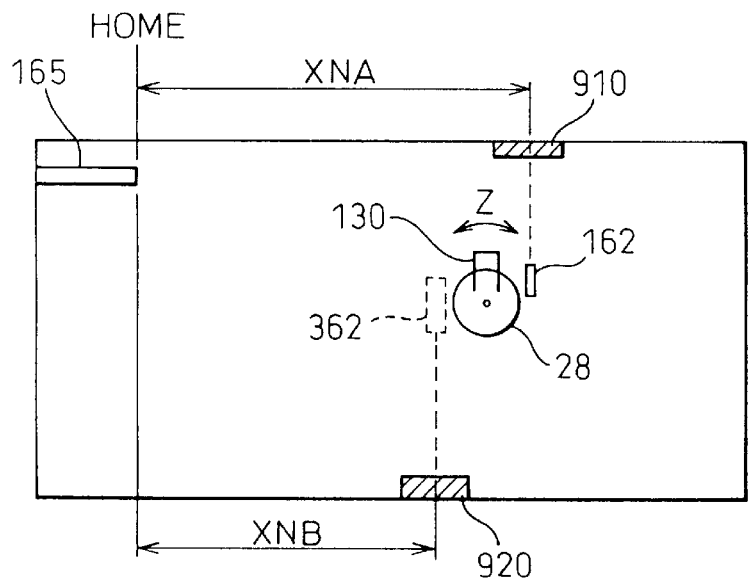
FIG. 64A is a plan view for the explanation of the operation for correcting a position of the accessor.
Figure 64B:
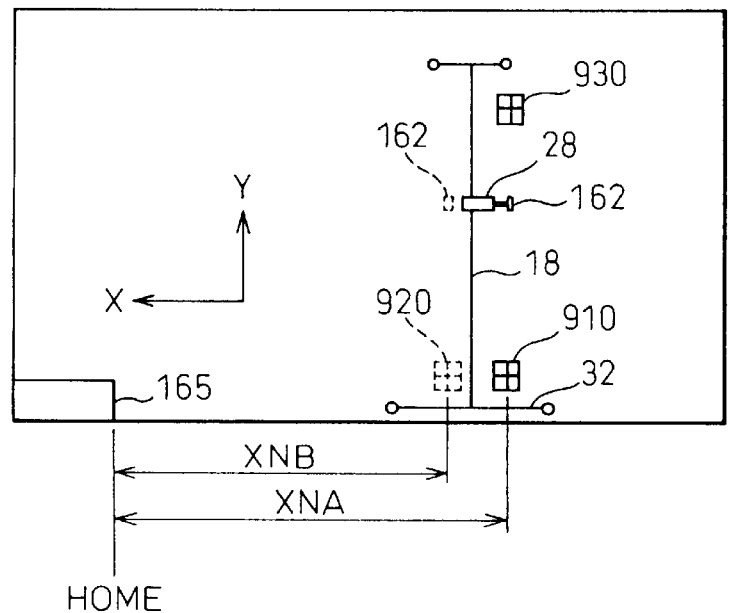
FIG. 64B is a side view for the explanation of the operation for correcting a position of the accessor.
Figure 65:
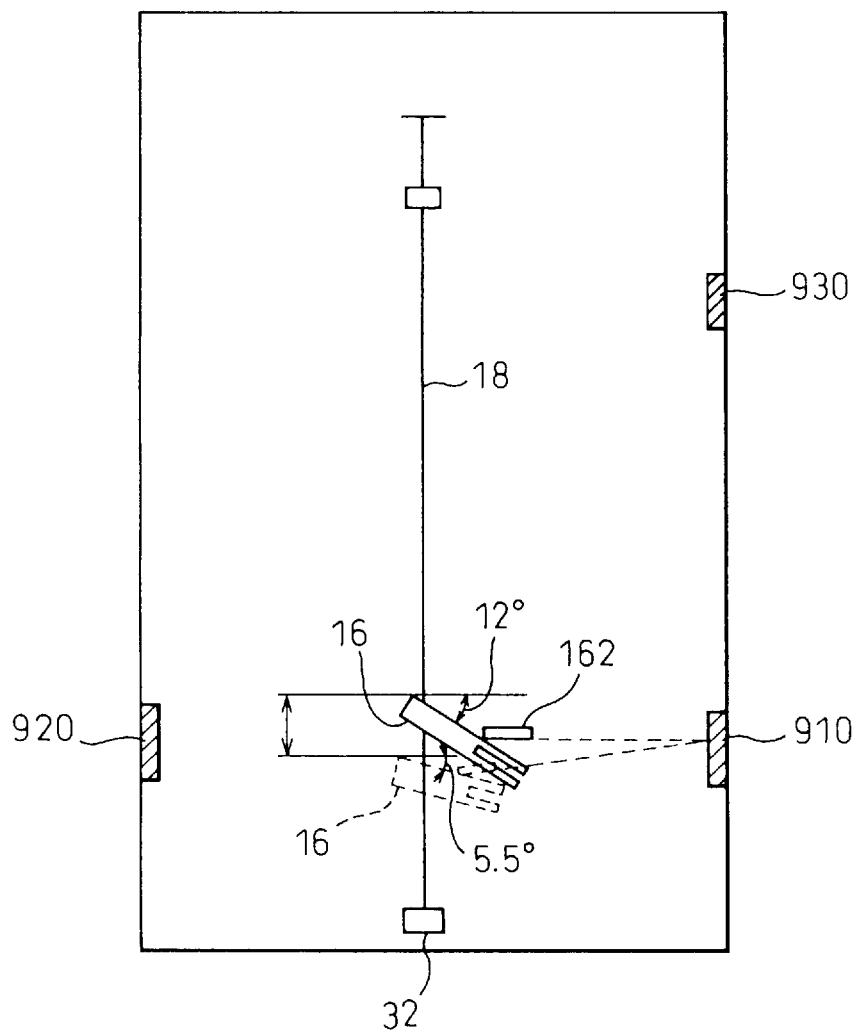
FIG. 65 is a side view for the explanation of the operation for correcting a position of the accessor.

In FIG. 63, the original point position flag 165 is accurately attached to the accessor unit 9. The rail base 32 of the accessor 14 is provided with the photoelectric sensor 163 for detecting the original point position flag 165. Also the photoelectric sensor 162 fixed on the base of the accessor 14 is illustrated. The accessor unit 9 is provided with position-correcting flags 910, 920 and 930 accurately fixed at positions at which selected cells are detected.

(1) Steps S101 through S102: CPU 400 locates the X-axis, Y-axis and Z-axis at home positions at step S101. That is, CPU 400 drives the X-axis motor 42 via the motor driver 402 to locate the photoelectric sensor 163 at a position for detecting an edge of the original point position flag 165. Further, CPU 400 drives the Y-axis motor 46 via the motor driver 406 to locate the hand assembly 16 at a height at which the photoelectric sensor 162 can detect the position-correcting flags 910 and 920. CPU 400 drives the motor 25 to locate the photoelectric sensor 167 at a position for detecting an original point of the sensor flag 141. The original point of the sensor flag 141 is defined at a position different from the one at which the sensor 162 and the position-correcting flag 910 or 920 are correctly opposite to each other. Then, the base 28 of the hand assembly 16 is made to rotate relative to the base 27 so that the inclination angle of the hand assembly 16 is 12°. CPU 400 clears up the contents of the carriage position-correcting table at step S102. Also, the counters 410, 412 and 413 are reset.

(2) Steps S104 through S106: CPU 400 first drives the motor 25 to locate the sensor 162 opposite to the position-correcting flag 910 (flag A). Then, the base 27 is positioned at an angle at which it is expected that the sensor 162 is opposite to the position-correcting flag 910. CPU 400 drives the X-axis motor 42. That is, CPU 400 drives the X-axis motor 42 by a standard value XNA. This standard value is given as a distance from the original point position flag 165. The rail base 32 is located at the X-directional position at which it is expected that the sensor 162 is opposite to the position-correcting flag 910. While maintaining this state, CPU 400 drives the motor 42 alone to reciprocatedly rotate. The optical axis of the sensor 162 reciprocatedly scans the position-correcting flag 910 along the X-axis. While the optical axis of the sensor 162 reciprocatedly scans, CPU 400 reads a value on the counter 410 at an instant when an output from the sensor 162 is ON. Then CPU 400 stores this value in the work area 426 of the memory 416. The stored value is a measured value XAA shown in FIG. 63.

(3) Steps S108 through S110: CPU 400 drives the motor 25 to locate the sensor 162 opposite to the position-correcting flag 920 (flag B). The base 27 is positioned at an angle at which it is expected that the sensor 162 is opposite to the position-correcting flag 920. Then, while maintaining this state, CPU 400 drives the motor 42 alone to reciprocatedly rotate. The optical axis of the sensor 162 reciprocatedly scans the position-correcting flag 920 along the X-axis. While the optical axis of the sensor 162 reciprocatedly scans, CPU 400 reads a value in the counter 410 at an instant when an output from the sensor 162 is ON. Then CPU 400 stores this value in the work area 426 of the memory 416. The stored value is a measured value XNB shown in FIG. 64A.

(4) Steps S112 through S116: CPU 400 calculates an average value XH of the measured values XNA and XNB. Then a difference between the standard value XNA and the average value XH is obtained. The difference is added to the standard value XNA. A new X target value is defined by the result of addition. CPU 400 drives the motor 42 to coincide with the new X target value. A position-correcting value in the X-direction is thus obtained and stored in a correction value table in the work area 426.

(5) Steps S118 through S122: CPU 400 drives the motor 25 to locate the sensor 162 opposite to the position-correcting flag 910. The base 27 is positioned at an angle at which it is expected that the sensor 162 is opposite to the position-correcting flag 910. That is, CPU 400 drives the motor 25 by a standard value ZNA. This standard value ZNA is given by a rotational angle after the sensor 167 has detected the sensor flag 141. Thereafter, CPU 400 reciprocatedly rotates the motor 25 alone. The optical axis of the sensor 162 reciprocatedly scans the position-correcting flag 910 in the X-direction. While the optical axis of the sensor 162 scans, CPU 400 reads a value on the counter 413 at an instant when an output from the sensor 162 is ON. CPU 400 stores the measured value ZAA in the work area 426 of the memory 416. Further, CPU 400 calculates a difference between the standard value ZNA and the measured value ZAA and stores it in the work area 426 as a correction value ZHA. In such a manner, a correction value of a Z-position on a surface wherein the position-correcting flag 910 is provided. This first correction value in the Z-direction is stored in the correction value table in the work area.

(6) Steps S124 through S126: CPU 400 drives the motor 25 to locate the sensor 162 opposite to the position-correcting flag 920. The base 27 is positioned at an angle at which it is expected that the sensor 162 is opposite to the position-correcting flag 920. That is, CPU 400 drives the motor 25 by a standard value ZNB. Thereafter, CPU 400 reciprocatedly rotates the motor 25 alone. The optical axis of the sensor 162 reciprocatedly scans the position-correcting flag 920 in the X-direction. While the optical axis of the sensor 162 scans, CPU 400 reads a value on the counter 413 at an instant when an output from the sensor 162 is ON. CPU 400 stores the measured value ZAA in the work area 426 of the memory 416. Further, CPU 400 calculates a difference between the standard value ZNB and the measured value ZAB and stores it in the work area 426 as a correction value ZHB. In such a manner, a correction value of a Z-position on a surface wherein the position-correcting flag 930 is provided. This second correction value in the Z-direction is stored in the correction value table in the work area, is obtained.

(7) Step S128: CPU 400 calculates a new target value by adding the correction value ZHA to the standard value ZNA. CPU 400 locates the sensor 162 to coincide with the position-correcting flag 910.

(8) Steps 130 through 136: Then CPU 400 determines a correction value for a detection sensitivity of the sensor 162 in the X and Y-directions while maintaining the hand assembly 16 at an inclination angle of −12°. Further, CPU 400 determines a correction value for a detection sensitivity of the sensor 162 in the Y-direction while maintaining the hand assembly 16 at an inclination angle of −5.5°. A method for obtaining these detection sensitivities will be described later. The optical axis of the sensor 162 is in the horizontal plane when the hand assembly 16 is opposite to the position-correcting flag 910 at the inclination angle of −12°. Accordingly, since the optical axis of the sensor 162 is deviated from the horizontal plane when the inclination angle of the hand assembly is −5.5°, it is necessary to correct the detection sensitivity.

(9) Step 138: CPU 400 calculates a new target value by adding the correction value ZHB to the standard value ZNA. CPU 400 locates the sensor 162 to coincide with the position-correcting flag 920.

(10) Steps 140 through 150: Next, CPU 400 restores the inclination angle of the hand assembly 16 to −12°. CPU 400 determines a correction value for the detection sensitivity of the sensor 162 in the X-direction. Further CPU 400 locates the hand assembly at the inclination angel of −5.5°. Then CPU 400 determines a correction value for the detection sensitivity of the sensor 162 in the Y-direction. A method for obtaining these detection sensitivities will be described later. After the correction values for the detection sensitivity have been determined, CPU 400 restores the inclination angle to −12°.

(11) Steps S152 through S158: Next, CPU 400 detects a tilting angle of the vertical column 18 and determines a correction value thereof. First, CPU 400 locates the sensor 162 opposite to the position-correcting flag 910. Then CPU 400 locates the sensor 162 opposite to the position-detecting flag 930. While maintaining the Y-position of the sensor 162, CPU 400 makes the sensor 162 to reciprocatedly scan the position-correcting flag 930 in the X-direction. While the optical axis of the sensor 162 scans, reads a value of the counter 410 at an instant when a detection output from the sensor 162 is ON. Then, CPU 400 calculates a difference between an expected value of the position-correcting flag 930 in the X-axis direction and the measured value and recognizes the same as the positional offset between the upper and lower positions in the Y-direction. This difference is stored in the correction value table in the work area 426.

(12) Step 160: CPU 400 stores the stored values in the correction value table to the non-volatile memory 420 and completes the operation for the position-measurement.

Next, the operation for correcting the sensitivity of the sensor will be described.

Figure 66:
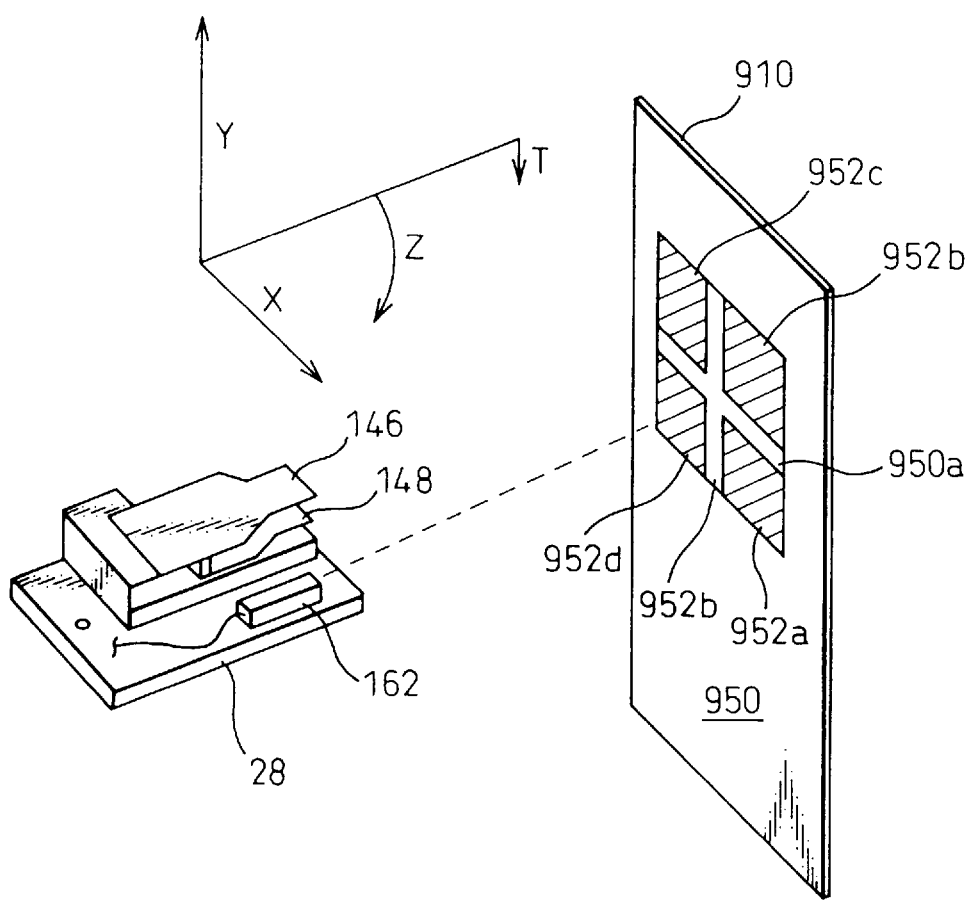
FIG. 66 is a perspective view for explaining a positional correction flag.
Figure 67:
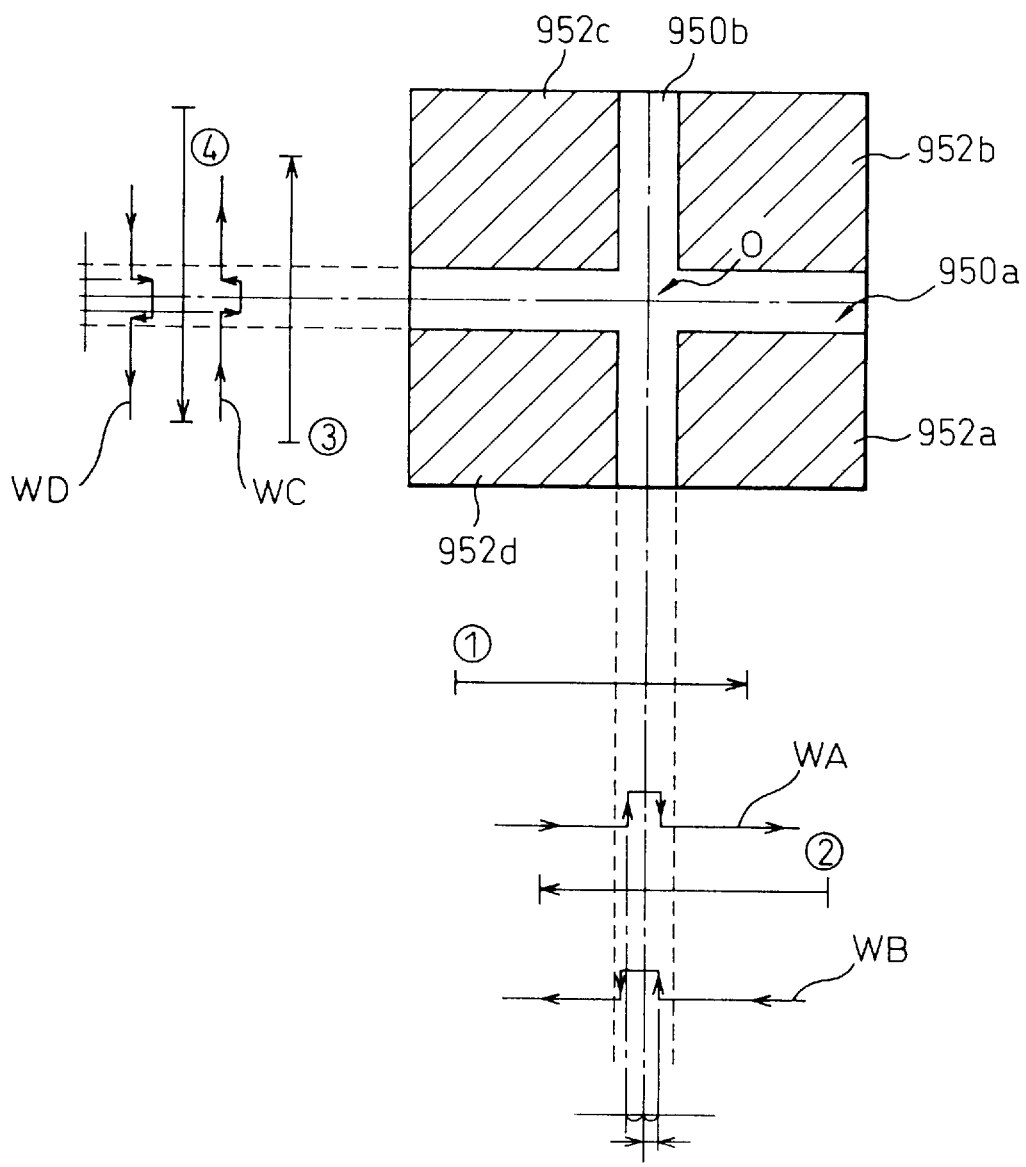
FIG. 67 is the illustration for explaining the operation for measuring a position.

FIG. 66 illustrates the relationship between the position-correcting flags 910, 920, 930 and the sensor 162. FIG. 67 is the illustration for explaining the operation for correcting the sensitivity of the sensor.

In the drawings, each of the position-correcting flags 910, 920 and 930 is constituted by a white section 950 of a cross-shape and black sections 952a through 952d. The white section 950 of a cross-shape includes a part 950a extending in the X-direction and a part 950b extending in the Y-direction.

Figure 68:
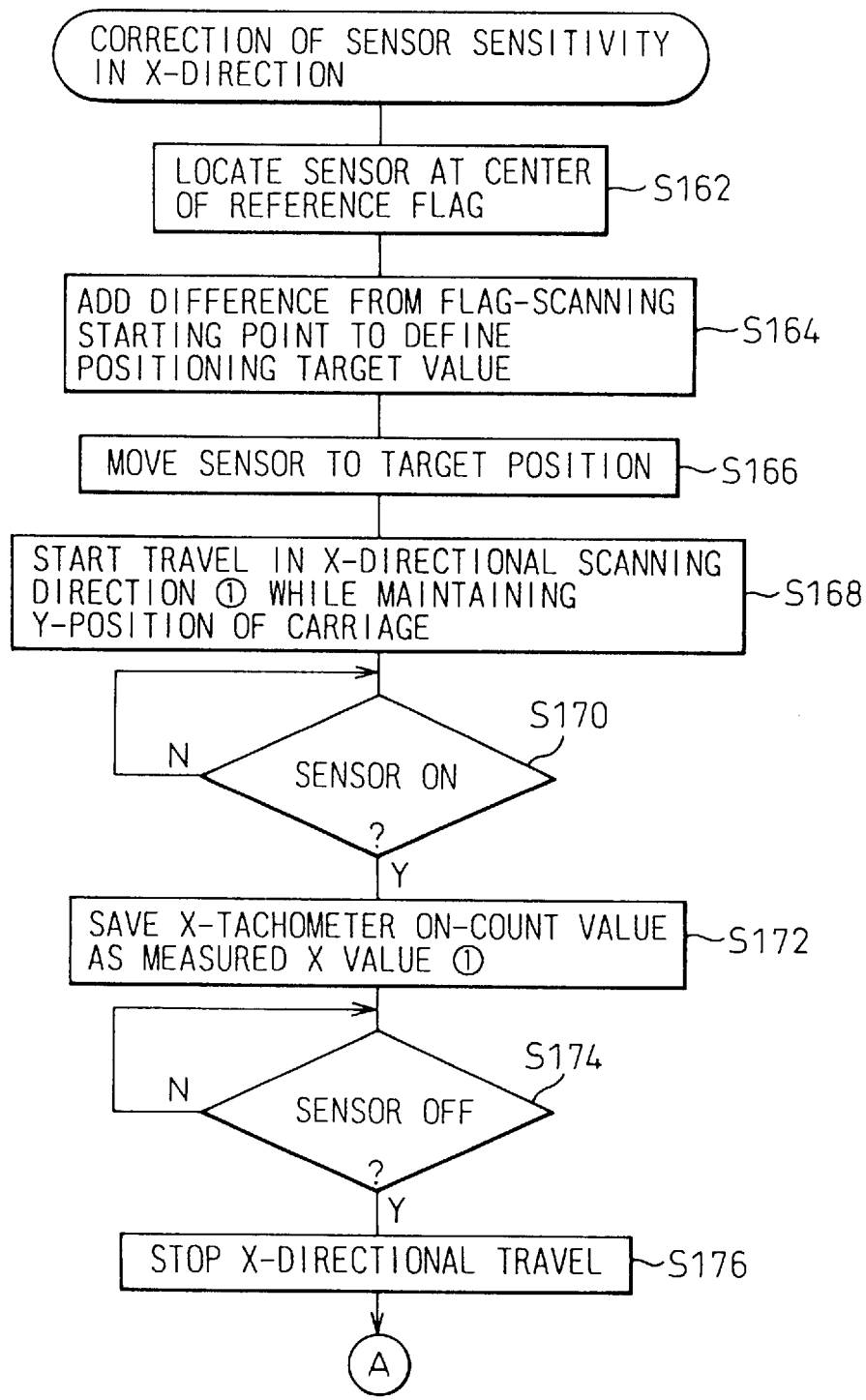
FIG. 68 is a first half of a flow chart of the operation for correcting the sensitivity of X-directional sensor.
Figure 69:
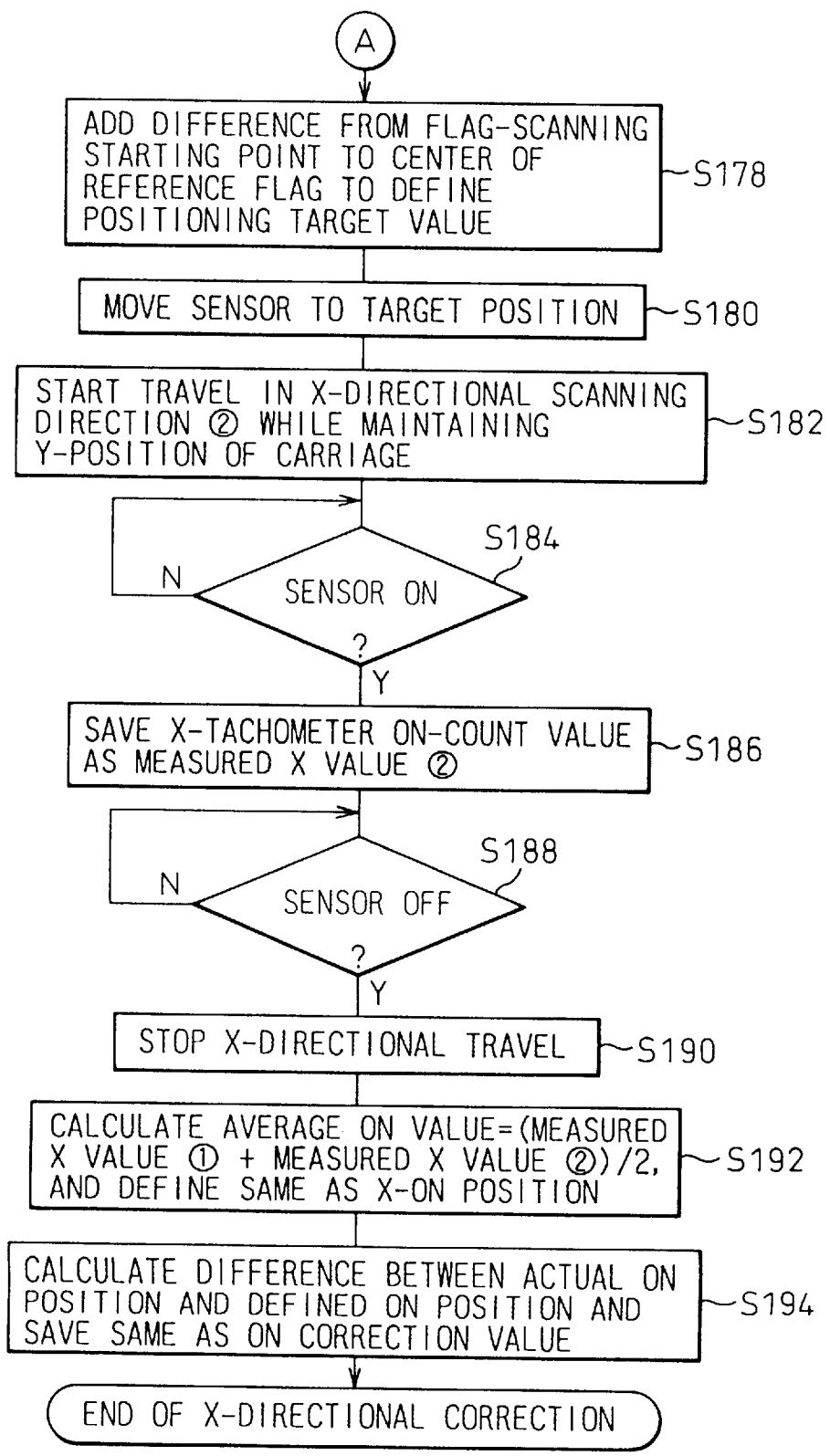
FIG. 69 is a latter half of a flow chart of the operation for correcting the sensitivity of X-directional sensor.

FIGS. 68 and 69 is a flow chart of the operation for correcting the sensitivity of the sensor in the X-direction.

(1) Steps S162 through S166: CPU 400 determines that a center O of the reference flag 910 is a temporary target position of the optical axis of the sensor 162. Then, CPU 400 adds a difference between the temporary target position and a scanning starting point on the flag 910 to the temporary target position to obtain a target position for the positioning operation. The target position is within the black section 952d. CPU 400 moves the sensor 162 to the target position.

(2) Steps S162 through S166: CPU 400 moves the sensor 162 in the scanning direction ① in the X-direction (see FIG. 67) while maintaining the Y-position, and determines whether or not an output from the sensor 162 is ON. The value of the counter 420 at an instant when the output from the sensor 162 is ON is stored in the work area 426 as a measured X value Xa. CPU 400 continuously moves the sensor 162 in the X-direction. CPU 400 stops the X-directional movement of the sensor 162 when the output from the sensor 162 is OFF. The variation of the output from the sensor at that time is shown by a wave shape WA in FIG. 67.

(3) Steps S178 through S180: CPU 400 adds a difference between the center of the reference flag 910 which is a temporary target position and a scanning starting point on the flag 910 to the temporary target position to obtain a target position for the positioning operation. The target position is within the black section 952*a*. CPU 400 moves the sensor 162 to the target position.

(4) Steps S182 through S190: CPU 400 moves the sensor 162 in the scanning direction ② in the X-direction (see FIG. 67) while maintaining the Y-position, and determines whether or not an output from the sensor 162 is ON. A value of the counter 420 at an instant when the output from the sensor 162 is ON is stored in the work area 426 as a measured X value Xb. CPU 400 continuously moves the sensor 162 in the X-direction. CPU 400 stops the X-directional movement of the sensor 162 when the output from the sensor 162 is OFF. The variation of the output from the sensor at that time is shown by a wave shape WB in FIG. 67.

(5) Steps S192 through S194: CPU 400 calculates an average value of the measured X values Xa and Xb. Also, CPU 400 defines the X-directional ON position of the sensor 162 by calculation. Finally, CPU 400 stores a difference between the actual sensor-ON position and the defined sensor-ON position as an ON correction value in the correction value table. Thus the operation for correcting the X-directional sensitivity has been completed.

Next, the operation for correcting the Y-directional sensor sensitivity will be described.

Figure 70:
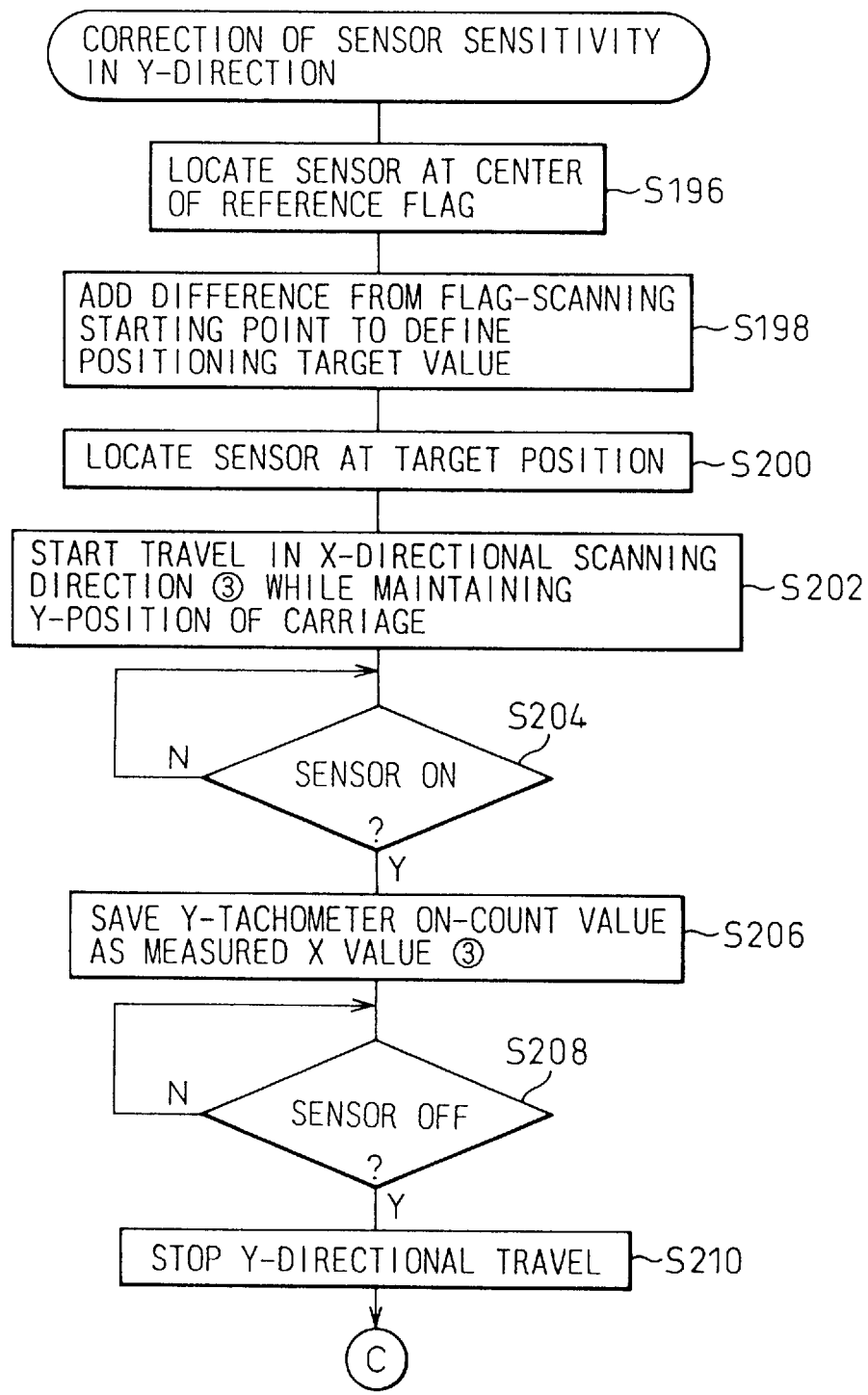
FIG. 70 is a first half of a flow chart of the operation for correcting the sensitivity of Y-directional sensor.
Figure 71:
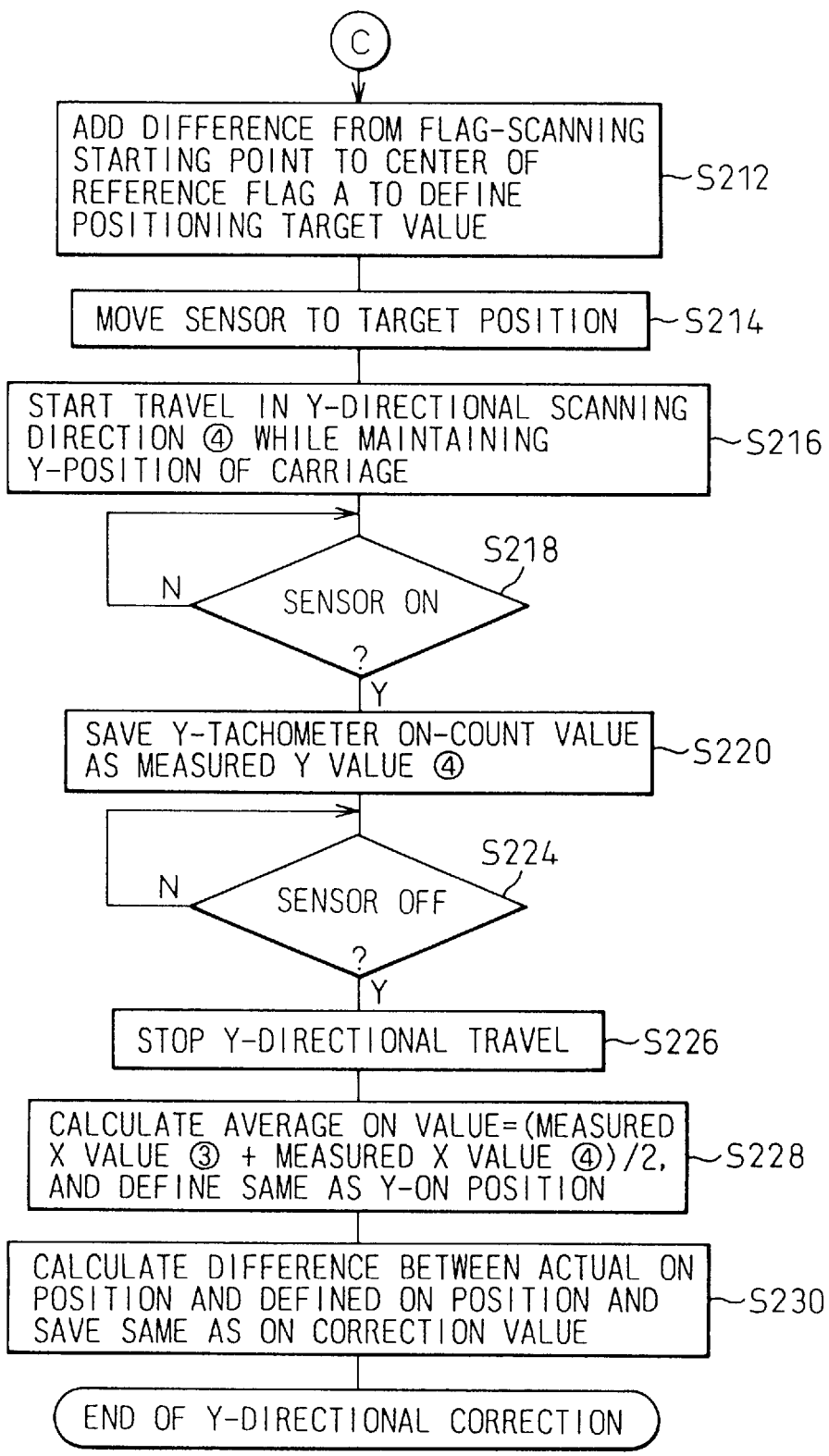
FIG. 71 is a latter half of a flow chart of the operation for correcting the sensitivity of Y-directional sensor.

FIGS. 70 and 71 illustrates a flow chart of the operation for correcting the Y-directional sensor sensitivity.

(1) Steps S196 through S200: CPU 400 determines that a center O of the reference flag 910 is a temporary target position of the optical axis of the sensor 162. Then, CPU 400 adds a difference between the temporary target position and a scanning starting point on the flag 910 to the temporary target position to obtain a target position for the positioning operation. The target position is within the black section 952*d*. CPU 400 moves the sensor 162 to the target position.

(2) Steps S202 through S210: CPU 400 moves the sensor 162 in the scanning direction ③ in the Y-direction (see FIG. 67) while maintaining the X-position, and determines whether or not an output from the sensor 162 is ON. A value of the counter 420 at an instant when the output from the sensor 162 is ON is stored in the work area 426 as a measured Y value Ya. CPU 400 continuously moves the sensor 162 in the Y-direction. CPU 400 stops the Y-directional movement of the sensor 162 when the output from the sensor 162 is OFF. The variation of the output from the sensor at that time is shown by a wave shape WC in FIG. 67.

(3) Steps S212 through S214: CPU 400 adds a difference between the center of the reference flag 910 which is a temporary target position and a scanning starting point on the flag 910 to the temporary target position to obtain a target position for the positioning operation. The target position is within the black section 952*c*. CPU 400 moves the sensor 162 to the target position.

(4) Steps S216 through S226: CPU 400 moves the sensor 162 in the scanning direction ④ in the Y-direction (see FIG. 67) while maintaining the X-position, and determines whether or not an output from the sensor 162 is ON. A value of the counter 420 at an instant when the output from the sensor 162 is ON is stored in the work area 426 as a measured Y value Yb. CPU 400 continuously moves the sensor 162 in the Y-direction. CPU 400 stops the Y-directional movement of the sensor 162 when the output from the sensor 162 is OFF. The variation of the output from the sensor at that time is shown by a wave shape WD in FIG. 67.

(5) Steps S228 through S230: CPU 400 calculates an average value of the measured Y values Ya and Yb. Also, CPU 400 defines the Y-directional ON position of the sensor 162 by a result of calculation. Finally, CPU 400 stores a difference between the actual sensor-ON position and the defined sensor-ON position as an ON correction value in the correction value table. Thus the operation for correcting the Y-directional sensitivity has been completed.

Next, the operation for correcting the Z-directional sensor sensitivity will be described.

Figure 72:
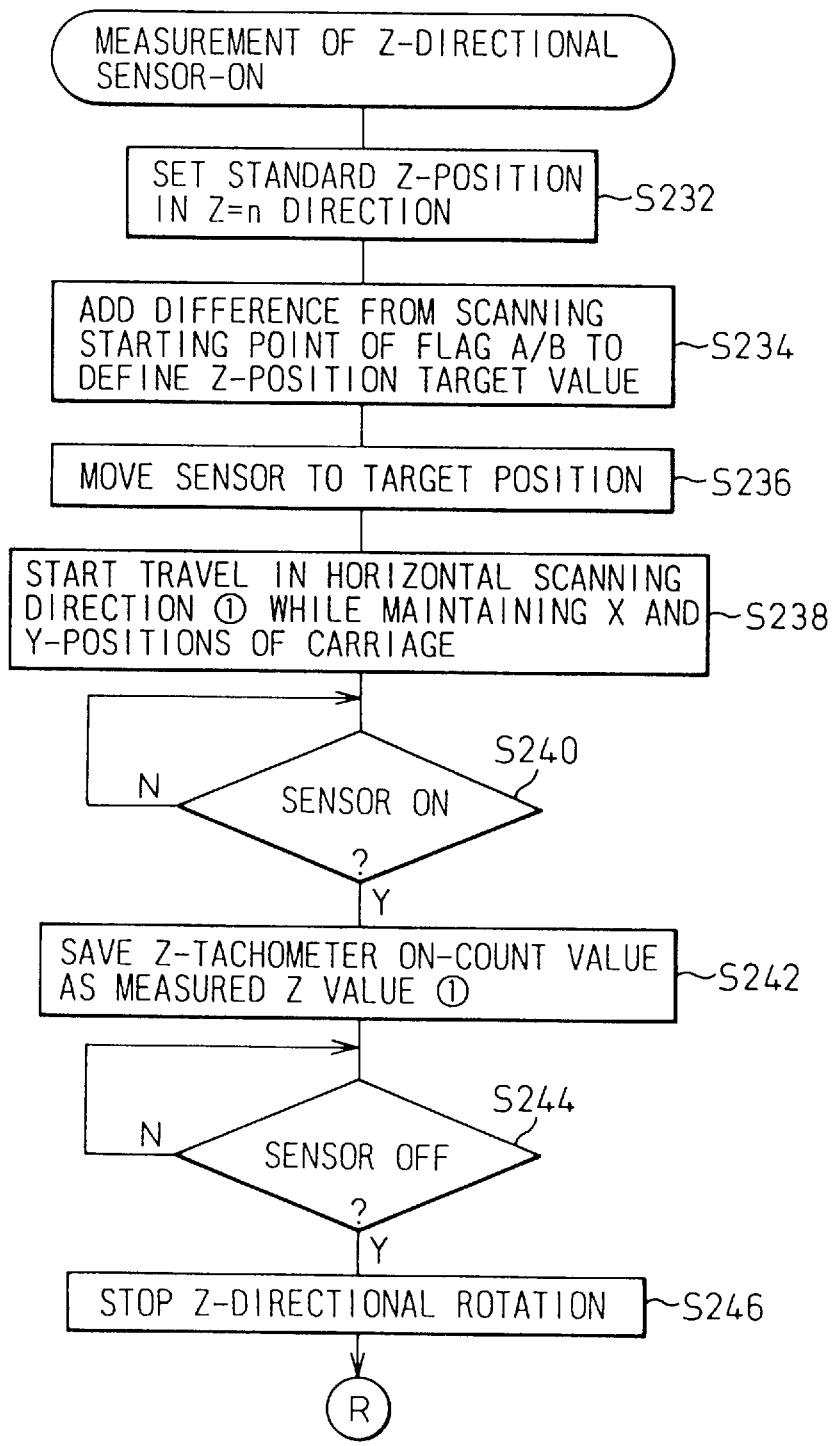
FIG. 72 is a first half of a flow chart of the operation for correcting the sensitivity of Z-directional sensor.
Figure 73:
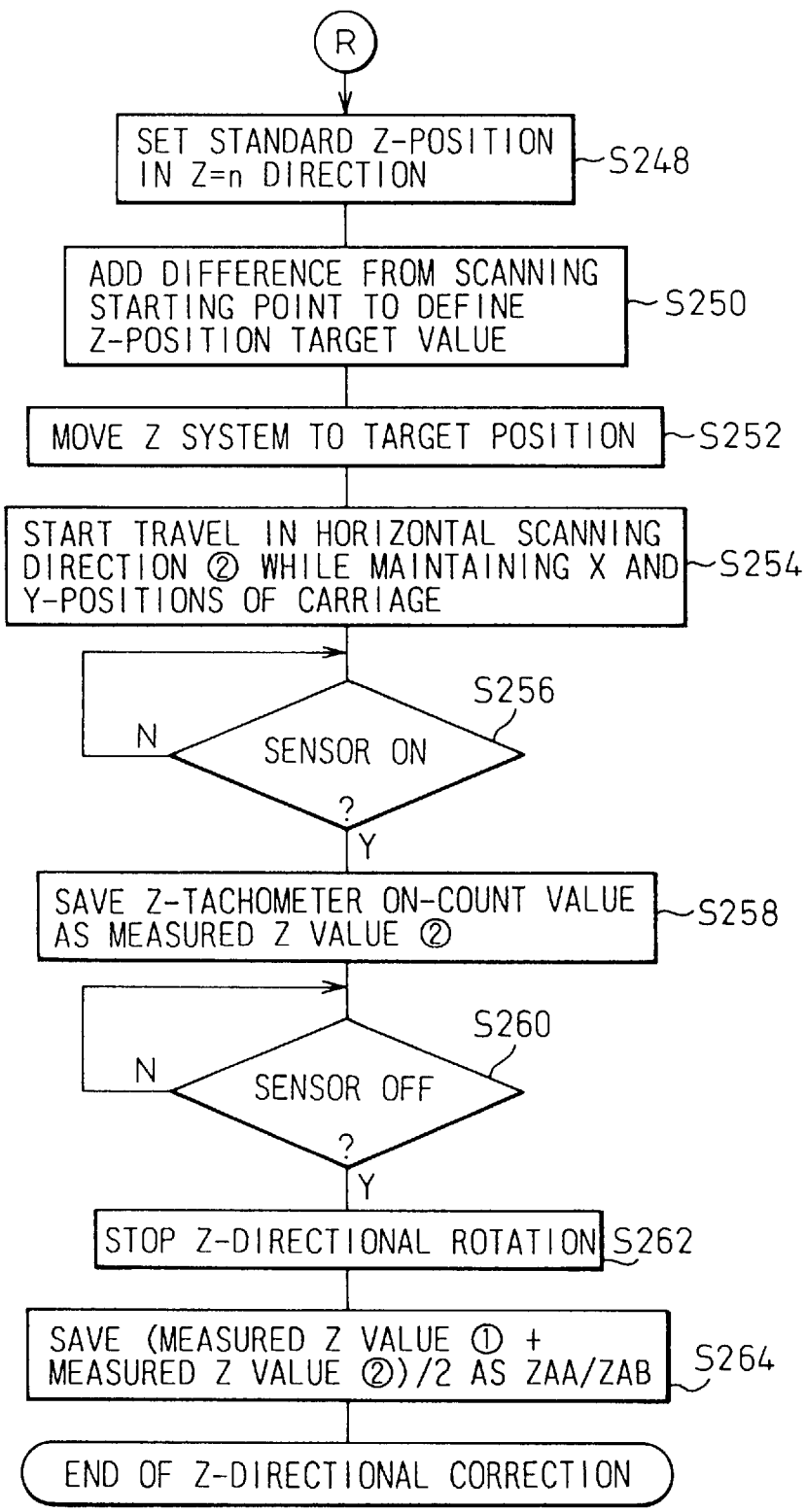
FIG. 73 is a latter half of a flow chart of the operation for correcting the sensitivity of Z-directional sensor.

FIGS. 72 and 73 illustrates a flow chart of the operation for correcting the Z-directional sensor sensitivity.

(1) Steps S232 through S236: CPU 400 determines a standard Z-position in the Z=n direction. In this regard, n is "1" or "0". "1" is defined as the direction to rotate the sensor rightward, while "0" is defined as the direction to rotate the sensor leftward. First, CPU 400 determines n=1, and then adds a difference between the standard Z-position and a scanning starting point on the flag 910 to the standard Z-position to obtain a target position for the positioning operation. CPU 400 moves the sensor 162 to the target position.

(2) Steps 238 through 246: CPU 400 moves the sensor 162 in the scanning direction ① (see FIG. 67) by rotating the Z-system while maintaining the X and Y-positions, and determines whether or not an output from the sensor 162 is ON. A value of the counter 413 at an instant when the output from the sensor 162 is ON is stored in the work area 426 as a measured Z value Za. CPU 400 continuously moves the sensor 162 in the Y-direction. CPU 400 stops the Z-directional movement of the sensor 162 when the output from the sensor 162 is OFF. The variation of the output from the sensor at that time is the same as the wave shape WA in FIG. 67.

(3) Steps S248 through 252: CPU 400 determines n=0, and then adds a difference between the standard Z-position and a scanning starting point on the flag 920 to the standard Z-position to obtain a target position for the positioning operation. CPU 400 moves the sensor 162 to the target position.

(4) Steps 254 through 262: CPU 400 moves the sensor 162 in the scanning direction ② (see FIG. 67) by rotating the Z-system while maintaining the X and Y-positions, and determines whether or not an output from the sensor 162 is ON. A value of the counter 413 at an instant when the output from the sensor 162 is ON is stored in the work area 426 as a measured Z value Zb. CPU 400 continuously moves the sensor 162 in the Y-direction. CPU 400 stops the Z-directional movement of the sensor 162 when the output from the sensor 162 is OFF. The variation of the output from the sensor at that time is the same as the wave shape WB in FIG. 67.

(5) Steps S264 through S230: CPU 400 calculates an average value of the measured Z values Za and Zb, and stores the same in the correction value table as an ON position of the sensor 162 in the Z-direction. Thus, the operation for correcting the sensitivity in the Z-direction has been completed.

An alternative operation for correcting the accessor position will be described below.

Figure 74:
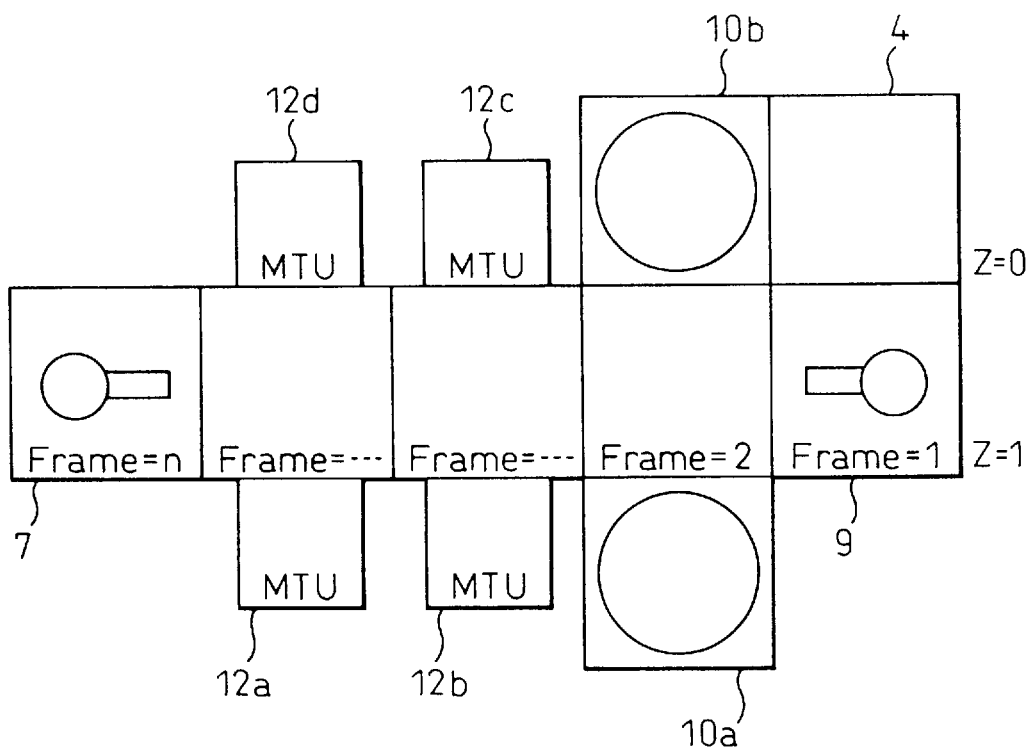
FIG. 74 is the illustration for explaining the theoretical arrangement of addresses allocated to each of the units in the library apparatus shown in FIG. 1.

FIG. 74 is the illustration for explaining a logical address arrangement allocated to the respective units in the library apparatus shown in FIG. 1. Frame numbers (Frame=1, 2, . . . , n) are allocated to the respective units disposed in the travelling direction of the accessor 14. Side numbers (z=0, 1) are allocated to denote the respective sides of the travelling path of the accessor 14.

Figure 4:
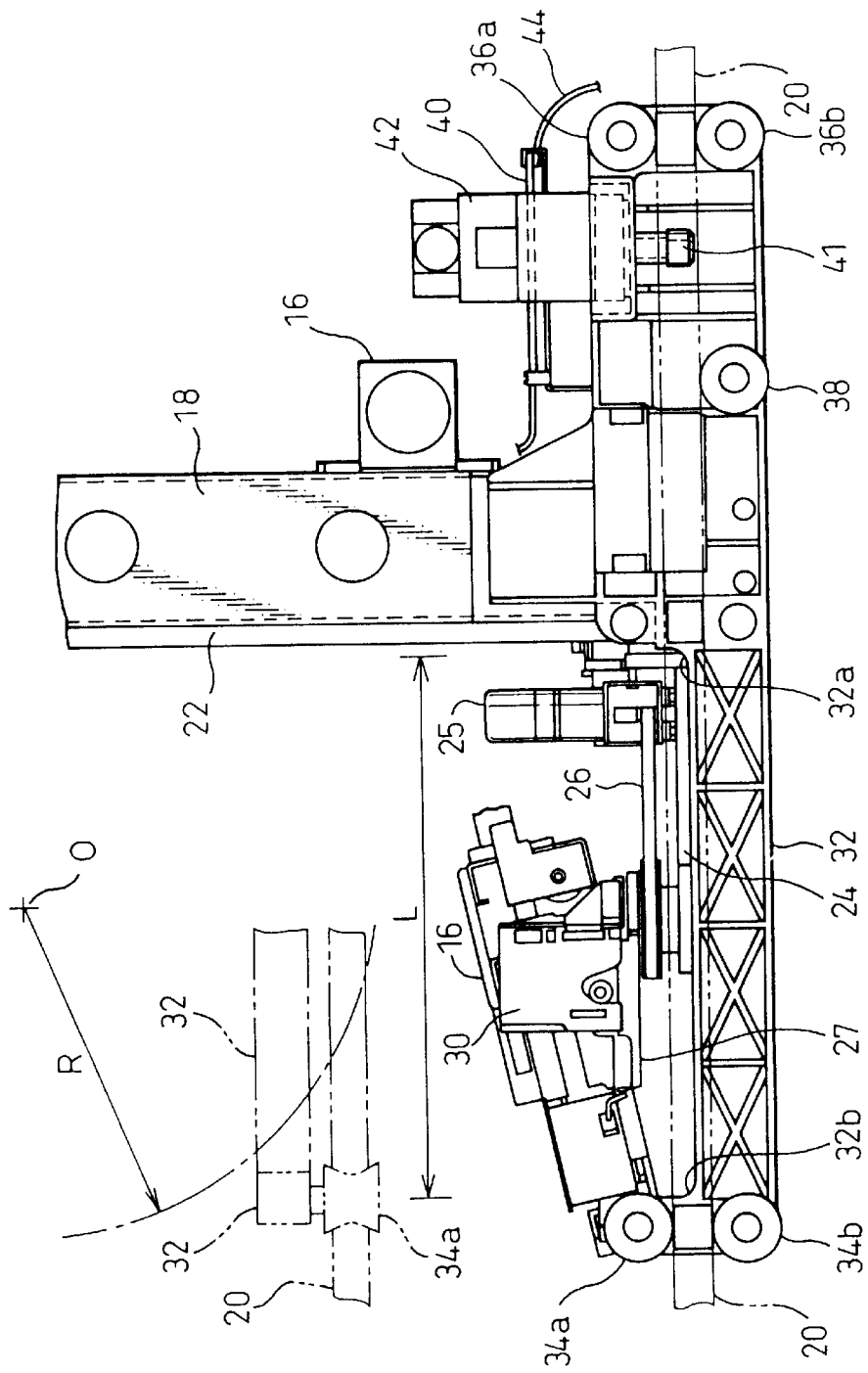
FIG. 4A a side view for explaining an X-directional motion mechanism for the accessor.
FIG. 4B is a partial plan view for explaining a Y-directional motion mechanism for the accessor.

As stated before, if the library apparatus 2 shown in FIG. 1 consists of four drum units 10b, each solely having a cell drum 15b, one drum unit 10a shown in FIG. 4 and one drum unit 169, the following addresses will be allocated. In this regard, the drum unit 10b shown in FIG. 1 is identical to the drum unit 169 having the DEE magazine. The accessor unit 10a has Frame No. 1 but has no Side No. The drum unit 10a has Frame No. 2 and Side No. 1. The drum unit 169 (10b) has Frame No. 2 and Side No. 0. The drive unit 12b has Frame No. 3 and Side No. 1. The drive unit 12c has Frame No. 3 and Side No. 0. The drive unit 12a has Frame No. 4 and Side No. 0. The four drive units respectively have Frame No. 5 and Side No. 1; Frame No. 5 and Side No. 0; Frame No. 6 and Side No. 1; and Frame No. 6 and Side No. 0. Finally, the Accessor unit 7 has Frame No. 6 but has no Side No..

Figure 75:
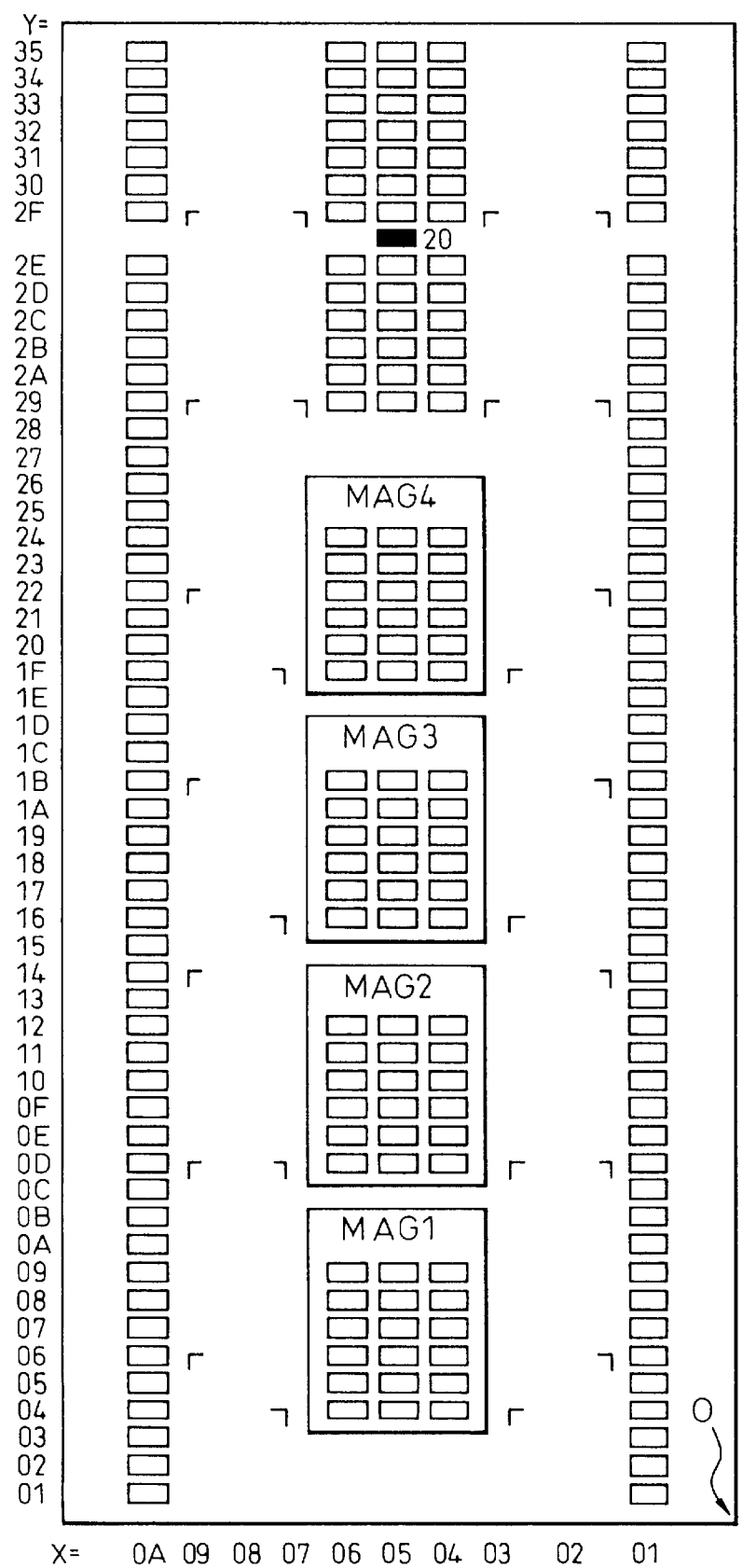
FIG. 75 is the illustration of the addresses to be allocated to the drum unit.

FIG. 75 illustrates the addresses allocated to the respective drum units. Addresses "01" through "0A" are allocated in the X-direction and those "01" through "35" are allocated in the Y-direction.

Figure 76:
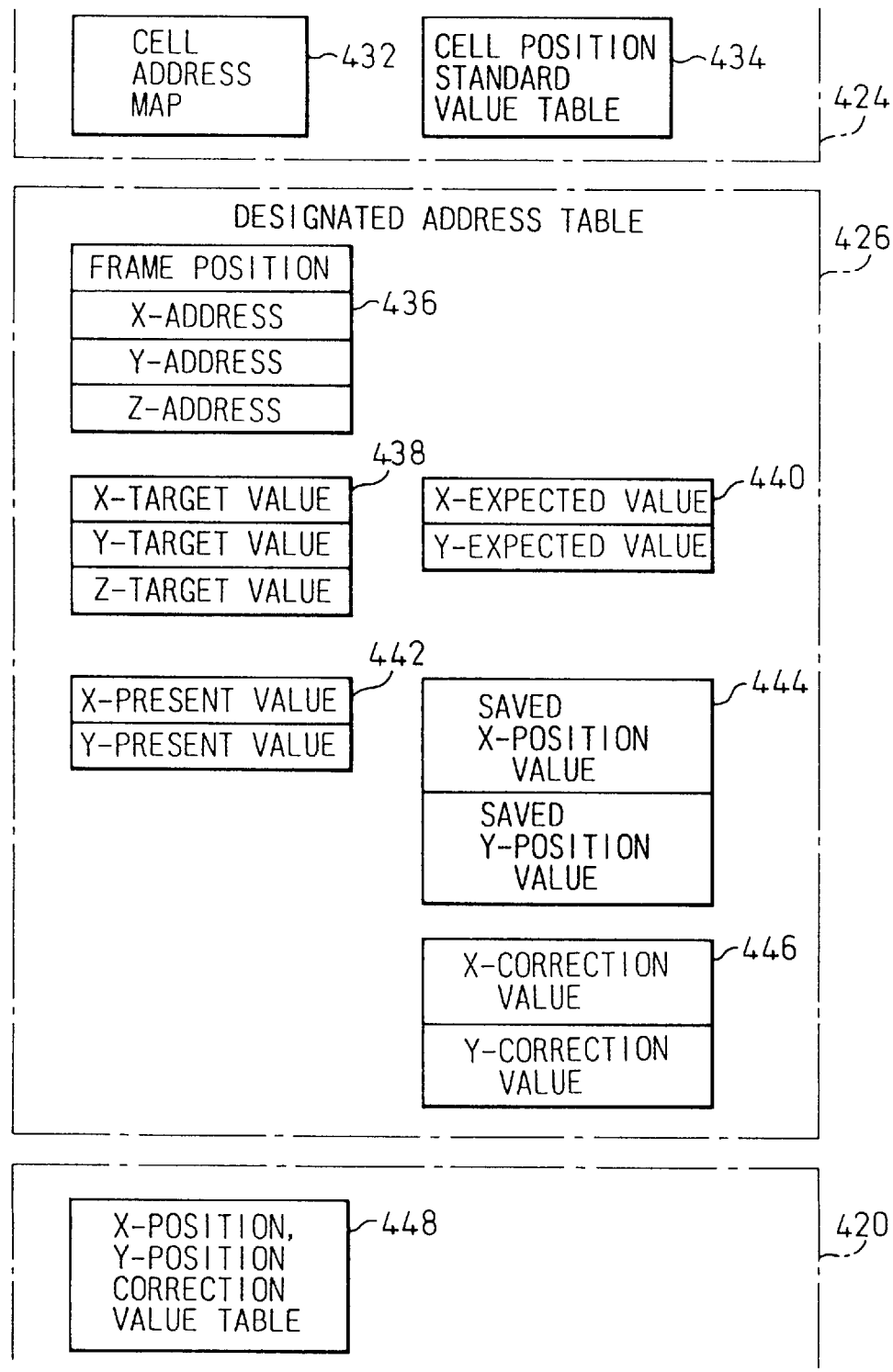
FIG. 76 is the illustration for explaining control values of a machine controller.

FIG. 76 is the illustration for explaining control values for the machine controller.

A cell address map 432 stores the address map shown in FIG. 75 and coordinates of the addresses indicated thereby. The address coordinates are dimensions (X-coordinate and Y-coordinate) from a reference point O of the drum unit (reference original point Fso). A cell-position standard value table 434 stores a coordinate value (X, Y) of a measurement starting point shown in FIG. 78. This coordinate value (X, Y) corresponds to a distance from that of an original point from which the movement of the accessor 14 starts. The coordinate value of the measurement starting point is stored as a difference from an expected value stated later. In the accessor 14 of the accessor unit 7, the coordinate value of the original point from which the movement of the accessor 14 starts is determined by the original position flag 165 fixed in the accessor unit 7. The cell address map 432 and the cell position standard value table 434 are stored in the program storage area 424 of the RAM 416 when the program has been installed. The correspondence between the respective units in the library apparatus 2 stated before and the Frame Nos. and Side Nos. thereof is stored in part of the cell address map 432. Further, X-directional installation intervals of the respective units are equal to a predetermined value, which also is stored in part of the cell address map 432.

A designated address table 436 stores values for defining a pivot center of the upper hand 146 and the lower hand 148 of the hand unit 130 of the accessor 14. A "frame position" stores Frame Nos. described with reference to FIG. 74. "X-address" and "Y-address" store coordinate values of cells in the drum unit described with reference to FIG. 74. "Z-address" stores Side Nos. described with reference to FIG. 74. A target value table 438 stores target values for defining a pivot center of the hand unit 130 on the accessor 14. "X-target value", "Y-target value", and "Z-target value" are calculated from rotational pulses of the respective motors 42, 46 and 25. An expected value table 440 stores X-directional and Y-directional expected values. The expected value table 440 is used when the operation for measuring the position of the accessor is carried out. A present value table 442 stores X-directional and Y-directional present positions of the accessor 14. The X-directional and Y-directional present positions correspond to the values of the counters 410 and 412. A position conservation table 444 stores present X and Y-values at a particular instant. The X and Y-positions stored in the position conservation table 444 are used when the operation for measuring the position of the accessor is carried out. A correction value table stores, as correction values, differences between the values stored in the present position table 442 and those stored in the position conservation table 444. These tables 436, 438, 440, 444 and 446 are stored in the work area in RAM 416.

An X and Y-position correction value table 448 stores X-position correction values and Y-position correction values for all the flags. The values stored in this table 448 are in the non-volatile memory 420.

Figure 77:
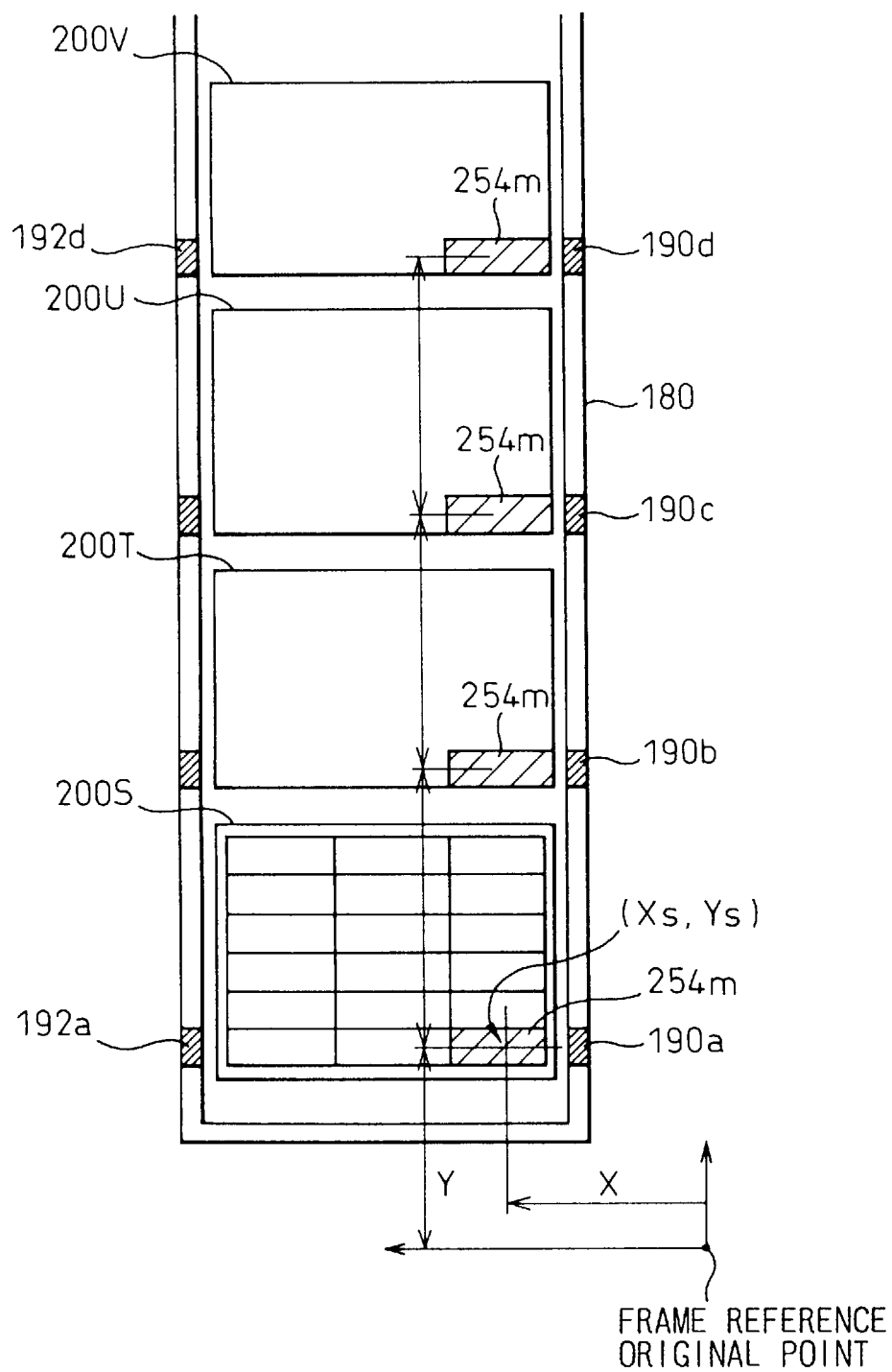
FIG. 77 is the illustration for explaining a coordinate system of a reference cell in the drum unit carrying the DEE magazine.
Figure 78:
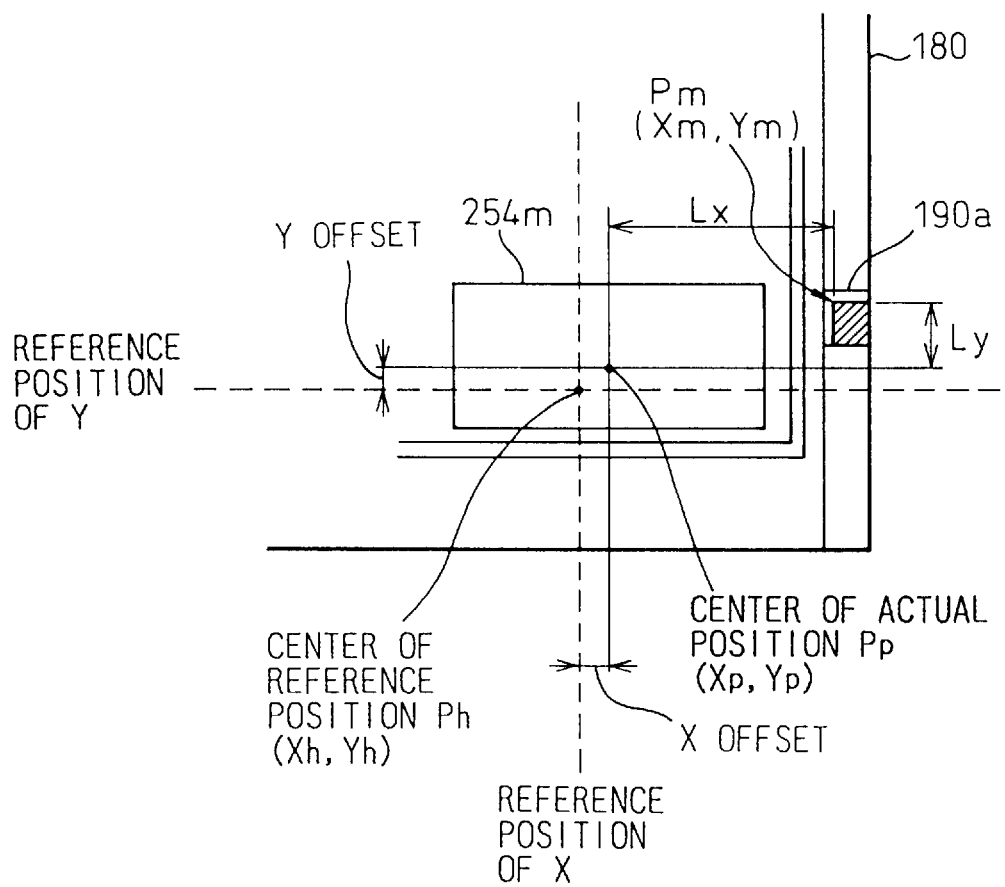
FIG. 78 is the illustration for representing a relationship between centers of a real position and a reference position of the reference cell.
Figure 79:
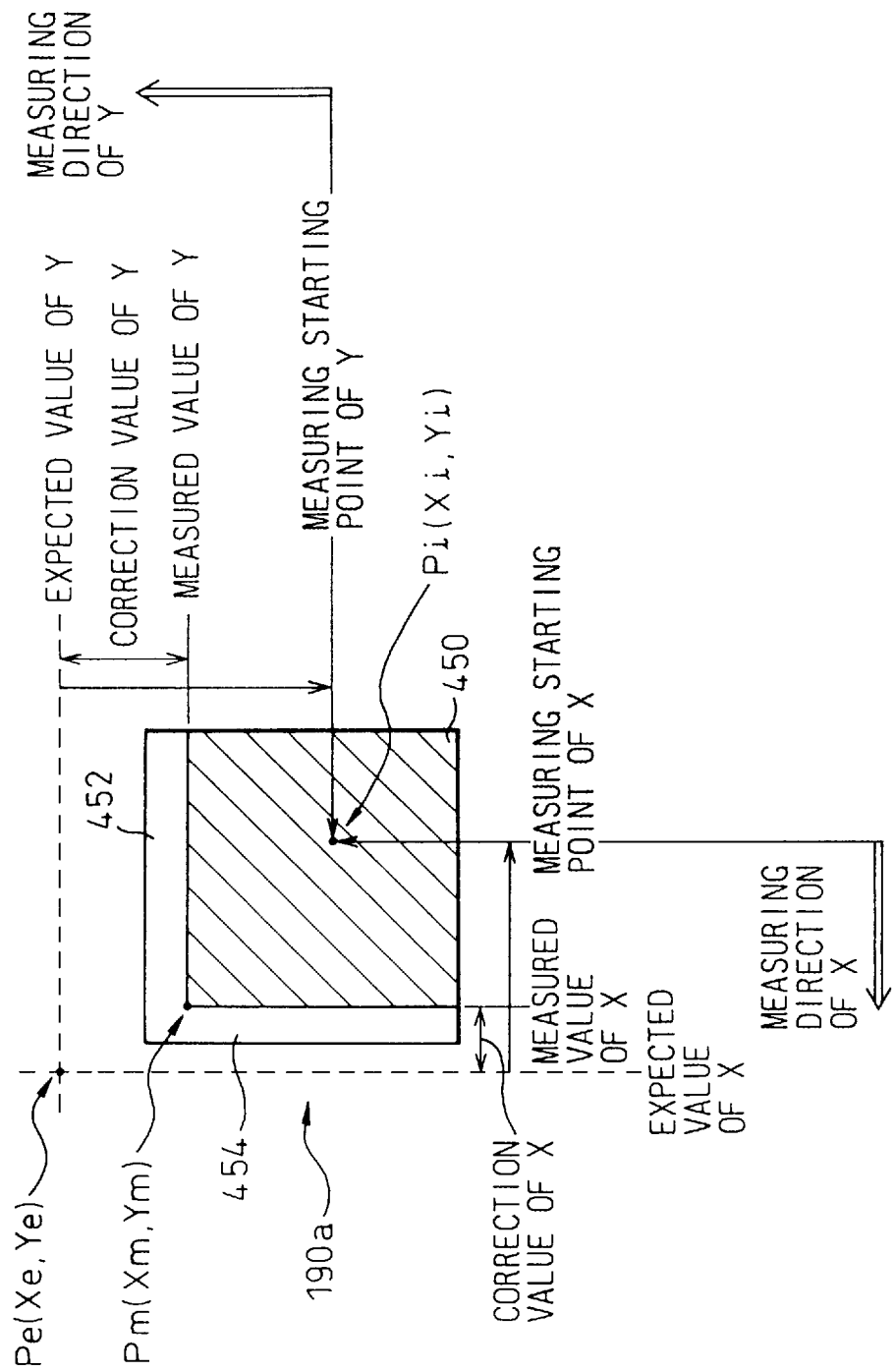
FIG. 79 is the illustration for representing a relationship between a mark for correcting a position and a starting point for the measurement.

FIGS. 77, 78 and 79 are the illustrations for explaining the operation of measuring the accessor position.

FIG. 77 is the illustration for explaining a coordinate system of the reference cell of the drum unit carrying the DEE magazine.

In FIG. 77, the coordinate system of the reference cell will be explained with reference to one of seven segments of the magazine drum 175 in the drum unit 169. The drum unit 169 carries magazines 200S through 200V in the respective magazine racks 184a through 184d of the magazine drum 175, as explained with reference to FIG. 40. a lower right cell 254m of each of the magazines 200S through 200V is a reference cell. A lower right end 179a of the drum unit 169 is the frame reference original point Fso. The lower right end 179a of the drum unit 169 is used as a reference point for the coupling with another unit. A coordinate value of the reference cell 254m of the drum unit 169 is represented by a rectangular coordinate system having an original point coinciding with the frame reference original point Fso. The coordinate value of the reference cell 254m is represented by a coordinate value (Xs, Ys) of a center of the reference cell 254m. The coordinate values (Xs, Ys) of the centers of the reference cells 254m of the respective magazines 200S through 200V are represented by coordinate values on the rectangular coordinate system having an original point coinciding with the frame reference original point Fso. As stated before, the magazines 200S through 200V are roughly positioned relative to a reference point 169a of the drum unit 169 by means of the guide plates 186, 187, 188 and 189, the projections 210 and 212, the positioning projection 214 and the positioning holes 201a and 201b of the magazine 200.

Accordingly, a coordinate value (Xs, Ys) of an actual center of the reference cell 254m of the magazine 200 is that defined while using, as a reference, the frame reference original point Fso which is the positioning reference point 169a.

FIG. 78 illustrates the relationship between an actual center of the reference cell and a reference center thereof.

In FIG. 78, a coordinate value (Xm, Ym) of a actual center Pp of the reference cell 254 m is apart by a distance Lx in the X-direction and a distance Ly in the Y-direction from a coordinate value (Xm, Ym) of a reference point Pm of a position-correction mark 190a. These dimensions Lx, Ly are stored in part of the cell address map 432 as stated before. That is, since the position-correction mark 190a is accurately attached to the frame 180, the coordinate value (Xm, Ym) of the reference point Pm of the position-correction mark 190a is defined while using the frame reference original point Fso as a reference. The actual center Pp of the reference cell 254m is offset in the X and Y-directions from a reference center Ph of the reference cell 254m defined while using the frame reference original point Fso as an original point. The reference center Ph of the reference cell 254m is represented by a coordinate value (Xh, Yh). The reference center Ph of the reference cell 254m is a point at which should exist a center of the reference cell 254m in a standard rectangular coordinate system having an original point at the position flag 165 of the accessor unit 9. Since the library apparatus 2 is assembled by coupling a plurality of units 7, 9, 10a and 10b with each other, there is an offset between the actual center Pp and the reference center Ph of the reference cell 254m. Such an offset is measured by the position-correcting mark 190a.

FIG. 79 illustrates the relationship between the position-correcting mark and the measurement starting point.

In FIG. 79, the position-correcting mark 190a is constituted by a black section 450, a Y-directional white section 452 and an X-directional white section 454. A reference point Pm of the position-correcting mark 190a is represented by a measured coordinate value (Xm, Ym). A starting point (optical axis of the sensor 162) for measuring a position of the accessor 14 is determined at a measurement starting point Pi (Xi, Yi) of the position-correcting mark 190a. The coordinate value (Xi, Yi) of the measurement starting point Pi is defined by the standard rectangular coordinate system having an original point at the position flag 165 of the accessor unit 9. An expected point Pe is defined as a point at which should exist the reference point Pm of the position-correcting mark when the sensor 162 moves in the X and Y-directions from the measurement starting point Pi. In this regard, the coordinate value (Xi, Yi) of the measurement starting point Pi is stored as a difference from the coordinate value (Xp, Yp) of the expected value Pe in the cell-position standard value table 434.

The expected point Pe is represented by a coordinate value (Xe, Ye). Since errors occur in the assembly of the library apparatus 2, the coordinate value (Xm, Ym) of the actual reference point Pm of the position-correcting mark 190a is offset from the coordinate value (Xe, Ye) of the expected value Pe. A difference between the coordinate values (Xm, Ym) and (Xe, Ye) of the reference point Pm and the expected point Pe, respectively, become correction values. These X-correction value and Y-correction value are used for correcting the offset between the actual center Pp and the reference center Ph of the reference cell 254m.

Figure 80:
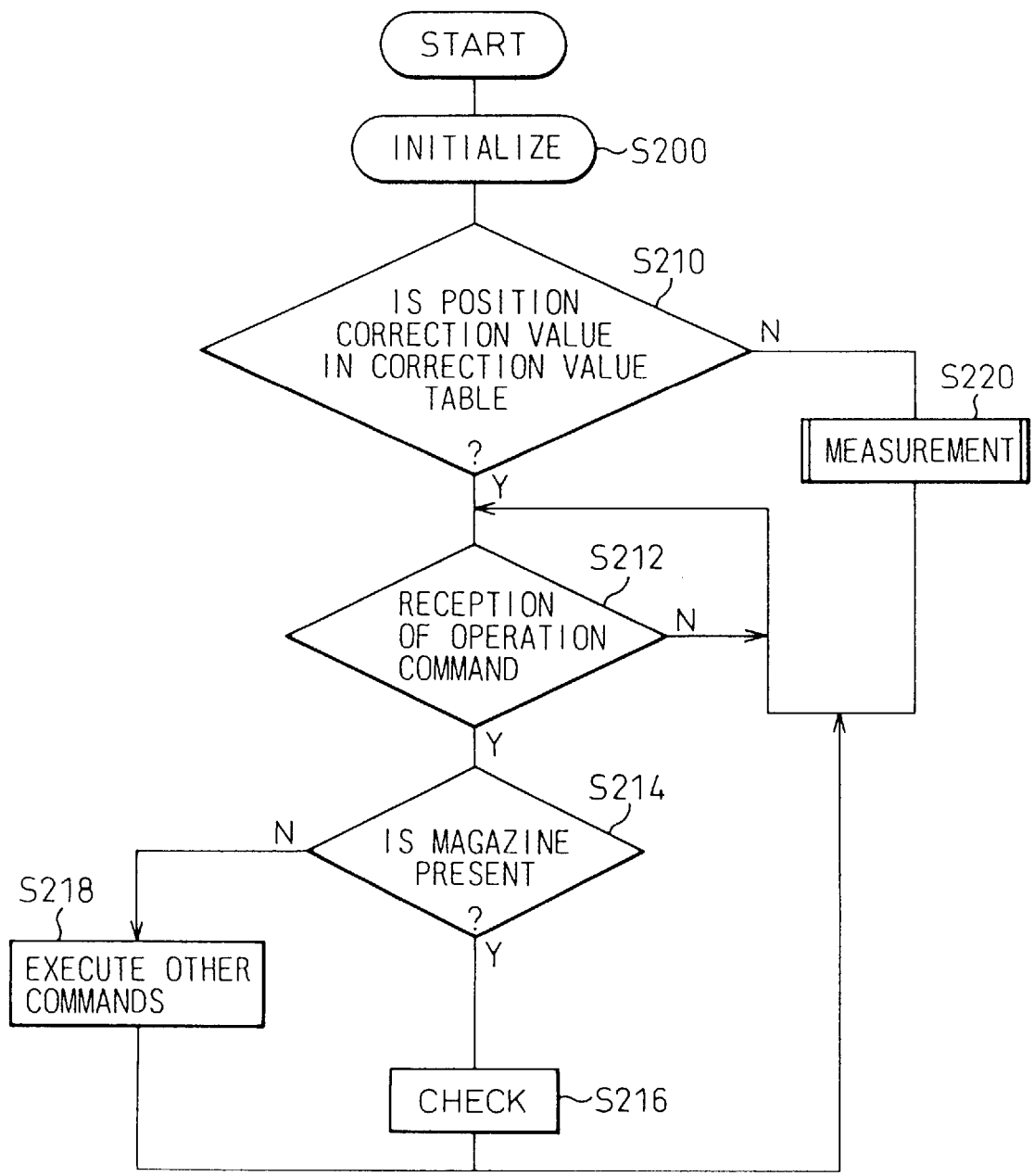
FIG. 80 is a flow chart for explaining the operation of a machine controller roller.

FIG. 80 is a flow chart for explaining the operation of the machine controller 351.

In FIG. 80, After the power source has been switched on, CPU 400 carries out the initialization at step S200. In the initialization, CPU 400 drives the motors 42, 46 and 25 via the drivers 402, 406 and 414 to locate the accessor 14 at the reference position in the accessor unit 7. CPU 400 drives the motors 42, 46 and 25 of the accessor 14 so that the sensor 163 can detect the position flag 165 and the sensor 162 of the hand assembly 16 can detect the position flag 165.

At step S210, CPU 400 determines whether or not the position-correction values are stored in the X and Y-position correction value table 448 in the non-volatile memory 420. If the position-correction values are not stored, the control proceeds to step S220 at which the measurement of the position-correction values is carried out. After the completion of the process at step S220, the control proceeds to step S212.

If the position correction values are stored, the control proceeds to step S212 at which it is determined whether or not the operation command is present. If the operation command is received via the interface 422 at step S212, the control proceeds to step S214. At step S214, CPU 400 determines whether or not the operation command is a command for checking the presence of magazine. If the answer is affirmative, the control proceeds to step S216 at which it is determined whether or not the magazine exists. If the command received at step S214 is other than the command for checking the presence of magazine, the control proceeds to step S218 at which the operation is carried out in accordance with the received command. The control returns to step S212 after the operation based on the magazine checking command or the other command has been completed.

Figure 81:
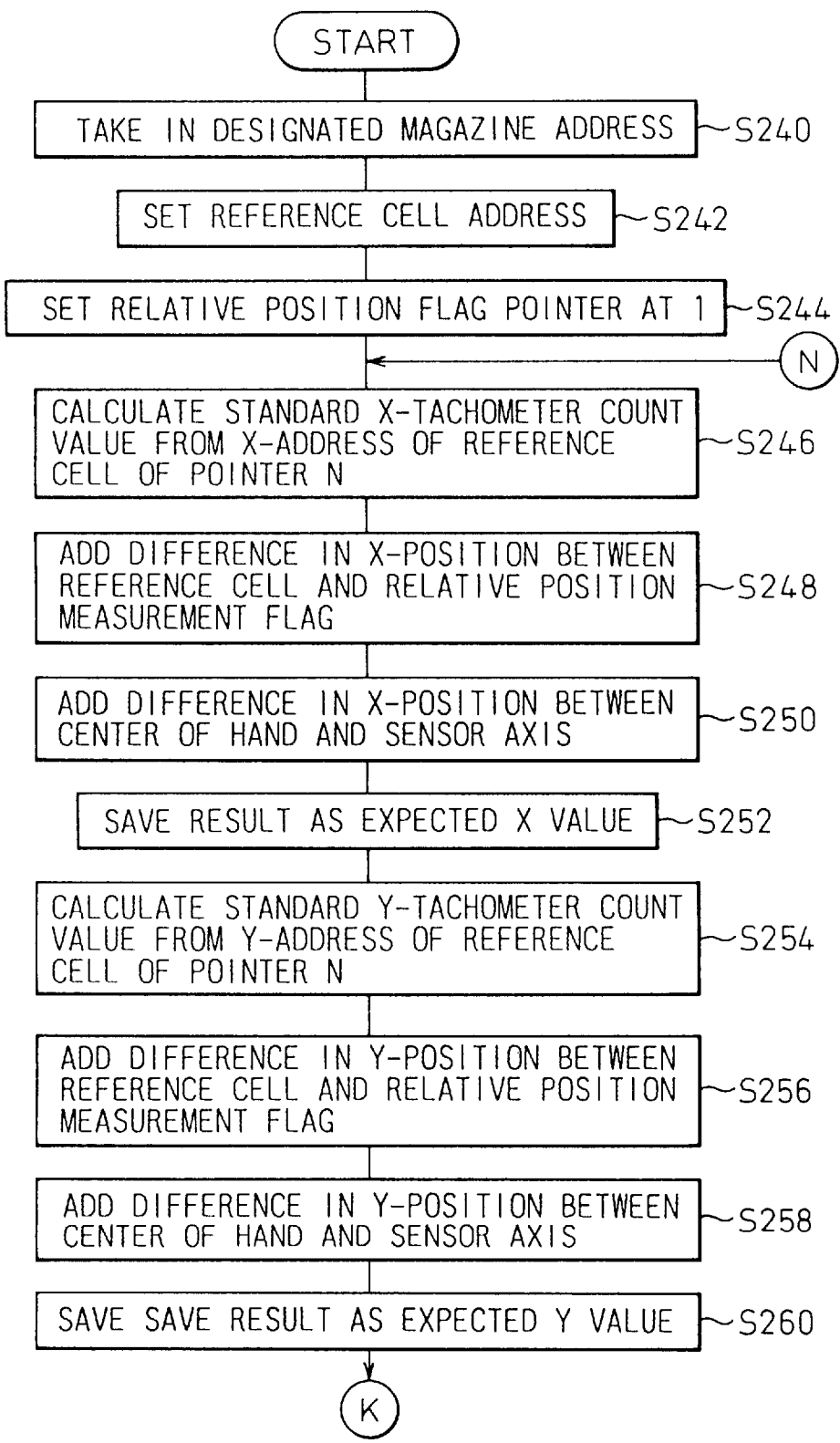
FIG. 81 is part of a flow chart for processing the measuring operation of a positional correction value.
Figure 82:
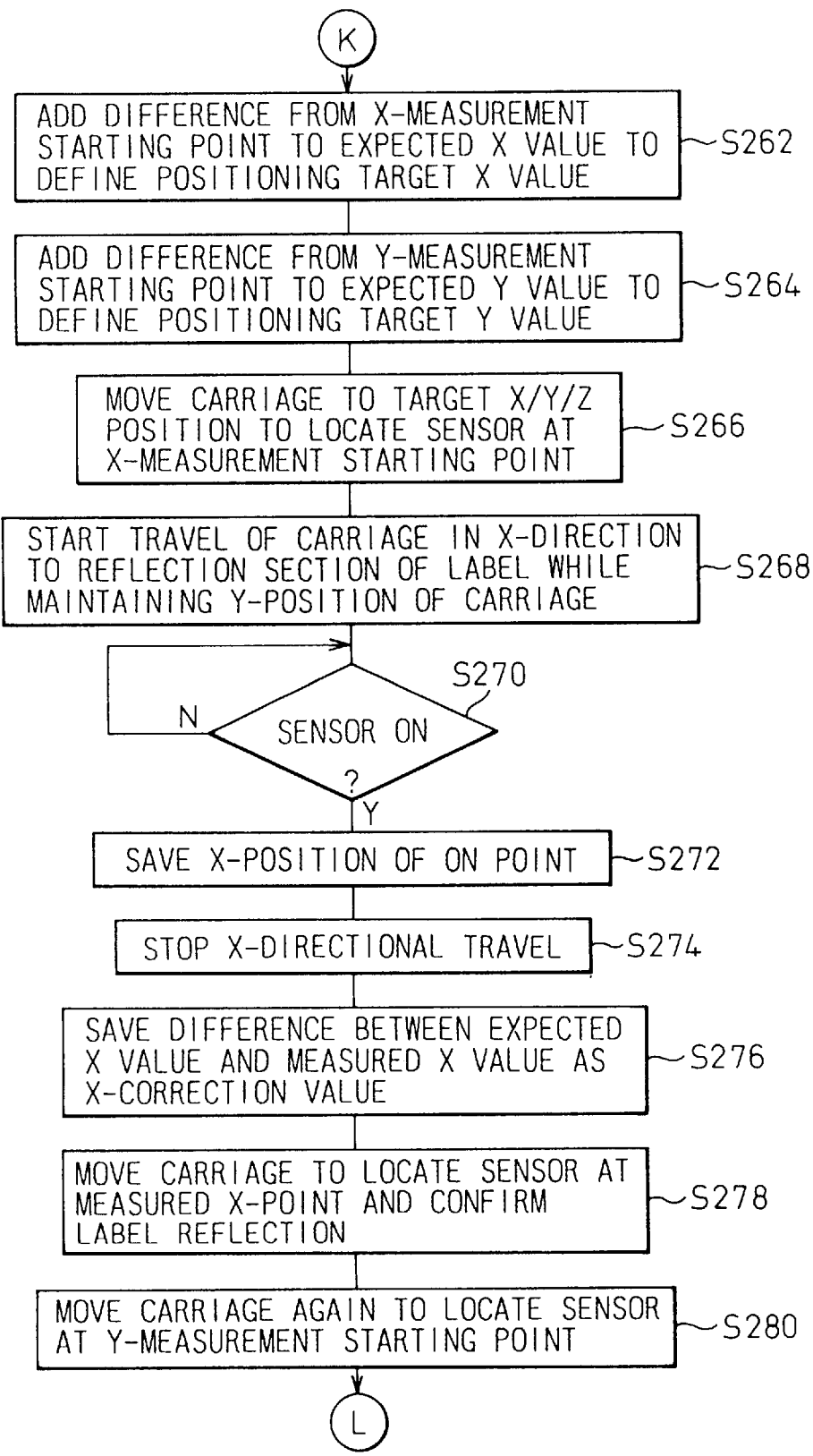
FIG. 82 is part of a flow chart for processing the measuring operation of a positional correction value.
Figure 83:
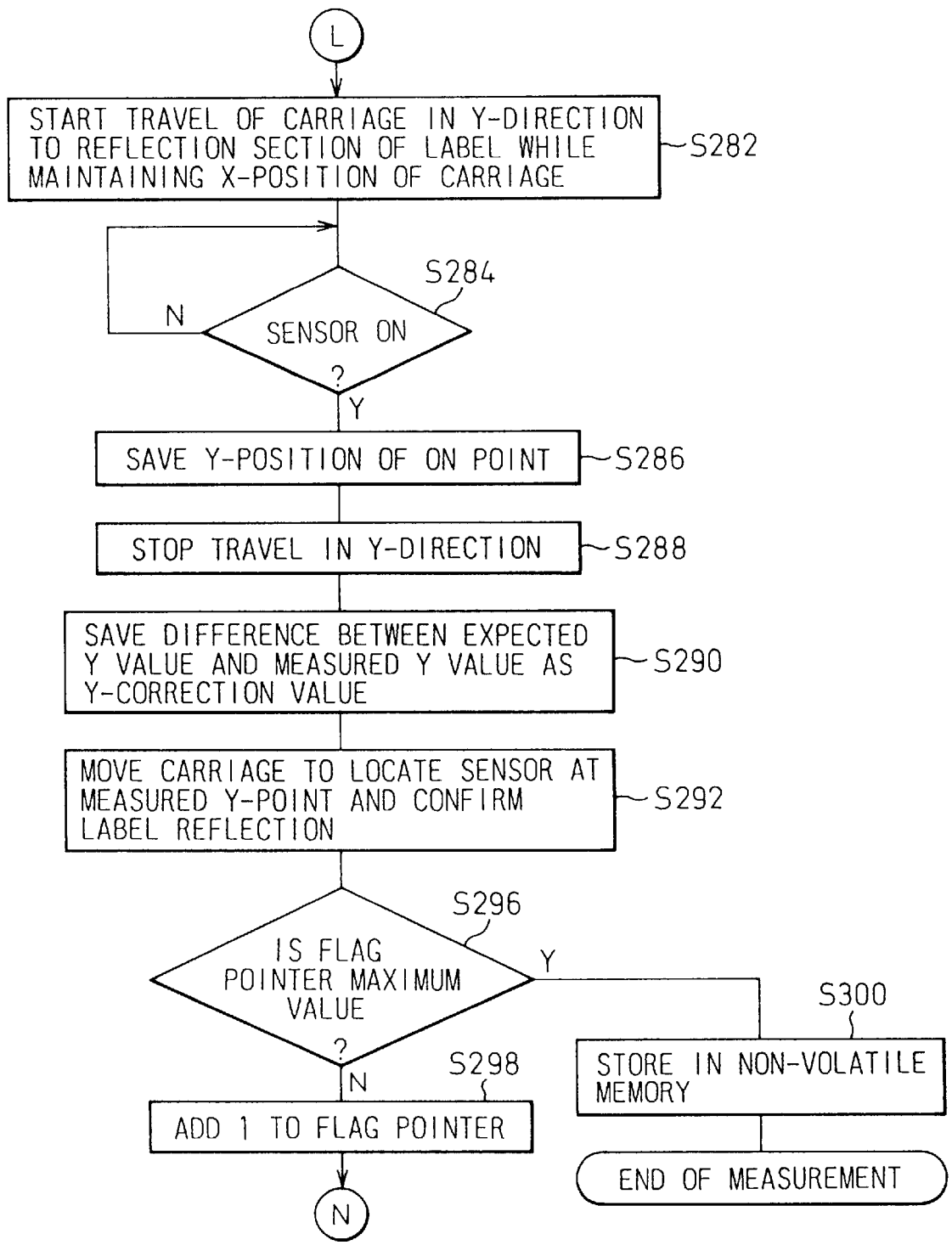
FIG. 83 is part of a flow chart for processing the measuring operation of a positional correction value.

FIGS. 81 through 83 illustrate a flow chart for the measurement of the position-correction values.

(1) Steps S240 through S244: CPU 400 takes the address (Frame No. and Side No.) of a unit in the drum unit 169 on which the measurement of the position-correction value is to be carried out into the designated address table 436 If it is assumed that this drum unit 169 is the drum unit 10b shown in FIG. 74, the address of the drum unit 169 (10b) is defined by Frame No.=2 and Side No. Z=0. Next, at step S242, CPU 400 takes the address of the reference cell 254m therein. The address of the reference cell 254m is defined by a coordinate value of a cell in the drum unit shown in FIG. 77. The reference cell 254m is positioned in the lower right corner of the respective magazine 200S to 200V. the X-address of the reference cell 254m of the magazine 200S is "04" and the Y-address is "04".

The X-addresses of the magazines 200T through 200V are all identical to that of the reference cell 254m of the magazine 200S; i.e., "04". While, the Y-address of the magazine 200T is "0D", that of 200U is "16", and that of 200C is "1F". These X and Y-addresses are represented by hexadecimal numbers.

Then, at step S244, CPU 400 sets a relative position flag pointer RPF at "N=1". The value of the pointer RPF sequentially designates the magazines 200T through 200V.

(2) Steps S246 through S252: Next, CPU 400 refers to the cell address map 432 in accordance with the X-address "04" of the reference cell 254m of the magazine 200S designated by the pointer RPF. CPU 400 calculates the X-coordinate value Xh of the reference center Ph of the reference cell 254m by the X-coordinate value Xs of the frame reference original point Fso, a width of the drum unit and a sum of the X-directional differences of a distance from a position of the original point flag 165 to the reference point 169a of the drum unit. Then, CPU 400 converts the X-coordinate value Xh to a count number for the encoder (tachometer) 404 and stores the same in an internal register. In addition, CPU 400 reads a dimension Lx corresponding to a difference between the X-coordinate values of the expected value Pe and the reference center Ph from the cell address map 432, and subtracts the same from the X-coordinate value Xh. Further, CPU 400 subtracts the X-directional difference between a center line of the hand unit 130 and an optical axis of the sensor 162 from the X-coordinate value Xh. The X-directional difference between the center line of the hand unit 130 and the optical axis of the sensor 162 is stored in the cell address map 432 described before. CPU 400 stores the calculated result in the expected value table 440 as an X-coordinate value of the expected value Pe.

(3) Steps S254 through 260: Then, CPU 400 refers to the cell address map 432 in accordance with the Y-address "04" of the reference cell 254m of the magazine 200S designated by the pointer RPF. CPU 400 calculates the Y-coordinate value Yh of the reference center Ph of the reference cell 254m by the Y-coordinate value Ys of the frame reference original point Fso and a sum of the Y-directional differences of a distance from a position of the original point flag 165 to the reference point 169a of the drum unit. Then, CPU 400 converts the Y-coordinate value Yh to a count number for the encoder (tachometer) 408 and stores the same in an internal register. In addition, CPU 400 reads a dimension Ly corresponding to a difference between the Y-coordinate values of the expected value Pe and the reference center Ph from the cell address map 432, and subtracts the same from the Y-coordinate value Yh. Further, CPU 400 subtracts the Y-directional difference between a center line of the hand unit 130 and an optical axis of the sensor 162 from the Y-coordinate value Yh. The Y-directional difference between the center line of the hand unit 130 and the optical axis of the sensor 162 is stored in the cell address map 432 described before. CPU 400 stores the calculated result in the expected value table 440 as an Y-coordinate value of the expected value Pe.

(4) Steps S262 through S268: CPU 400 adds the X-directional difference between the measurement starting point Pi and the expected point Pe stored in the cell position standard value table 434 to the expected X value stored in the expected value table 440 to calculate an X-coordinate of the target value for positioning the sensor 162. Then, CPU 400 adds the Y-directional difference between the measurement starting point Pi and the expected value Pe stored in the cell position standard value table 434 to the expected Y value stored in the expected value table 440 to calculate an Y-coordinate of the target value. In this regard, the target Z value represents a rotational angle of the motor 25 for positioning the hand assembly 16 opposite to a cell. This value is calculated by CPU 400 from the Z-address (z=1 or 0) stored in the designated address table 436. CPU 400 locates the accessor 14 which is operated as a carriage for transporting the sensor 162 at a target position stored in the target value table 438. That is, CPU 400 drives the motors 42, 46, 25 to locate the sensor 162 at the measurement starting point Pi. CPU 400 resets the contents of the counters 410 and 412 before the sensor 162 starts the travelling.

(5) Steps S268 through S276: After the sensor 162 has been positioned at the measurement starting point Pi, CPU 400 drives the motor 42 alone while maintaining the motors 25 and 46 stationary to move the rail base 32 along the X rail 20. Thus, the sensor 162 is made to travel from the measurement starting point Pi to the white section 454 of the position-correction mark 190*a* in the X-direction. During the travel of the sensor 162, CPU 400 detects an instant at which the detection output of the sensor 162 is ON. Also the instant is detected at which the sensor 162 reaches the white section 454. CPU 400 reads a value of the counter 410 for counting outputs from the encoder 404 when the detection output of the sensor 162 is ON. The value of the counter 410 represents the measured X value (Xm). The measured X value Xm is saved in the saved position value table 444 as a saved X-position value. In this regard, CPU 400 renews the present position of the sensor 162 in the aid of the counters 410 and 412 during the measurement of the position and stores in the present position value table 442. After the output from the sensor 162 has become OFF, CPU 400 interrupts the drive of the motor 42. Next, CPU 400 calculates the difference between the expected X value in the expected value table 440 and the measured X value saved in the saved position value table 444. This difference is stored as a correction X value in the correction value table 446. CPU 400 drives the motor 42 in the reverse direction to locate the sensor 162 at a position corresponding to the measured X value Xh and confirms that there is a reflection from the white section 454.

(6) Steps S280 through S292: CPU 400 locates the sensor 162 at the measurement starting point Pi. After the sensor 162 has been located at the measurement starting point Pi, CPU 400 drives the motor 46 alone while the motors 42 and 25 are stationary for the purpose of moving the base 27 along the rail guide 22. Thus, the sensor 162 travels from the measurement starting point Pi to the white section 452 of the position correction mark 190*a* in the Y-direction.

During the travel of the sensor 162, CPU 400 detects an instant at which the detection output of the sensor 162 is ON. Also an instant is detected at which the sensor 162 has reached the white section 452. CPU 400 reads a value of the counter 412 for counting outputs from the encoder 408 when the detection output of the sensor 162 is ON. The value of the counter 412 represents the measured Y value (Ym). The measured Y value Ym is saved in the saved position value table 444 as a saved X-position value. After the output from the sensor 162 has become OFF, CPU 400 interrupts the drive of the motor 46.

Next, CPU 400 calculates a difference between the expected Y value in the expected value table 440 and the measured Y value saved in the saved position value table 444. This difference is stored as a correction Y value in the correction value table 446. CPU 400 drives the motor 46 in the reverse direction to locate the sensor 162 at a position corresponding to the measured Y value Yh and confirms that there is a reflection from the white section 452.

(7) Steps S296 through S300: CPU 400 determines after the operation at step 292 has completed whether or not a value of the relative position flag pointer RPF is a maximum. In other words, it is determined whether or not the positional measurement of the position-correcting mark 190*d* in the magazine 200V has been completed.

In the magazine drum 175 of the drum unit 169, four magazine shelves 184*a* through 184*d* are mounted. Accordingly, CPU 400 determines whether or not the value of the pointer RPF is "N=4". If the value of the pointer RPF does not coincide with the maximum, 1 is added to the value of the pointer RPF. Then the control returns to step S246 at which the position measurement of the next position-correcting mark is carried out.

If the value of the pointer RPF coincides with the maximum value, the correction values of the respective position-correcting marks 190*a* through 190*d* are stored in the X and Y-position correction table 448 in the non-volatile memory.

Thus the position measurement has been completed and the control returns to step 212 to wait for an operation command.

The position measurement described above was carried out on the drum unit having the DEE magazine but may be carried out on the drum unit having no DEE door shown in FIGS. 17 through 22. In the latter case, the position-correcting mark may be provided on the pillar 686*a* or the base 654*a* of the drum unit 10A.

As stated above, according to the library apparatus 2, since the position measurement between the accessor unit 9 and the drum unit 10 is carried out, it is possible to absorb the assembly errors generated when the respective units are coupled to each other. Thereby, since the severe assembly accuracy is unnecessary a reduction of the assembly time period is possible.

Figure 84:
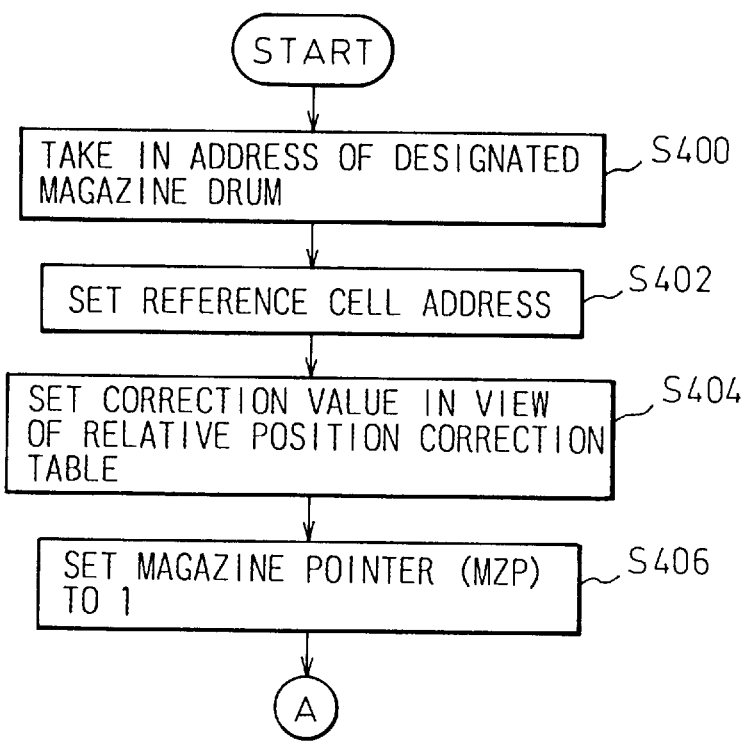
FIG. 84 is part of a flow chart for detecting the presence of a magazine.
Figure 85:
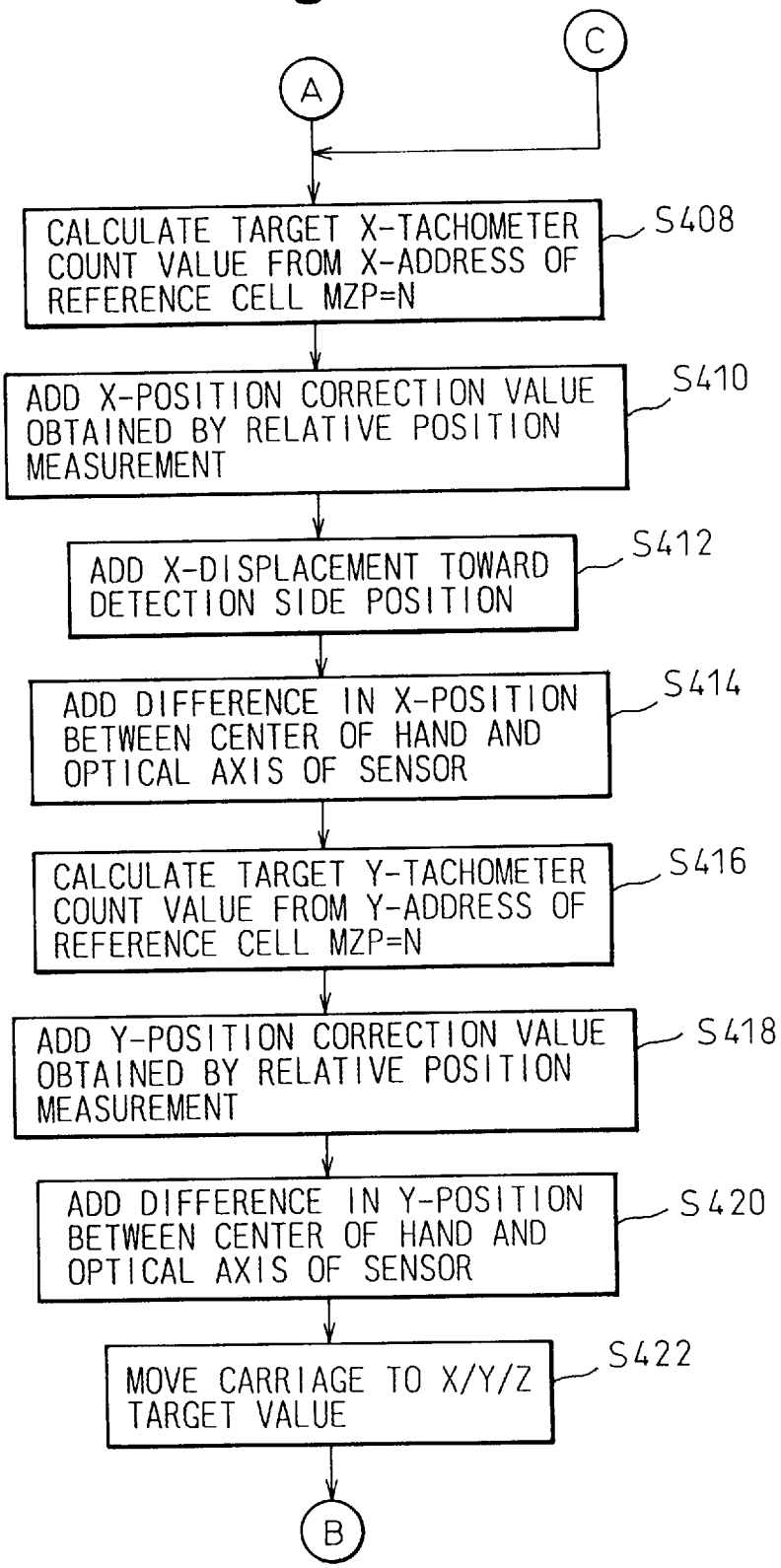
FIG. 85 is part of a flow chart for detecting the presence of a magazine.

FIGS. 84 through 86 show a flow chart of the operation for checking whether or not the magazine is present.

① Steps S400 to S406: CPU 400 takes an address (Frame No. and Side No.) of the drum unit 169 into the designated address table 436, on which unit is carried out the operation for checking whether or not the magazine is present. It is assumed that the address of this drum unit 169 is defined by Frame No. 2 and Side No. Z=0 similarly to the position measurement operation. Then, an address of the reference cell 254m is taken into CPU 400. The address of the reference cell 254m is defined by the coordinate value of a cell in the drum unit shown in FIG. 22. The reference cell 254m is positioned at a lower right zone of each of the magazines 200S through 200V. The reference cell 254m of the magazine 200S has the X-address of "04" and the Y-address of "04".

CPU 400 reads the X-correction value and the Y-correction value with reference to the X-position and Y-position correction table 448 in the non-volatile memory 420 and stores the same in the internal register. CPU 400 sets the magazine flag pointer MZP to be "N=1". According to this value of the pointer MZP, the magazines 200T through 200V are sequentially designated.

② Steps S408 to S420: Next, CPU 400 refers to the cell address map 432 based on the X-address "04" of the reference cell 254m of the magazine 200S designated by the pointer MZP. CPU 400 obtains the X-coordinate value Xh of the standard center position Ph of the reference cell 254m by a sum of the X-axis value (Xs) from the frame reference original point Fso, a widthwise dimension of the drum unit, the X-directional difference between the original point flag 165 and the reference point 169 of the drum unit.

The X-coordinate value Xh is converted to the number to be counted by the encoder (tachometer) 404, which is saved in the internal register. Then, the X-correction value read from the table 448 is added thereto. In addition, the displacement to a position 230 at which the presence of the magazine is checked is added. Further, the X-directional difference is added, between a pivot center of a hand of the hand unit 130 and the optical axis of the sensor 162. The calculated result is stored in the target value table as a target X value.

The position 230 at which the presence of the magazine is checked is on the surface of the metallic plate 224 for mounting the grip 204 of the magazine 200 shown in FIG. 32. This metallic plate 224 is made, for example, of stainless steel having a surface capable of reflecting the light emitted from the sensor 162. The above-mentioned value to be added for correcting the displacement to the position 230 is preliminarily stored in the cell position standard value table 434.

The magazine 200 is formed of metal such as stainless steel. The stored value to be added and a distance in the actual magazine exactly coincide with each other. Therefore, it is possible to reduce the probability of erroneously checking the presence of magazine, compared with a magazine of resinous material made through a molding process and thus having a poor dimensional accuracy.

Next, CPU 400 refers to the cell address map 432 based on the Y-address "04" of the reference cell 254m of the magazine 200S designated by the pointer MZP. CPU 400 obtains the Y-coordinate value Yh of the standard position center of the reference cell 254m by a sum of the Y-coordinate value (Ys) defined by the frame reference original point Fso and the Y-directional dimensional difference between the original point position flag 165 and the reference point of the drum unit 169a.

CPU 400 converts this Y-coordinate value Yh to the number to be counted by the encoder 408 and saves the same in the internal register. Further, CPU 400 reads the Y-correction value and adds the same to the Y-coordinate value Yh. Also, CPU 400 adds the Y-directional difference between the center line of the hand unit 130 and the optical axis of the sensor 162 to the Y-coordinate value Yh, the result of which is stored in the target value table 438 as the target Y-value.

As described above, CPU 400 adds the predetermined position-correction value when the coordinate value is obtained for checking whether or not the magazine is present. Accordingly, it is possible to correctly detect whether or not the magazine is present.

② Steps S422 to S424: CPU 400 locates the sensor 162 at a position corresponding to the target value stored in the target value table 438. The motors 42, 46 and 25 are driven by CPU 400 to locate the sensor 162 at the detection position 230. CPU 400 determines whether or not the sensor 162 is located at the position 230 at which the operation for checking whether or not the magazine is present is executed, based on the values in the counters 410 and 412.

③ Steps S426 to S436: After the sensor has been located at the detection position 230, CPU 400 observes an output from the sensor 162. If the output from the sensor 162 shows that there is no reflection, CPU 400 resets a flag representing the presence of magazine 200S in the non-volatile memory 420. On the contrary, if the output from the sensor 162 shows that there is a reflection, CPU 400 sets a flag representing the presence of magazine 200S (i.e., the value "1" is set).

CPU 400 determines whether or not the value of the pointer MZP coincides with "4" representing the maximum number of magazine to be mounted. If the answer is negative, CPU 400 adds "1" to the pointer MZP and executes the operation defined at step S408. On the contrary, If the answer is affirmative, CPU 400 finishes the detection operation, and informs the same to the controller 388 via the interface control portion 422.

If the exchange of DEE magazines in the other cell segments of the magazine drum 175 has been completed, the accessor controller 388 executes the following operation:

The accessor controller 388 issues a command to the drum controller 235-1 to locate the next cell segment 17 of the cell drum 15a at a position in front of the accessor 14. On the other hand, the controller 388 issues a command to CPU 400 via the interface control portion 422 to check whether or not the magazine is present through steps shown in FIGS. 84 through 86.

The accessor controller 388 obtains information via CPU 150 in the drum unit 169 whether or not the exchange of DEE magazines 200 has been finished. That is, CPU 150 in the control circuit 90 provided in the drum unit detects the opening of DEE door 64. Simultaneously therewith, CPU 150 detects the cell segment of the cell drum 15a located in front of the DEE door 64. CPU 150 informs the cell segment number to the accessor controller 388 via the interface control portion 156.

The accessor controller 388 can discriminate the magazine shelf in which the DEE magazine is present from that in which the magazine is not present by means of the magazine presence flag. The accessor controller 388 does not execute the operation for storing cartridges in the magazine shelf in which the magazine 200 is not mounted when the cartridges are stored in the drum unit 169. Also, the accessor controller 388 can prevent the operation from being carried out, for taking out the cartridge from the magazine shelf in which the magazine is not present.

The description was made solely on the embodiments wherein a magnetic tape cartridge of Type 13480 is used, but the present invention should not be restricted thereto. The present invention may be applied to any other library apparatuses having cells for accommodating an other type of magnetic tape cartridge, an optical disk cartridge or others.

Also, according to the above embodiments, the accessor was of an X-Y motion mechanism type. However, it is possible to use various modifications thereof; for example, the accessor may be of a Y-θ motion mechanism type. In the latter case, the accessor will be accommodated in the interior of a cylindrical cell drum.

What is claimed is:

1. A library apparatus comprising:
   a cell unit including a shelf with a plurality of cells for storing cartridges therein;
   a drive unit including processing means for carrying out recording/reading of information to cartridges in the library apparatus;
   an accessor unit including a transporting mechanism for transporting cartridges between the cells and the processing means;
   passage units including a generally horizontally extending guide member for guiding the transporting mechanism, said guide member extending through each of said passage units;
   separate box shaped housings for each of said cell units, said drive unit, said accessor unit, and said passage units, said box shaped housings each having connecting means for aiding connection to and alignment with a corresponding one of said box shaped housings; and
   coupling means for coupling the box shaped housings of the cell unit, the drive unit, and the accessor unit with the box shaped housings of the passage units by connecting the connecting means of the cell unit, the drive unit, and the accessor unit with the connecting means of the passage units.

2. A library apparatus as defined by claim 1, wherein the accessor unit has a mark for defining a reference position and the transporting mechanism has a sensor for detecting the mark, and wherein the library apparatus further comprises means for correcting a positional error of the transporting mechanism relative to the cell unit or the drive unit, in accordance with the detection output from the sensor.

3. A library apparatus as defined by claim 1, wherein the cell unit comprises a rotary drum with a plurality of cells and rotatable on its axis and a motor for rotating the rotary drum.

4. A library apparatus as defined by claim 3, wherein the cell unit comprises an upper drum located above the rotary drum and rotatable with the rotary drum.

5. A library apparatus as defined by claim 4, wherein the rotary drum and the upper drum are constituted by a polyhedron body having a plurality of lateral sides, on each of which are arranged the cells, and the respective sides of the rotary drum and the upper drum are arranged in the same planes.

6. A library apparatus as defined by claim 5, wherein the cell unit has a housing for accommodating the rotary drum, which has a wheel on a top surface thereof for rotatably holding the upper drum.

7. A library apparatus as defined by claim 5, wherein the plurality of cells are arranged on the respective side in a first direction, and the library apparatus comprises optical detection means for detecting the projection of the cartridge from the cell comprising a light emitting element and a light receiving element having an optical axis extending in the first direction.

8. A library apparatus as defined by claim 7, wherein the library apparatus further comprises cleaning means for cleaning the optical detection means, means provided on the rotary drum for locating the cleaning means at a cleaning position and means for moving the cleaning means to a retreated position.

9. A library apparatus as defined by claim 8, wherein the transporting mechanism comprises a gripper mechanism for gripping the cartridge, a motor for driving the transporting mechanism, means for supplying electric power to the motor, and a brake mechanism for inhibiting the movement of the transporting mechanism when the power supply to the motor is interrupted and for releasing the same when the power is supplied.

10. A library apparatus as defined by claim 9, wherein the transporting mechanism comprises a Y-axis transportation mechanism for moving the gripper mechanism, a Z-axis transportation mechanism for rotating the gripper mechanism in a plane transverse to the vertical direction and an X-axis transportation mechanism for moving the Y-axis transportation mechanism in the direction transverse to the vertical direction, wherein the X-axis transportation mechanism comprises a base for holding the Y-axis transportation mechanism, a rail for guiding the base, and a roller for holding the base to be slidable along the rail; the roller being supported by the base to be located outside of a radius of rotation of the gripper mechanism caused by the Z-axis transportation mechanism.

11. A method for assembling a library apparatus comprising a cell unit including a storage shelf with a plurality of cells for storing cartridges therein, a drive unit including processing means for carrying out the recording/reading of information to the cartridges, an accessor unit including a transporting mechanism for transporting the cartridges between the cells and the processing means, and passage units including a generally horizontally extending guide member for guiding the transporting mechanism, wherein said guide member extends through each of the passage units, the method comprising the steps of:

housing the cell unit, the drive unit, the accessor unit, and the passage units in separate box shaped housings, each of said box shaped housings having connecting means for connecting to and aligning with a corresponding one of said box shaped housings;

coupling the box shaped housings of corresponding passage units with the box shaped housing of cell unit through the respective connecting means of the corresponding passage units and the cell unit;

coupling the box shaped housings of corresponding passage units with the box shaped housing of the drive unit through the respective connection means of the corresponding passage units and the drive unit;

coupling the box shaped housing of corresponding passage units with the box shaped housing of the accessor unit through the respective connection means of the corresponding passage units and the accessor unit.

12. A library apparatus with a cell unit including a plurality of cells for accommodating memory media therein, said cells comprising:
   a rightside rack including a right-side surface and a left-side surface, the leftside surface of the right-side rack having a plurality of shelf plates;
   a leftside rack including a right-side surface and a left-side surface, the rightside surface of the left-side rack having a plurality of shelf plates; and
   an intermediate rack including a right-side surface and a left-side surface, both the right-side and the left-side surfaces of the intermediate rack having a plurality of shelf plates; wherein each of the plurality of cells of the cell unit are formed by a combination of two shelf plates chosen from the shelf plates of the right-side rack, the left-side rack, and the intermediate rack.

13. A library apparatus as defined by claim 12, wherein
each of the rightside rack, the leftside rack and the intermediate rack is molded in resin as a one piece body to have a back plate, a plurality of shelf plates projected from the front side of the back plate, and positioning projections projected from the back side of the back plate, and the shelf has a plate-like member with holes engageable with the positioning projections;

the rightside rack, the leftside rack and the intermediate racks being mounted to the plate-like member with screws while engaging the positioning projections with the holes.

14. A library apparatus as defined by claim 13, wherein the plurality of shelf plates are projected from the back plate at the same angle.

15. A library apparatus as defined by claim 14, wherein the leftside rack and the rightside rack are attached at the right and left ends of the plate-like member, respectively, and two of the intermediate racks are attached between the leftside and rightside racks at the same distance therebetween, so that three rows of cells are formed.

16. A library apparatus as defined by claim 1, wherein the cell unit comprises:
a plurality of cells capable of accommodating a plurality of cartridges and
a rightside rack, a leftside rack and intermediate racks for defining the plurality of cells.

17. A library apparatus as defined by claim 16, wherein
each of the rightside rack, the leftside rack and the intermediate rack is molded in resin as a one piece body to have a back plate, a plurality of shelf plates projected from the front side of the back plate, and positioning projections projected from the back side of the back plate, and the shelf has a plate-like member with holes engageable with the positioning projections;

the rightside rack, the leftside rack and the intermediate racks being mounted to the plate-like member with screws while engaging the positioning projections with the holes.

18. A library apparatus as defined by claim 17, wherein the plurality of shelf plates are projected from the back plate at the same angle.

19. A library apparatus as defined by claim 18, wherein the leftside rack and the rightside rack are attached at the right and left ends of the plate-like member, respectively, and two of the intermediate racks are attached between the leftside and rightside racks at a distance therebetween, so that three rows of cells are formed.

20. A library apparatus as defined by claim 1, wherein the cell unit has a storage shelf for accommodating cartridges in separate cells and a magazine shelf with a mounting area for accommodating a portable magazine in a detachable manner, and a plurality of cells are formed in the magazine by a rightside rack, a leftside rack and intermediate racks.

21. A library apparatus as defined by claim 20, wherein
each of the rightside rack, the leftside rack and the intermediate rack is molded in resin as a one piece body to have a back plate, a plurality of shelf plates projected from the front side of the back plate, and positioning projections projected from the back side of the back plate, and a plate-like member is provided on the back side of a housing of the magazine, having holes engageable with the positioning projections;

the rightside rack, the leftside rack and the intermediate racks being mounted to the plate-like member with screws while engaging the positioning projections with the holes.

22. A library apparatus as defined by claim 21, wherein the plurality of shelf plates are projected from the back plate at the same angle.

23. A library apparatus as defined by claim 22, wherein the leftside rack and the rightside rack are attached at the right and left ends of the plate-like member, respectively, and two of the intermediate racks are attached between the leftside and rightside racks at a distance therebetween, so that three rows of cells are formed.

24. A library apparatus as defined by claim 20, wherein the magazine shelf is provided with a positioning means for locating a cell of the magazine at a position at which the cell can be treated by the transporting mechanism in a same manner as in a cell of the storage shelf when the magazine is mounted to the mounting area of the magazine shelf.

25. A library apparatus as defined by claim 20, wherein means is provided, for determining whether or not the magazine is present in the mounting area of the magazine shelf.

26. A library apparatus as defined by claim 20, wherein a door is provided on a housing of the cell unit in front of the magazine shelf, for the entry/exit of the magazine relative to the mounting area.

27. A library apparatus as defined by claim 20, wherein means is provided in the mounting area of the magazine shelf, for determining whether or not a cartridge is present in the cell of the mounted magazine.

28. A library apparatus as defined by claim 20, wherein the cell unit comprises magazine forming a plurality of cells, the magazine being formed by a rightside rack, a leftside rack and intermediate racks for defining the plurality of cells.

29. A library apparatus defined by claim 28, wherein
each of the rightside rack, the leftside rack and the intermediate rack is molded with resin as a one piece body to have a back plate, a plurality of shelf plates projected from the front side of the back plate, and positioning projections projected from the back side of the back plate, and a plate-like member is provided on the back side of a housing of the magazine, having holes engageable with the positioning projections;

the rightside rack, the leftside rack and the intermediate racks being mounted to the plate-like member with screws while engaging the positioning projections with the holes; and the plate-like member further has holes and is attached to the drum unit by by the engagement of the holes with projections provided on a back panel of the drum unit.

30. A library apparatus as defined by claim 29, wherein the plurality of shelf plates are projected from the back plate at the same angle.

31. A library apparatus as defined by claim 30, wherein the leftside rack and the rightside rack are attached at the right and left ends of the plate-like member, respectively, and two of the intermediate racks are attached between the leftside and rightside racks at a distance therebetween, so that three rows of cells are formed.

32. A library apparatus as defined by claim 20, wherein a cartridge carries a bar code label thereon, and the cell unit has a bar code reader for reading the bar code label carried on the cartridge stored in the cell of the magazine mounted in the mounting area of the magazine shelf.

33. A library apparatus as defined by claim 32, wherein the bar code reader is detachable/attachable.

34. A library apparatus as defined by claim 33, wherein a door is provided on the housing of the cell unit located in front of the magazine shelf.

35. A library apparatus as defined by claim 34, wherein the housing comprises:

a reference bar code representing a reference position for reading the bar code label, means for displacing the bar code reader in the arrangement direction of cells in the storage shelf, means for detecting a position of the reference bar code, and means for controlling the displacement means in accordance with the detection outputs from the detection means.

36. A library apparatus as defined by claim 35, wherein the housing further comprises means for detecting whether or not a cartridge is present in the cell of the storage shelf in accordance with the outputs from the bar code reader.

37. A library apparatus as defined by claim 32, wherein the cell unit has a rotary drum rotatable on its axis, the rotary drum has a plurality of lateral sides; a plurality of cells formed in a storage shelf provided on the respective lateral side being arranged on the lateral side along the drum axis; and there are means for displacing the bar code reader parallel to the drum axis, means for controlling an angular position of the rotary drum so that the bar code carried on the cartridge stored in the cell is located at a position in front of the reading position of the bar code reader, and means for changing the reading position of the bar code reader in accordance with a position, on the lateral side, of the cell located in front of the reading position of the bar code reader.

38. A method for making a cell unit including a plurality of cells for accommodating memory media therein, the method comprising the steps of:

forming a single piece rightside rack including a left-side surface with a plurality of shelf plates and a right-side surface;

forming a single piece leftside rack including a right-side surface with a plurality of shelf plates and a left-side surface;

forming a single piece intermediate rack including a right-side surface with a plurality of shelf plates and a left-side surface with a plurality of shelf plates; and placing the intermediate rack between the single piece rightside rack and the single piece leftside rack such that said rightside rack, said leftside rack and said intermediate rack cooperate to form a plurality of cells wherein each cell is formed by a combination of two shelf plates chosen from the shelf plates of the rightside rack, the leftside rack, and the intermediate rack.

39. A library apparatus comprising:

a cell unit accommodating storage media therein;

a drive unit for reading/writing to the storage media; and an accessor for transporting the storage media between said drive unit and said cell unit, wherein said cell unit comprises a storage shelf for accommodating cartridges in separate cells;

a magazine shelf with a mounting area for accommodating a portable magazine in a detachable manner, a plurality of cells being formed in the magazine by a rightside rack, a leftside rack and at least one intermediate rack, a housing;

a door in said housing for accessing said magazine shelf;

a reference bar code representing a reference position for reading the bar code;

a bar code reader;

means for displacing a reading direction of the bar code reader in the arrangement direction of cells in the storage shelf;

means for detecting a position of the reference bar code; and means for controlling the means for displacing in accordance with information provided by the means for detecting.

40. A method for assembling a library apparatus comprising the steps of:

positioning a reference cell unit having a box shaped housing;

coupling passage units having box shaped housings to multiple sides of the housing of the reference cell unit, using the height of the housing of the reference cell unit as a guide to position the passage units;

coupling an accessor unit having a box shaped housing to the box shaped housing of one of said passage units, using the height of the box shaped housing of one of said passage units as a guide to position the accessor unit;

respectively coupling separate cell units having box shaped housings to the box shaped housings of the one of said passage units and a second one of said passage units using the height of the box shaped housings of the respective passage units as a guide to position the cell units; and coupling a drive unit having a box shaped housing to said box shaped housing of said reference cell unit.

* * * * *

UNITED STATES PATENT AND TRADEMARK OFFICE
CERTIFICATE OF CORRECTION

PATENT NO. : 5,872,751
DATED : February 16, 1999
INVENTOR(S) : Utsumi et al.

Page 1 of 5

It is certified that error appears in the above-identified patent and that said Letters Patent is hereby corrected as shown below:

On the title page,

Under "[56] References Cited U.S. Patent Documents" and "Foreign Documents" insert

| Document No. | Country | Date |
| --- | --- | --- |
| --57186201 | Japan | 11/1982 |
| 61158063 | Japan | 07/1986 |
| 63237256 | Japan | 10/1988 |
| 273557 | Japan | 03/1990 |
| 2110851 | Japan | 04/1990 |
| 2137163 | Japan | 05/1990 |
| 3209664 | Japan | 09/1991 |

UNITED STATES PATENT AND TRADEMARK OFFICE
CERTIFICATE OF CORRECTION

PATENT NO. : 5,872,751
DATED : February 16, 1999
INVENTOR(S) : Utsumi et al.

It is certified that error appears in the above-identified patent and that said Letters Patent is hereby corrected as shown below:

| Document No. | Country | Date |
|---|---|---|
| 5135457 | Japan | 06/1993 |
| 5258433 | Japan | 10/1993 |
| 5325357 | Japan | 12/1993-- |

Under "[75] Inventors", delete all instances of "Inayi" and insert --Inagi-- therefor Column 3, line 54, after "19" insert --is--

Column 14, line 19, delete "an" and insert --a-- therefor

UNITED STATES PATENT AND TRADEMARK OFFICE
CERTIFICATE OF CORRECTION

PATENT NO. : 5,872,751
DATED : February 16, 1999
INVENTOR(S) : Utsumi et al.

It is certified that error appears in the above-identified patent and that said Letters Patent is hereby corrected as shown below:

Column 14, line 27, delete "cell" and insert --cells-- therefor

Column 18, line 25, after "bar code reader 68" insert --is--

Column 22, line 44, delete "stages" and insert --stage-- therefor

Column 26, line 22, delete "176" and insert --171-- therefor

Column 38, line 5, delete "angel" and insert --angle-- therefor

UNITED STATES PATENT AND TRADEMARK OFFICE
CERTIFICATE OF CORRECTION

PATENT NO. : 5,872,751
DATED : February 16, 1999
INVENTOR(S) : Utsumi et al.

It is certified that error appears in the above-identified patent and that said Letters Patent is hereby corrected as shown below:

Column 39, line 28, delete "illustrates" and insert

--illustrate-- therefor

Column 40, line 11, delete "illustrates" and insert

--illustrate-- therefor

Column 42, line 22, delete "a" and insert --A-- therefor

Column 43, line 43, delete "After" and insert

--after-- therefor

Column 44, line 14, delete "436 If" and insert

--436. If-- therefor

UNITED STATES PATENT AND TRADEMARK OFFICE
CERTIFICATE OF CORRECTION

PATENT NO. : 5,872,751
DATED : February 16, 1999
INVENTOR(S) : Utsumi et al.

It is certified that error appears in the above-identified patent and that said Letters Patent is hereby corrected as shown below:

Column 44, line 22, delete "the" (first occurrence) and insert --The-- therefor

Column 48, line 31, delete "If" and insert --if-- therefor

Column 49, line 1, delete "an other" and insert --another-- therefor

Column 52, line 55, delete "by by" and insert --by-- therefor

Signed and Sealed this

Twenty-third Day of November, 1999

Attest:

Q. TODD DICKINSON

*Attesting Officer*  *Acting Commissioner of Patents and Trademarks*